(12) United States Patent
Ezawa et al.

(10) Patent No.: US 6,341,119 B1
(45) Date of Patent: Jan. 22, 2002

(54) DISK STORAGE MAGAZINE AND RECORDING/REPRODUCING APPARATUS

(75) Inventors: Kozo Ezawa, Katano; Teruyuki Takizawa, Neyagawa; Shigeto Ueno, Toyonaka, all of (JP)

(73) Assignee: Matsushita Electric Industrial Co., Ltd. (JP)

( * ) Notice: Subject to any disclaimer, the term of this patent is extended or adjusted under 35 U.S.C. 154(b) by 0 days.

(21) Appl. No.: 09/391,378

(22) Filed: Sep. 8, 1999

(30) Foreign Application Priority Data

Sep. 8, 1998 (JP) .......................................... 10-253131
Mar. 30, 1999 (JP) .......................................... 11-087349

(51) Int. Cl.[7] ........................ G11B 17/22; G11B 23/023
(52) U.S. Cl. ..................... 369/178; 369/291; 369/75.1; 369/77.1; 206/308.1
(58) Field of Search ............................... 369/291, 273, 369/178, 75.1, 75.2, 77.1, 77.2; 206/308.1, 308.3, 312

(56) References Cited

U.S. PATENT DOCUMENTS

| | | | | |
|---|---|---|---|---|
| 4,538,730 A | * | 9/1985 | Wu | 206/754 |
| 4,670,803 A | * | 6/1987 | DeMoss et al. | 360/133 |
| 4,762,225 A | * | 8/1988 | Henkel | 206/311 |
| 4,838,436 A | * | 6/1989 | Bailey | 211/51 |
| 5,193,681 A | * | 3/1993 | Lievsay | 206/444 |
| 5,505,358 A | * | 4/1996 | Haase | 224/539 |
| 5,785,399 A | * | 7/1998 | Frankeny et al. | 312/324 |
| 5,947,279 A | * | 9/1999 | Lee et al. | 206/232 |
| 5,970,043 A | * | 10/1999 | Fujisawa | 369/271 |
| 6,058,097 A | * | 5/2000 | Inoue | 369/192 |
| 6,179,121 B1 | * | 1/2001 | Ferguson et al. | 206/311 |
| 6,199,689 B1 | * | 3/2001 | Higuchi et al. | 206/308.3 |
| 6,202,839 B1 | * | 3/2001 | Petersen et al. | 206/308.1 |
| 6,250,462 B1 | * | 6/2001 | Kato | 206/312 |

OTHER PUBLICATIONS

US SIR, H1954H, Takashima, "Environmentally Friendly Information Storage Disc Packaging System".*

* cited by examiner

*Primary Examiner*—David L. Ometz
*Assistant Examiner*—Franklin D. Altman, III
(74) *Attorney, Agent, or Firm*—Parkhurst & Wendel, L.L.P.

(57) ABSTRACT

A disk storage magazine in which the number of stored disks per unit volume can be increased. A pair of disk holding members (4), which are bent into a bellows shape by the number of stored disks, are arranged substantially in parallel with a direction in which disks (1) come off on both sides of a magazine case (2). When the disk storage magazine is opened, the disk (1) is held by valley portion of the folded portions of the disk holding members (4), and held between tapered faces on opposite sides of the valley portion. When the disk storage magazine is closed, the disk holding member (4) is bent until the tapered faces holding the edge of surface of the disk (1) become substantially in parallel with the disk surface, and fixes and holds the disks (1) in a state of touching and pressing the disks (1). Thereby, clearances in the stacking direction between the disk (1) and the disk holding member (4) can be eliminated.

12 Claims, 52 Drawing Sheets

FIG.14
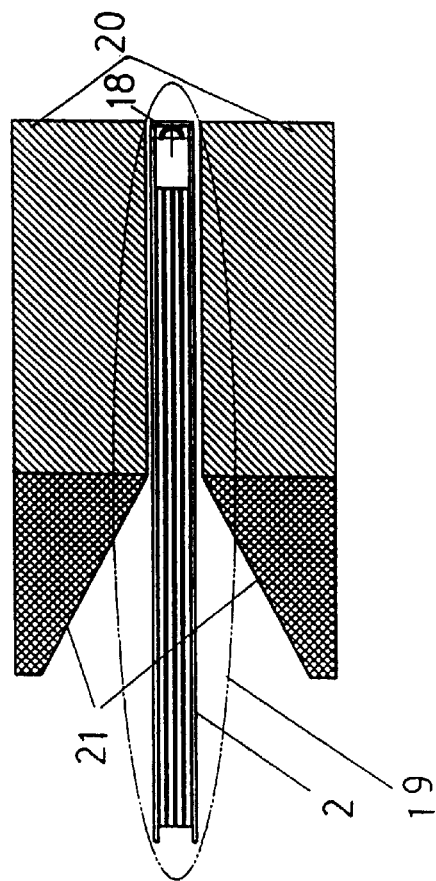
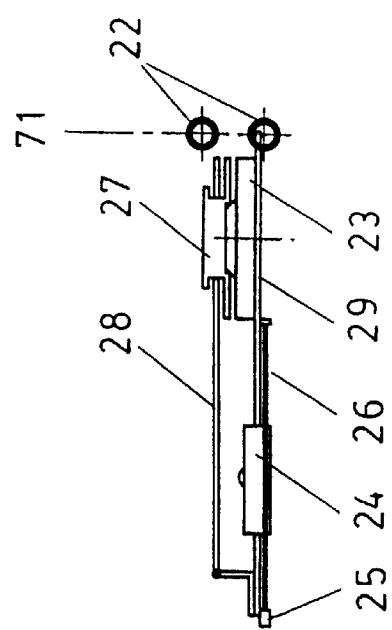

DISK STORAGE MAGAZINE AND RECORDING/REPRODUCING APPARATUS

FIELD OF THE INVENTION

The present invention relates to a disk storage magazine which stores a plurality of disks recorded or reproduced by light.

BACKGROUND OF THE INVENTION

A disk unit has been used widely for an audio disk and video disk or as a data storage unit for a computer, and it includes an optical disk unit or the like.

Optical disks include a disk capable of being recorded and reproduced, which is stored in a cartridge and is mainly used for data storage, and a disk dedicated to reproducing, which is used as the disk only, such as a music CD and a CD-ROM. As the digitization of AV equipment and the fulfillment of AV function of a computer advance at the same time, for the optical disk as well, a function as a widely used digital disk has been demanded for both of the AV equipment and the computer.

The configuration and operation of a conventional general auto changer recording/reproducing apparatus for an optical disk will be described below with reference to the drawings.

FIG. 51 is a perspective view showing a schematic shape of one example of a conventional disk storage magazine for storing disks capable of being recorded or reproduced by light. Reference numeral 101 denotes a disk capable of being recorded or reproduced, 102 denotes a magazine case for storing the disk 101, 103 denotes a partition on which the disk 101 is placed and which separates the disks 101 individually, 104 denotes an opening for the disk 101 to go into and out of the magazine case 102, 105 denotes a removal lever for removing the disk 101 stored in the magazine case 102, and 106 denotes a storage portion in which the disk 101 is stored in the magazine case 102.

Referring to FIG. 51, first, the disk 101 is inserted into the storage portion 106 through the opening 104 in the magazine case partitioned by the partitions 103, and is stored. At this time, the removal lever 105 provided at each of the storage portions 106 is pushed by the disk 101 and is moved to the inner side of the magazine case 102 in the direction of the arrow 201. Although ten storage portions 106 are provided in this example, the arbitrary number of disks 101, not more than ten, can be stored in the arbitrary storage portions 106.

The magazine case 102 having stored the disks 101 appropriately in this manner is inserted into a magazine holder (not shown) for holding the magazine case 102 in a recording/reproducing apparatus which records or reproduces the disk 101.

FIG. 52 is a perspective view showing the operation for removing the disk 101 stored in the magazine case 102 in order to effect recording or reproducing.

In FIG. 52, the disk 101 that is selected for recording or reproducing is taken as 101a. Reference numeral 107 denotes a pair of conveying rollers which are provided in the recording/reproducing apparatus to hold the disk 101a therebetween and to convey the disk 101a by rotation. The conveying rollers 107 are disposed near the opening 104 of the magazine case 102 inserted in the magazine holder (not shown) so that the axes thereof are located in the direction perpendicular to the removal direction of the disk 101. In FIGS. 51 and 52, the conveying rollers 107 move to a height of the disk 101a, and the removal lever 105 of the storage portion 106 in which the selected disk 101a is stored is pushed in the direction of the arrow 202 by a lever operating means (not shown) provided in the recording/reproducing apparatus. Then, the disk 101a pushed by the removal lever 105 is moved in the direction of the arrow 203, so that the disk 101a comes out of the magazine case 102. Subsequently, the disk 101a having come out is immediately held between the conveying rollers 107. The conveying rollers 107 rotate in the directions of the arrow 204 and the arrow 205 to convey the disk 101a in the direction of the arrow 206 and to move the disk 101a to the recording/reproducing position.

In recent years, the amount of data handled by information processing has increased more and more. Not only the package software has been made very large, but also on a personal computer, one file has come to handle several ten to several hundred megabytes or more, for example, for digital audio and digital video. As a storage place for such a large amount of data, an optical disk drive unit is effective, which unit has both of the facilities of a high recording capacity and a capability of changing a plurality of recording media. In particular, as a storage unit for large-scale database, an auto changer recording/reproducing apparatus for the optical disk has been developed. For the auto changer recording/reproducing apparatus, a magazine-type apparatus has often been used especially in the field of car audio considering the space efficiency.

Recent audio, video, and information equipment has made smaller and becomes of high capacity, and the magazine-type equipment is not exceptional. Because the magazine-type equipment stores many disks, it has a problem in that the distance between the adjacent disks is decreased in order to decrease the thickness of the whole magazine and to increase the number of disks per unit volume in the recording/reproducing apparatus.

However, in the above-described configuration, since a partition 103 is provided between the disks 101, the thicknesses of the partitions 103 are added to the thickness of the magazine case 102 by the number of disks 101 stored in the magazine case 102. In addition, in order to pull out the disk 101 through the opening 104, a clearance between the surface of the disk 101 and the partition 103 is needed in each tier as an operation margin for the pull-out operation. The dimensions of the clearances are added to the thickness of the magazine case 102 by the number of disks 101 stored in the magazine case 102.

For these reasons, the above-described configuration has a limitation in decreasing the distance between the adjacent disks 101, so that a hindrance is caused in decreasing the thickness of the whole magazine and in increasing the number of stored disks 101 per unit volume in the recording/reproducing apparatus.

The present invention has been made to solve the above problems, and accordingly an object thereof is to provide a disk storage magazine which can increase the number of stored disks per unit volume.

SUMMARY OF THE INVENTION

To solve the problems, the present invention provides a disk storage magazine comprising a magazine case capable of being opened and closed; and a disk holding member capable of holding a disk, at least a part of which is fixed and supported on the magazine case, characterized in that in the magazine case, the disk is held by the disk holding member in a densely stacked state, and the disk holding member changes the stacking interval of the disks in accordance with the opening/closing operation of the magazine case.

By this configuration, the number of stored disks per unit volume of the disk storage magazine can be increased.

The disk storage magazine of the basic aspect of the present invention comprises a magazine case capable of being opened and closed; and a disk holding member capable of holding a disk, at least a part of which is fixed and supported on the magazine case, wherein inside the magazine case, the disk is held by the disk holding member in a densely stacked state, and the disk holding member changes the stacking interval of the disks in accordance with the opening/closing operation of the magazine case. In this configuration, the disk holding member is formed so that a clearance in the stacking direction between the disk and the disk holding member at the time when the disks are loaded is made smaller than the conventional clearance or the clearance itself is eliminated. Thereby, when the magazine case is closed, a stacking interval between the disks can be decreased as compared with the conventional disk storage magazine, so that the number of stored disks per unit volume of the disk storage magazine can be increased. When the disk is inserted or removed, the magazine case is opened to increase the stacking interval between the disks, by which the clearance in the stacking direction between the disk and the disk holding member can be maintained, so that a trouble in inserting or removing the disk can be prevented.

Also, the opening operation or the closing operation of the magazine case is performed by an urging force of a spring member added to the magazine case. By this configuration, the magazine case can be opened or closed easily by the urging force of the spring member without applying an external force from the outside of the magazine case.

Also, the disk holding member is an elastic member, and the opening operation or the closing operation of the magazine case is performed by a spring force of the elastic member. By this configuration, the magazine case can be opened or closed easily by the spring force of the elastic member without applying an external force from the outside of the magazine case.

Also, a locking mechanism for keeping the closed state or the opened state of the magazine case is added. By this configuration, the closed state or the opened state of the magazine case can be kept surely by means of the locking mechanism.

Also, soft coating having a surface hardness lower than the surface hardness of the disk is applied onto at least a face for holding the disk of the disk holding member. By this configuration, when the disk is held by the disk holding member, the soft coating portion is brought into contact with the disk, so that the disk is prevented from being scratched.

The present invention of a second aspect provides a disk storage magazine capable of being opened in a folding fan-like manner and closed around a turning axis. This disk storage magazine comprises a magazine case capable of being opened and closed, which is made up of a first cover member and a second cover member; and a disk holding member capable of holding a disk, at least a part of which is fixed and supported on the first cover member and the second cover member, wherein inside the magazine case, the disk is held by the disk holding member in a densely stacked state; by relatively turning the first and second cover members with respect to a turning axis provided at the ends of the cover members, the magazine case is opened or closed; and the disk holding member changes the stacking interval of the disks in accordance with the opening/closing operation of the magazine case. By this configuration, the turning axis for relatively turning the first and second cover members is arranged on the side opposite to the disk removal side, so that the disk can be removed from the magazine case by increasing the disk intervals only on the disk removal side without increasing the disk intervals on the opposite side.

In a disk storage magazine that further concretizes the above-described configuration of the second aspect, the disk holding member comprises an expandable bellows-like plate member having a plurality of substantially V-shaped portions; the substantially V-shaped portion holds the outer peripheral edge of each end of the disk located substantially in parallel with the turning axis and substantially in the diameter direction of the disk; the expanding/contracting direction of the plate member is substantially the same as the turning direction of the first and second cover members; and the vertical length between adjacent pointed tips of the substantially V-shaped portion is changed by moving the plate member in a folding fan-like manner in accordance with the opening/closing turning operation of the magazine case in order to enable the stacking interval of the disks to change around the turning axis and the disk to move in the direction perpendicular to the turning axis, whereby the disk is inserted into and removed from the magazine case. By this configuration, when the magazine case is opened, the vertical length between adjacent pointed tips of the substantially V-shaped portion is increased in a folding fan-like manner, so that the disk interval is increased only on the disk removal side, and the insertion and removal of the disk are made easy.

Also, a part of the substantially V-shaped portion other than both end portions in the insertion/removal direction of the disk is torn. By this configuration, when the disks are held in a stacked manner at the substantially V-shaped portion of the disk holding member, the magazine case is closed, and each disk is brought into close contact with the plate member of the disk holding member, at the bend portion of the disk holding member comprising the plate member that has been bent from a flat material, a restoring force to the original flat state is decreased, and the bend portion presses the disk, by which a force for pushing to spread the both surfaces of the magazine case from the inside can be restrained. Therefore, unnecessary deformation of the magazine case can be prevented.

Further, the substantially V-shaped portion is configured so that untorn portions do not exist in a plane region produced by vertically projecting the disk in a state of being stored in the magazine case. By this configuration, when the disks are held in a stacked manner at the substantially V-shaped portion of the disk holding member, the magazine case is closed, and each disk is brought into close contact with the plate member of the disk holding member, at the bend portion of the disk holding member comprising the plate member that has been bent from a flat material, a restoring force to the original flat state is further decreased, and the bend portion presses the disk, by which a force for pushing to spread the both surfaces of the magazine case from the inside can further be restrained. Therefore, unnecessary deformation of the magazine case can further be prevented.

Also, the disk holding member is configured so that at least a part of the disk is moved so as to deviate from a plane region produced by vertically projecting the magazine case in accordance with the opening operation of the magazine case, and the disk is moved into the projected plane region in accordance with the closing operation. By this configuration, when the magazine case is opened, at least a part of the disk deviates from the projected plane region of the magazine case, so that the insertion and removal of the disk is further made easy.

Also, the disk holding member has a disk holding elastic portion for holding the disk therebetween which is provided on the side of a turning center of the first cover member and the second cover member. By this configuration, when the disk storage magazine is opened in a recording/reproducing apparatus which records or reproduces the disk, for example, even if the disk is subjected to a gravitational force or an impulsive force to the disk coming-off side, the disk is prevented from coming off inadvertently from the disk storage magazine. The disk is prevented from coming off inadvertently from the disk storage magazine without giving an effect on the inserting/removing operation of the disk into/from the disk holding member. Further, the disk holding elastic portion is a part of the disk holding member. Thereby, the disk holding elastic portion need not be provided separately from the disk holding member, so that the number of parts can be decreased.

Also, the disk holding member is configured so that the first or second cover member is provided with an engagement portion which has a slit-shaped opening on a straight line passing through the center of the disk and in parallel with the movement direction of the disk, and engages with the opening to keep the disk holding member. By this configuration, since the disk holding member has a portion restrained with respect to the first cover member or the second cover member in the disk stacking direction, when the first cover member and the second cover member are opened/closed relatively, the bellows-like portion of the disk holding member can contract immediately in accordance with the opening/closing operation. Also, since the disk holding member has a degree of freedom with respect to the first cover member and the second cover member in the disk insertion/ removal direction, the disk holding member can sufficiently increase or decrease the disk intervals in the stacking direction without causing a hindrance to the movement of the disk holding member in the magazine case. Therefore, a hindrance to the insertion/removal of the disk into/from the disk holding member can be prevented.

Further, the engagement portion is accommodated in a cylindrical space formed by a center hole of the disk in the state in which the magazine case is closed. By this configuration, the engagement portion, which engages the disk holding member with the first cover member or the second cover member in the disk stacking direction, is accommodated in the cylindrical space formed by the center hole of the disk when the magazine case is closed, so that there is no effect of the addition of the engagement portion on the dimensions of the magazine case.

Also, the magazine case is provided with a disk discharge spring member for giving an urging force to the disk holding member in a direction in which the disk is deviated from the projected plane region of the magazine case. By this configuration, the disk holding member positively discharges the disk independently without relying on only a mechanism in connection to the opening operation of the magazine case, so that the disk can be discharged surely from the magazine case without relying on the state of the mechanism in connection to the opening operation of the magazine case. Also, the disk discharge spring member is a compression coil spring, or a torsion coil spring, or a plate spring. Thereby, the disk discharge spring member can be made in a simple shape. Further, the disk discharge spring member is a part of the disk holding member. Thereby, the disk discharge spring member need not be provided separately from the disk holding member, so that the number of parts can be decreased. Further, the disk discharge spring member presses the disk holding member at one or more positions symmetrical with respect to a direction in which the disk holding member deviates from the projected plane region of the magazine case. Thereby, a force can be applied to the disk holding member in the discharge direction without deviating. Therefore, an unnecessary resisting force is not produced, so that the disk holding member can be discharged from the magazine case in a stable posture.

Also, the magazine case is provided with an opening/closing spring member for giving an urging force in a direction in which an angle formed between the first cover member and the second cover member with respect to the turning axis of the first cover member and the second cover member is decreased, or in a direction in which the angle is increased; and the opening/closing spring member gives an urging force in the direction of decreasing the angle when the magazine case is closed, and gives an urging force in the direction of increasing the angle when the magazine case is open. By this configuration, when the magazine case is closed completely, the closed state can be maintained stably, and when the magazine case is opened completely, the opened state can be maintained stably. Therefore, the state can be maintained without giving a special action from the outside of the disk storage magazine.

Also, the opening/closing spring member has a protruding spring portion the base end of which is fixed and supported on either of the first cover member and the second cover member, the tip end of which is deformed in the direction substantially perpendicular to the turning axis, and which has a convex component; the first cover member or the second cover member on which the opening/closing spring member is not fixed and supported has a protruding portion having a convex component in the direction perpendicular to the turning axis; and the protruding portion presses the protruding spring portion at least once during the turning operation of the first cover member with respect to the second cover member to deform the opening/closing spring member, by which the protruding portion passes through. By this configuration, the displacement direction of the opening/closing spring member is made in parallel with the movement direction when the disk holding member deviates from the projected area of the magazine case. Therefore, a space used in the disk stacking direction can be decreased, so that the dimension in the disk stacking direction of the whole of the disk storage magazine can be reduced. Also, the opening/closing spring member is a compression coil spring, or a torsion coil spring, or a plate spring. Thereby, the disk discharge spring member can be made in a simple shape. Also, the opening/closing spring member is provided at one or more positions symmetrical with respect to a direction in which the disk holding member deviates from the projected plane region of the magazine case. Thereby, the opening/closing spring member does not give a deviated opening/closing force to the magazine case, so that an unnecessary resisting force is not produced. Therefore, a steady opening/closing operation can be performed.

The present invention of a third aspect provides a disk storage magazine capable of being opened/closed in parallel vertically. The disk holding member comprises an expandable bellows shaped plate member having a plurality of substantially V-shaped portions; the substantially V-shaped portion holds the outer peripheral edge of each end of the disk located substantially in the diameter direction of the disk; the expanding/contracting direction of the plate member is caused to substantially agree with the stacking direction of the disks; and the vertical length between adjacent pointed tips of the substantially V-shaped portion is changed by moving said plate member in a folding fan-like manner in accordance with the opening/closing operation of the magazine case, by which the stacking interval of the disks is changed and the movement of the disk in the direction perpendicular to the diameter direction is made possible, whereby the disk is inserted into and removed from the magazine case. By this configuration, since the disk holding member comprises the expandable bellows shaped plate member having the plurality of substantially V-shaped portions, the V-shaped portion is interposed between the adjacent disks when the disks are stored, so that the disks are stored properly while the rubbing between the disks is prevented.

Next, the present invention of a fourth aspect provides a recording/reproducing apparatus into which the disk storage magazine is incorporated. This recording/reproducing apparatus comprises: a disk storage magazine and at least one recording/reproducing head for recording or reproducing data on a disk, and is characterized in that there are provided magazine opening/closing means for opening/closing a magazine case of the disk storage magazine, and disk conveying means for conveying one disk from the opened magazine case to a position of the recording/reproducing head while holding it therebetween. By this configuration, by driving the magazine opening/closing means and the disk conveying means, a desired disk can be selected from the disk storage magazine easily with a simple configuration when the disk stored in the disk storage magazine configured as described above is recorded or reproduced.

The present invention of the final fifth aspect also provides a recording/reproducing apparatus into which the disk storage magazine is incorporated. This recording/reproducing apparatus comprises: a disk storage magazine including a magazine case made up of a first cover member and a second cover member; a plurality of disks held in the magazine case in a densely stacked state when the magazine case is closed; and a disk holding member at least a part of which is fixed and supported on the first cover member and the second cover member, wherein the magazine case is opened and closed by relatively turning the first and second cover members around a turning axis provided at the ends of the first and second cover members, and the disk holding member is configured so that the stacking interval of the disks is changed in accordance with the opening/closing operation of the magazine case, a first holder for substantially fixedly placing the closed magazine case, moving means for moving the disk storage magazine to the opening side thereof by a predetermined distance, a second holder for substantially fixedly placing the first and second cover members in the state in which the magazine case is open at a position to which the disk storage magazine is moved by the predetermined distance, at least one recording/reproducing head for recording or reproducing data on the disk, and disk conveying means for conveying one disk to the position of the recording/reproducing head while holding it therebetween. By this configuration, merely by moving the disk storage magazine from the position of the first holder to the position of the second holder without drawing it from the stored location by the total length, the magazine case can be opened to increase the disk intervals. Also, the dimension in the disk removal direction of the recording/reproducing apparatus can be decreased, and the magazine case can be kept stably in the closed state or the opened state without completely separating the first and second cover members.

Also, when any one of the plurality of disks is recorded or reproduced, the second holder is turned in the stacking direction of the disks to select the disk in the state in which the disk storage magazine is open. By this configuration, since the second holder is turned in the stacking direction of the disks to select the disk, the disk conveying means need not be moved in the disk stacking direction, so that the configuration of the disk conveying means can be simplified.

Further, when any one of the plurality of disks is recorded or reproduced, the disk conveying means is turned in the stacking direction of the disks to select the disk in the state in which the disk storage magazine is open. By this configuration, since the disk conveying means is turned in the stacking direction of the disks to select the disk, the disk storage magazine need not be turned in the disk stacking direction, so that turning means for the disk storage magazine need not be provided.

BRIEF DESCRIPTION OF THE DRAWINGS

FIG. 14 is a schematic view showing the operation of a disk storage magazine in accordance with an embodiment of the present invention;

DESCRIPTION OF THE EMBODIMENTS

Embodiments of a disk storage magazine in accordance with the present invention will now be described with reference to the accompanying drawings.

First, the configuration of a disk storage magazine in accordance with an embodiment will be explained.

Figure 1:
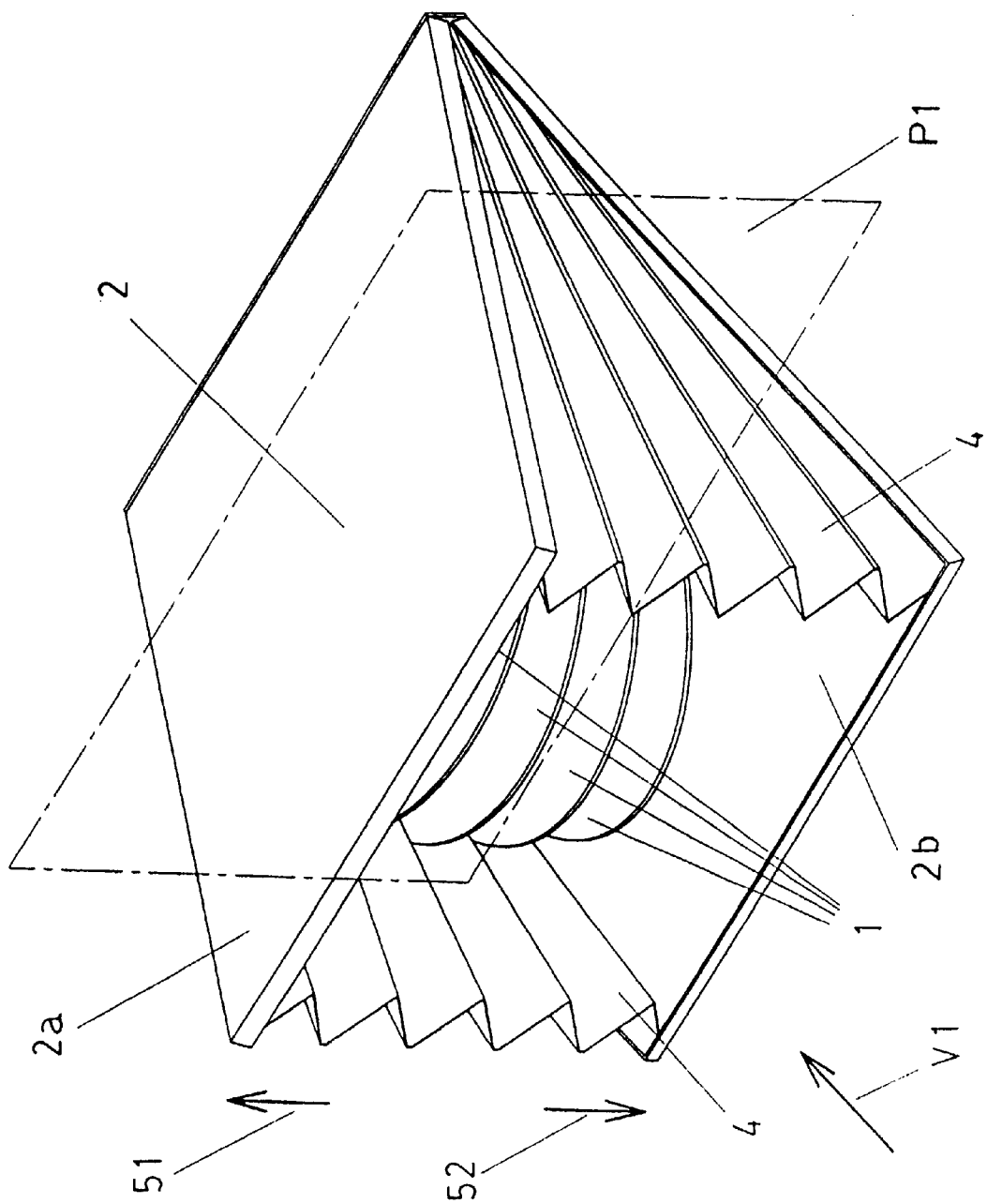
FIG. 1 is a basic conceptual view of a disk storage magazine in accordance with an embodiment of the present invention.
Figure 2:
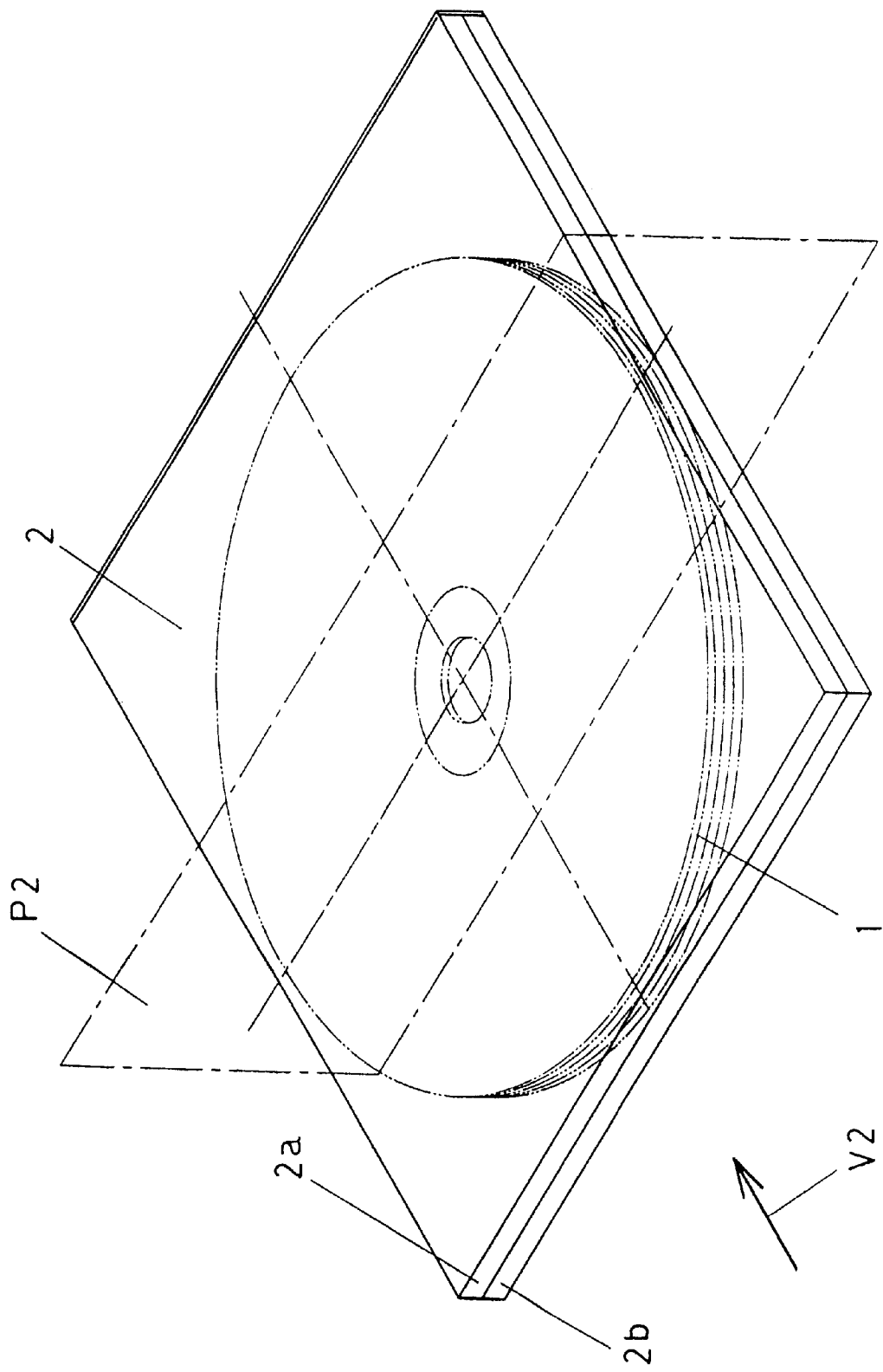
FIG. 2 is a schematic appearance view of a disk storage magazine in accordance with an embodiment of the present invention.

FIG. 1 is a basic conceptual view of a disk storage magazine of this embodiment. The disk storage magazine of this embodiment is of an openable type as shown in FIG. 1. FIG. 2 is a schematic appearance view of the closed disk storage magazine of this embodiment.

In FIGS. 1 and 2, reference numeral 1 denotes a disk recorded or reproduced by light, for example, a phase change recording system, 2 denotes a magazine case for storing the disk 1. This magazine case 2 comprises an upper plate 2a and a lower plate 2b, each of which is turned in the direction of the arrow 51 and the arrow 52, by which the magazine case 2 can be opened. The material of the magazine case 2 is a resin suitable for a structure, such as ABS, polycarbonate, or polystyrene. Reference numeral 4 denotes a disk holding member for holding the disk 1 in the magazine case 2.

Figure 3:
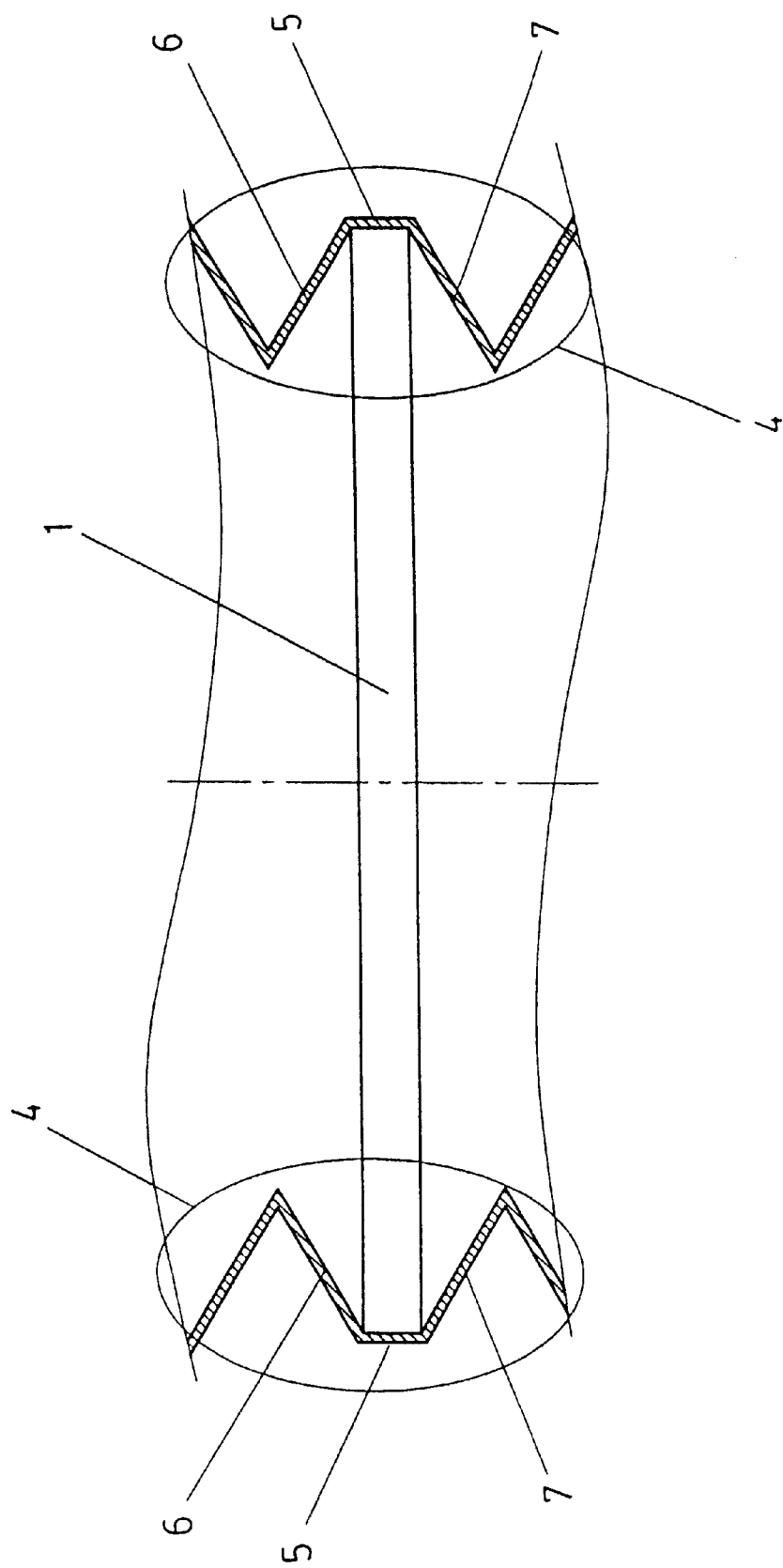
FIG. 3 is a partially sectional view of a disk storage magazine in accordance with an embodiment of the present invention.
Figure 4:
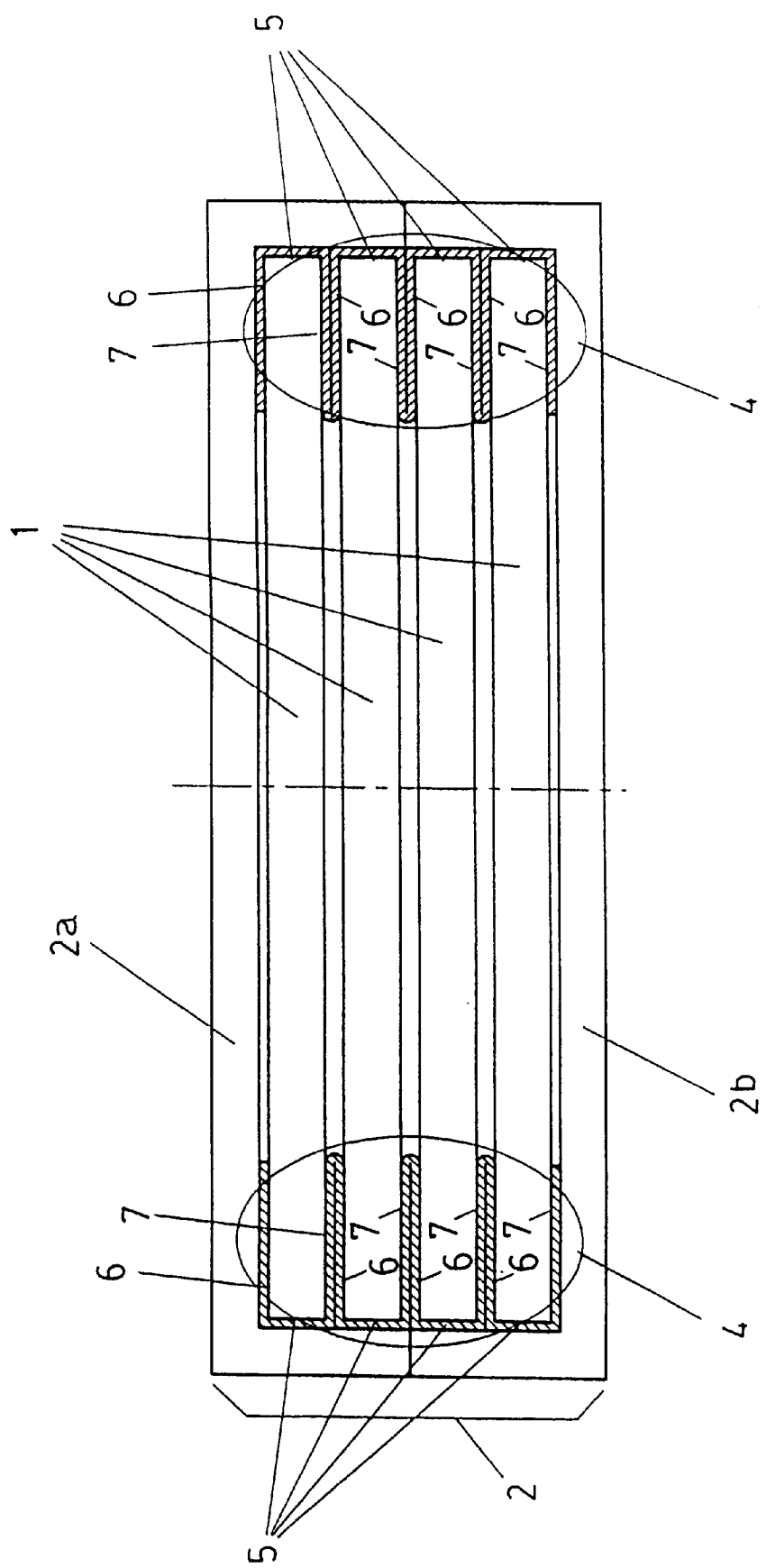
FIG. 4 is a partially sectional view of a disk storage magazine in accordance with an embodiment of the present invention.

A state of the disk 1 held by the disk holding members 4 is shown in FIG. 3 by a partially sectional view taken from the cross section cut in the plane P1 in FIG. 1 and projected from the direction of the arrow V1. FIG. 4 is a partially sectional view showing a state of the disks 1 held by the disk holding members 4, in which a cross section cut in the plane P2 shown in FIG. 2 is projected from the direction of the arrow V2.

The disk holding members 4, which are formed of a flexible material such as polyethylene resin, are arranged in a pair substantially in parallel with each other on both sides of the magazine case 2 as shown in FIG. 1. The disk holding member 4 is bent into a bellows shape, having a shape so as to be expanded and contracted in the stacking direction of the disks 1. As shown in FIG. 3, at the folding portion corresponding to the peak of bellows on the outside of the magazine case 2, there is provided a holding face 5 substantially in parallel with the outer peripheral face of the disk, the holding face 5 having a length substantially corresponding to the thickness of the disk 1. Also, tapered faces 6 and 7 are provided adjacently at both ends of the holding face 5.

When the magazine case 2 is open, as shown in FIG. 3, each disk 1 is held by the holding faces 5 in a state in which an edge of the outer periphery of the disk 1 is held between the tapered faces 6 and 7.

When the magazine case 2 is closed, as shown in FIG. 4, the disk holding member 4 contracts into a bellows shape, and tapered faces 6 and 7 become substantially in parallel with each other and abut on the surface of the held disk 1. Thereby, the disk 1 has no looseness with respect to the disk holding member 4 when the magazine case 2 is closed. Therefore, rubbing does not occur between the disk 1 and the disk holding member 4 or between the disks 1, by which the disk 1 is prevented from being scratched by rubbing.

Also, since a clearance in the stacking direction between the disk 1 and the disk holding member 4, which is provided when the disks are stacked, is unnecessary, the stacking interval between the disks 1 when the magazine case 2 is closed can be made smaller than before. Therefore, while the number of stored disks per unit volume of the disk storage magazine can be increased, when the disk 1 is inserted or removed, a clearance in the stacking direction between the disk 1 and the disk holding member 4 can be kept by opening the magazine case 2 and by spreading the stacking interval between the disks 1, so that a trouble in inserting and removing the disk 1 can be prevented. Also, at the time of the opening operation of the magazine case 2, the disk holding member 4 is unfolded into a fan shape, so that the disk 1 can be inserted or removed easily.

To prevent scratching on the surface of the disk 1, soft coating having a surface hardness lower the surface of the disk 1 is applied on the surface of the disk holding member 4. Alternatively, the material of the disk holding member 4 may be made a material having a surface hardness lower than the surface of the disk 1. Thereby, while scratching on the surface of the disk 1 is prevented, the disk 1 can be stored properly.

Figure 5:
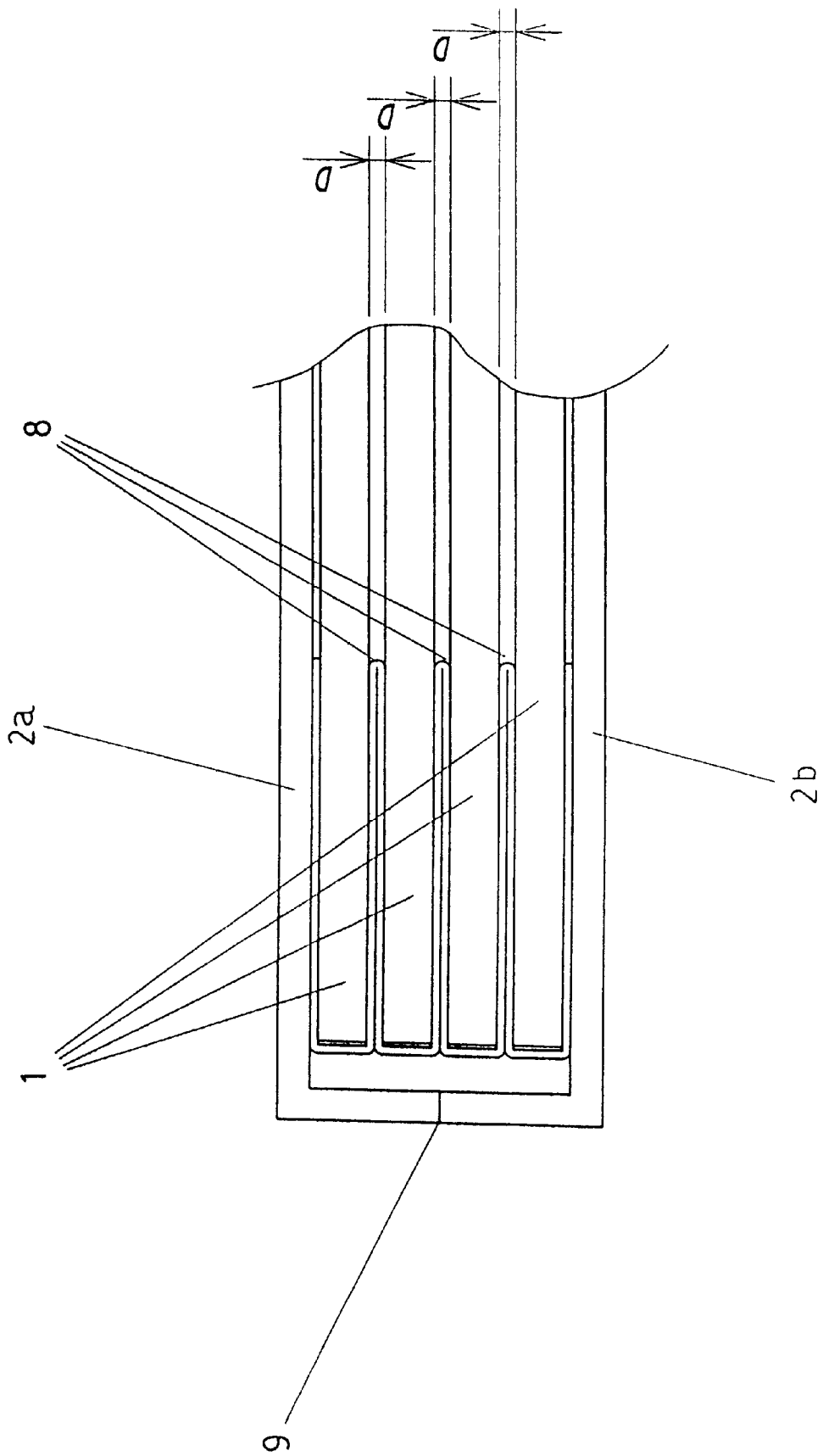
FIG. 5 is a partially sectional view of a disk storage magazine in accordance with an embodiment of the present invention.
Figure 6:
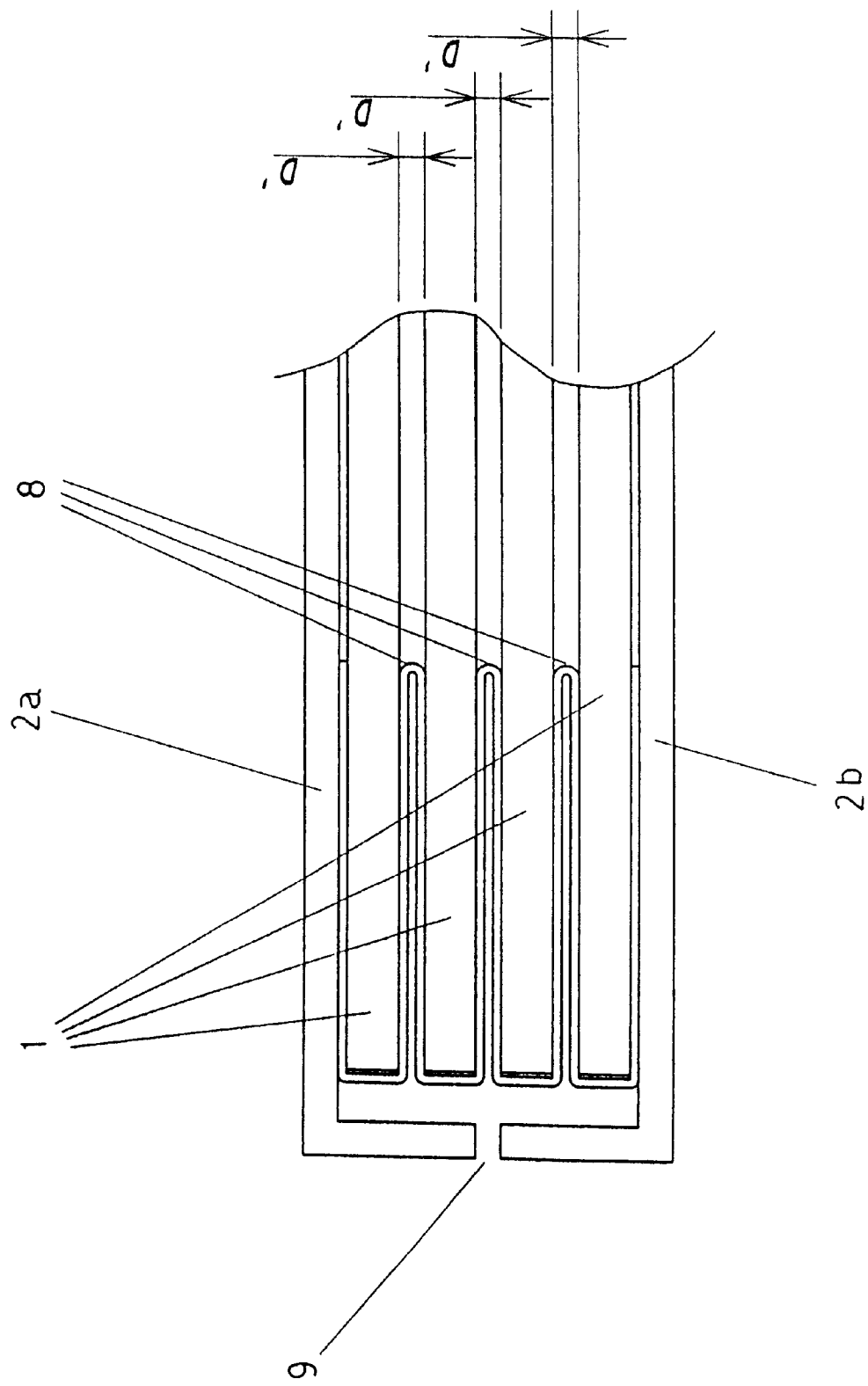
FIG. 6 is a partially sectional view of a disk storage magazine in accordance with an embodiment of the present invention.
Figure 7:
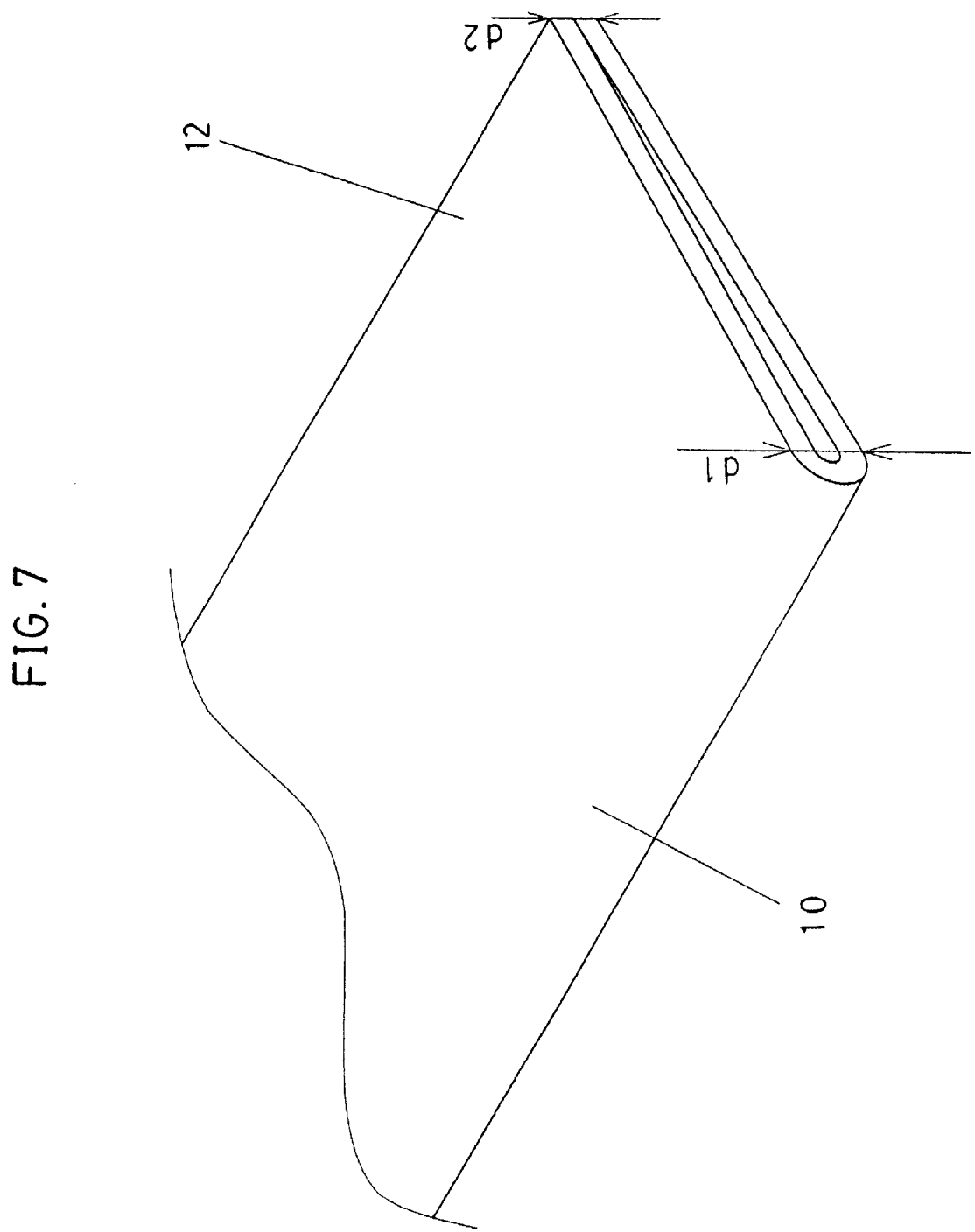
FIG. 7 is a partial shape view of a disk storage magazine in accordance with an embodiment of the present invention.
Figure 8:
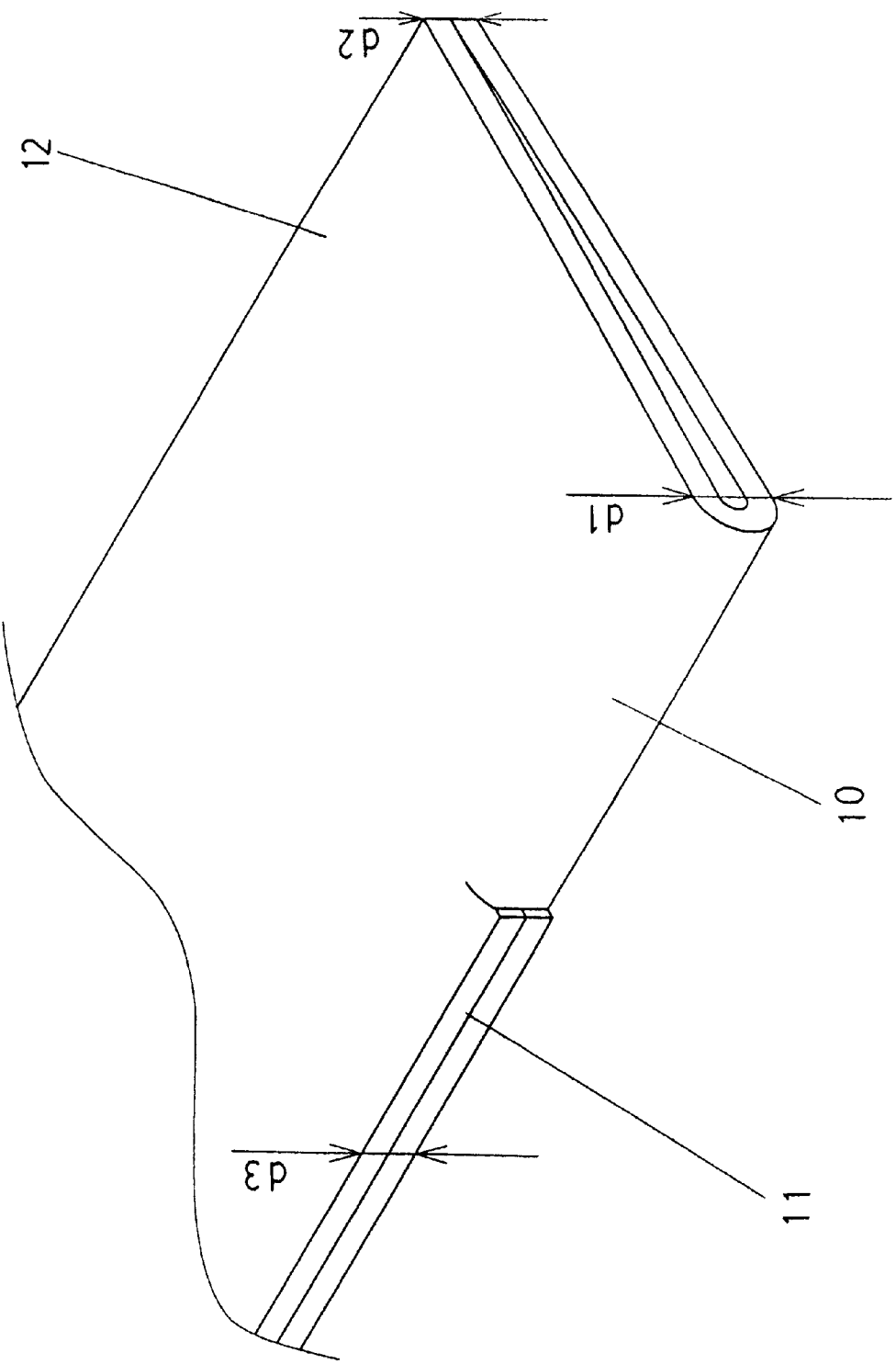
FIG. 8 is a partial shape view of a disk storage magazine in accordance with an embodiment of the present invention.

FIGS. 5 and 6 are detailed view of a part of a cross section of disks 1 held by the disk holding members 4, in which the cross section in the plane P2 shown in FIG. 2 is projected from the direction of the arrow V2. FIG. 7 is a view of an extracted part of a bend portion of the disk holding member 4. When the magazine case 2 is closed, as shown in FIG. 5, it is ideal that a bend portion 8 of the disk holding member 4 is bent in a completely touching state, and the dimension D between the adjacent disks 1 is equal to the thickness of two disk holding members 4. Actually, however, it is very difficult to establish the bent state as shown in FIG. 5. As shown in FIG. 6, some swell is produced at the bend portion 8, and the dimension D' between the adjacent disks 1 becomes a dimension such that the swell of the bend portion 8 is added to the thickness of two disk holding members 4. Therefore, a force acts in the direction in which the bellows state of the disk holding member 4 is expanded, and pushes to spread the upper plate 2a and the lower plate 2b each other. For this reason, although in the ideal state as shown in FIG. 5, a joining portion 9 of the upper plate 2a and the lower plate 2b joins substantially surely, actually a gap is produced at the joining portion 9 as shown in FIG. 6. The swelling state of the bend portion 8 is a state as shown in FIG. 7. The total thickness d1 at the portion of a curved surface 10 formed at the bend portion 8 is larger than the total thickness d2 at the portion of a non-curved surface 12 formed at a portion where the bend portion 8 is absent. Therefore, if as shown in FIG. 8, a torn portion is provided at a portion denoted by reference numeral 11 of the curved surface 10, the total thickness d3 at the torn portion 11 can be decreased to a thickness approximately equal to the total thickness d2 at the portion of the non-curved surface 12. By utilizing this effect, the amount of swell as described above can be reduced. As the torn portion is made as long as possible, the effect appears more greatly.

Figure 9:
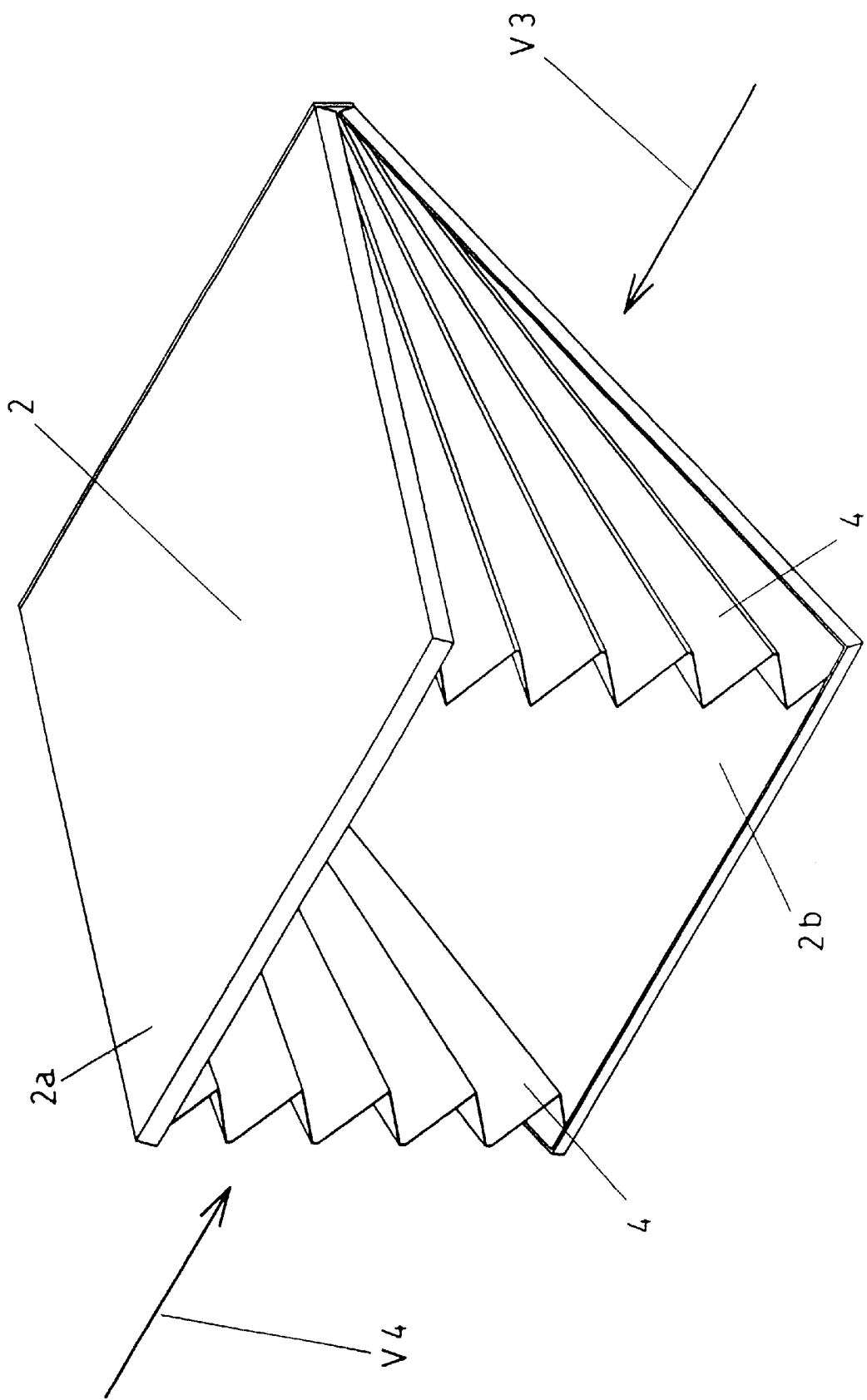
FIG. 9 is a schematic appearance view of a disk storage magazine in accordance with an embodiment of the present invention.
Figure 10:
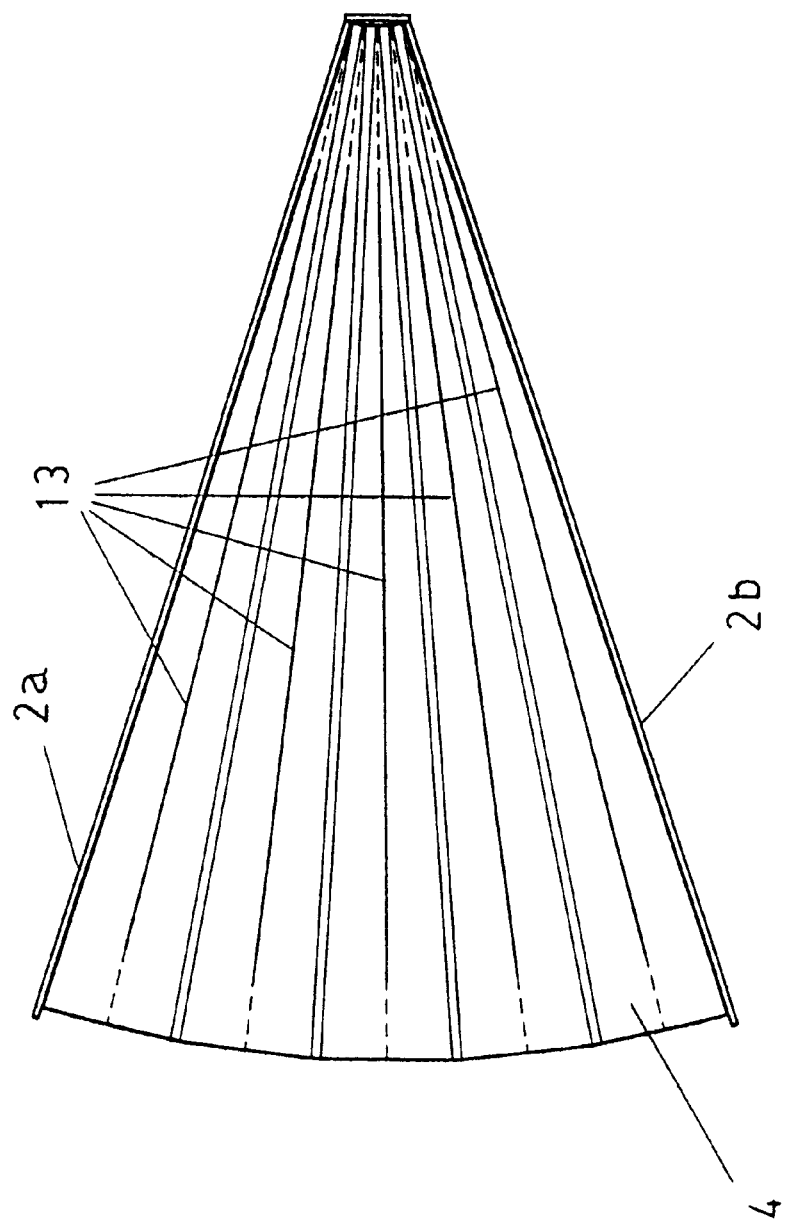
FIG. 10 is a view taken in the direction along an arrow of a specific portion of a disk storage magazine in accordance with an embodiment of the present invention.
Figure 11:
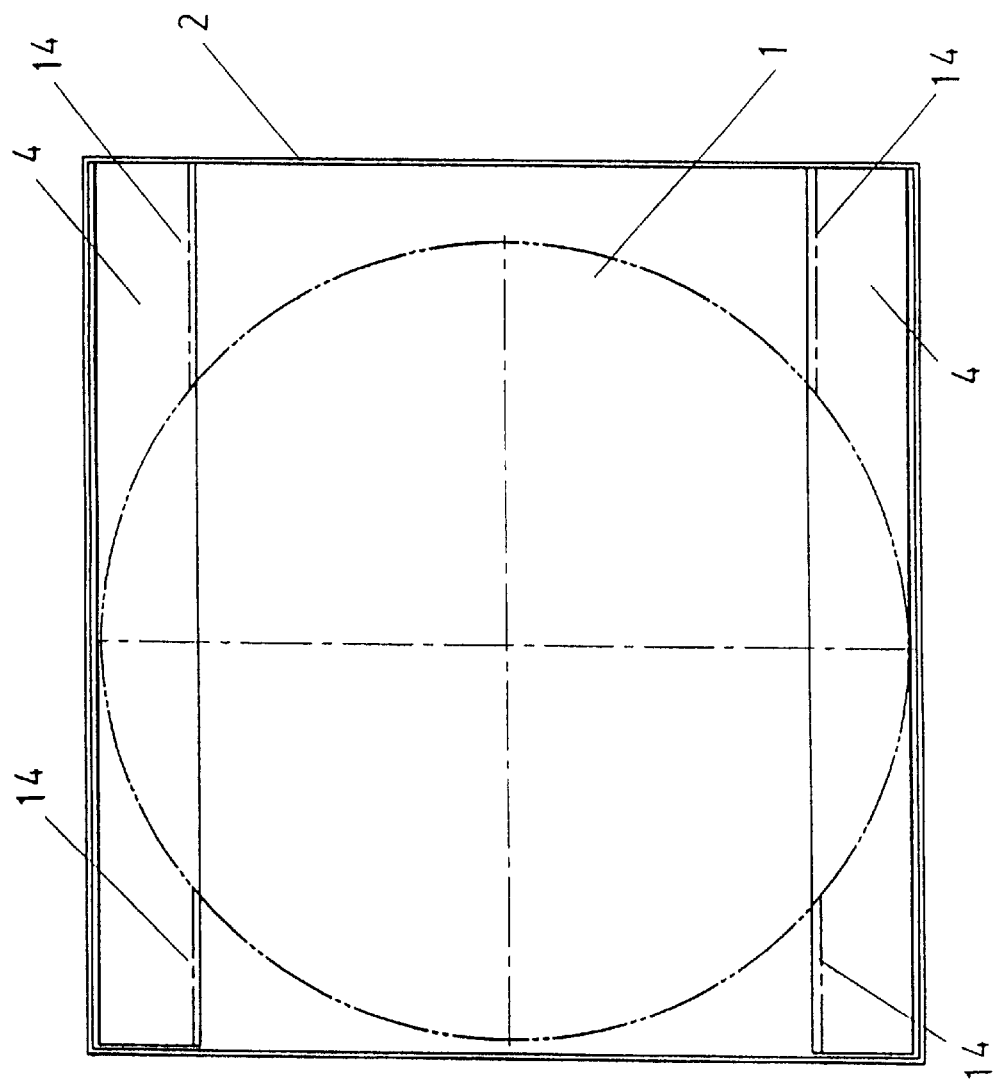
FIG. 11 is a plan view of a specific portion of a disk storage magazine in accordance with an embodiment of the present invention.

FIG. 9 is an appearance view showing a state in which the disks 1 are not stored in FIG. 1. FIG. 10 is a view taken in the direction of the arrow V3 of FIG. 9. The shape viewed in the direction of the arrow V4 of FIG. 9 is a shape symmetrical with the shape shown in FIG. 10. FIG. 11 is a plan view showing a mutual relation between the disk 1 and the disk holding member 4. In this embodiment, in order to decrease the swell produced as a whole as described above, torn portions are provided at the solid-line portions indicated by reference numeral 13 in FIG. 10, excluding a part at each end of the folding portion corresponding to the peak of bellows on the inside of the magazine case 2. If this torn portion 13 is provided at the whole portion except a portion indicated by reference numeral 14 in FIG. 11, located on the outside of the outer periphery of the disk 1, the bend portion is not present at the portion pressed by the disk 1 when the disk storage magazine is closed. Therefore, the interval between the disks 1 is not pushed, and spread by the swell of the bend portion. This configuration is ideal, so that this embodiment is configured in this manner.

By this configuration, a force acting in the direction in which the bellows state of the disk holding member 4 is expanded is decreased, so that the upper plate 2a and the lower plate 2b are pushed and spread with difficulty. Thereby, the bellows state becomes an ideal state as shown in FIG. 5, and the joining portion 9 of the upper plate 2a and the lower plate 2b can be joined substantially surely.

To prevent scratching on the surface of the disk 1, soft coating having a surface hardness lower than the surface hardness of the disk I is applied onto the surface of the disk holding member 4. Alternatively, the material of the disk holding member 4 may be made a material having a surface hardness lower than the surface of the disk 1. Thereby, while scratching on the surface of the disk 1 is prevented, the disk 1 can be stored properly.

Figure 12:
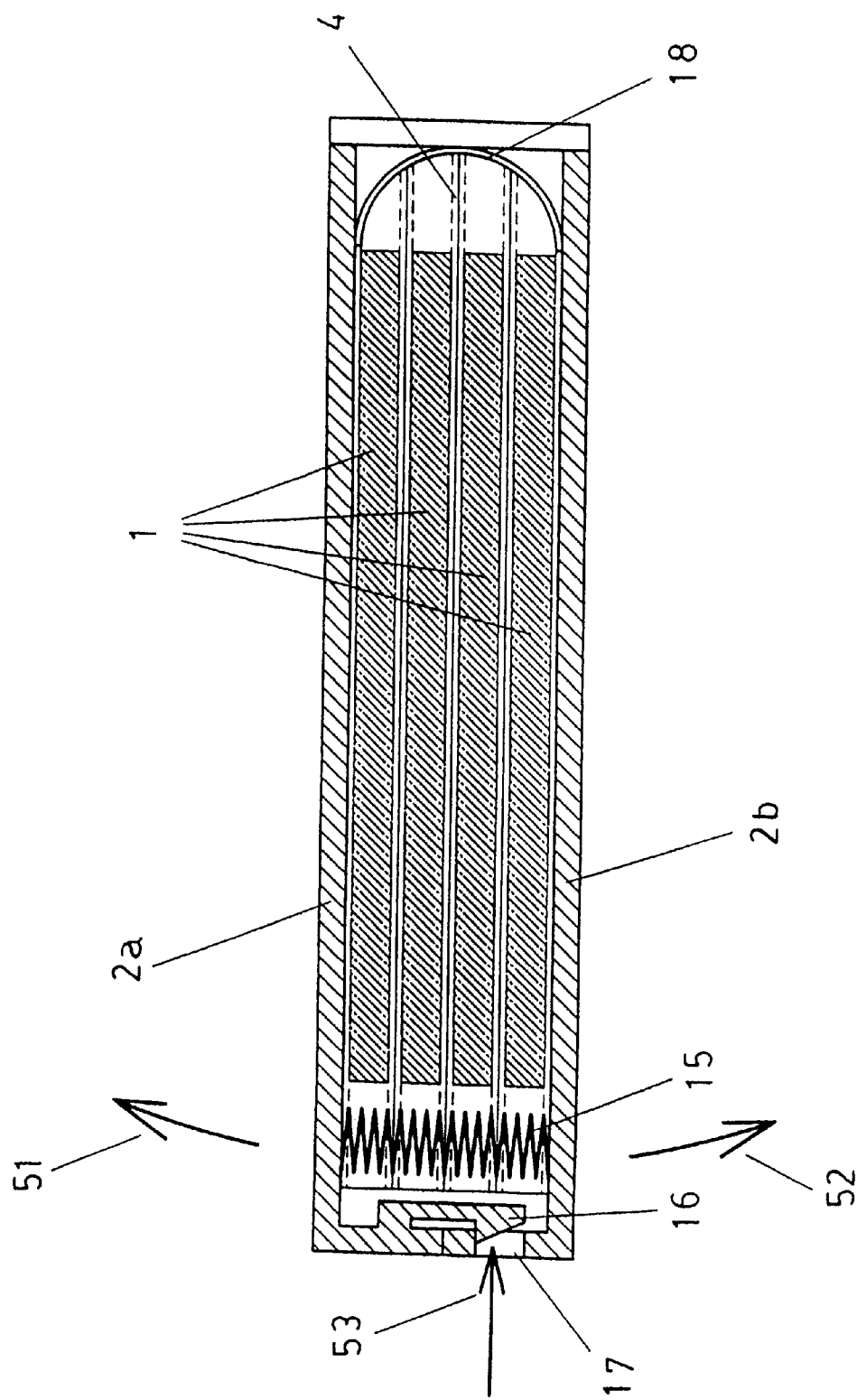
FIG. 12 is a schematic view showing the configuration and operation of a disk storage magazine in accordance with an embodiment of the present invention.
Figure 13:
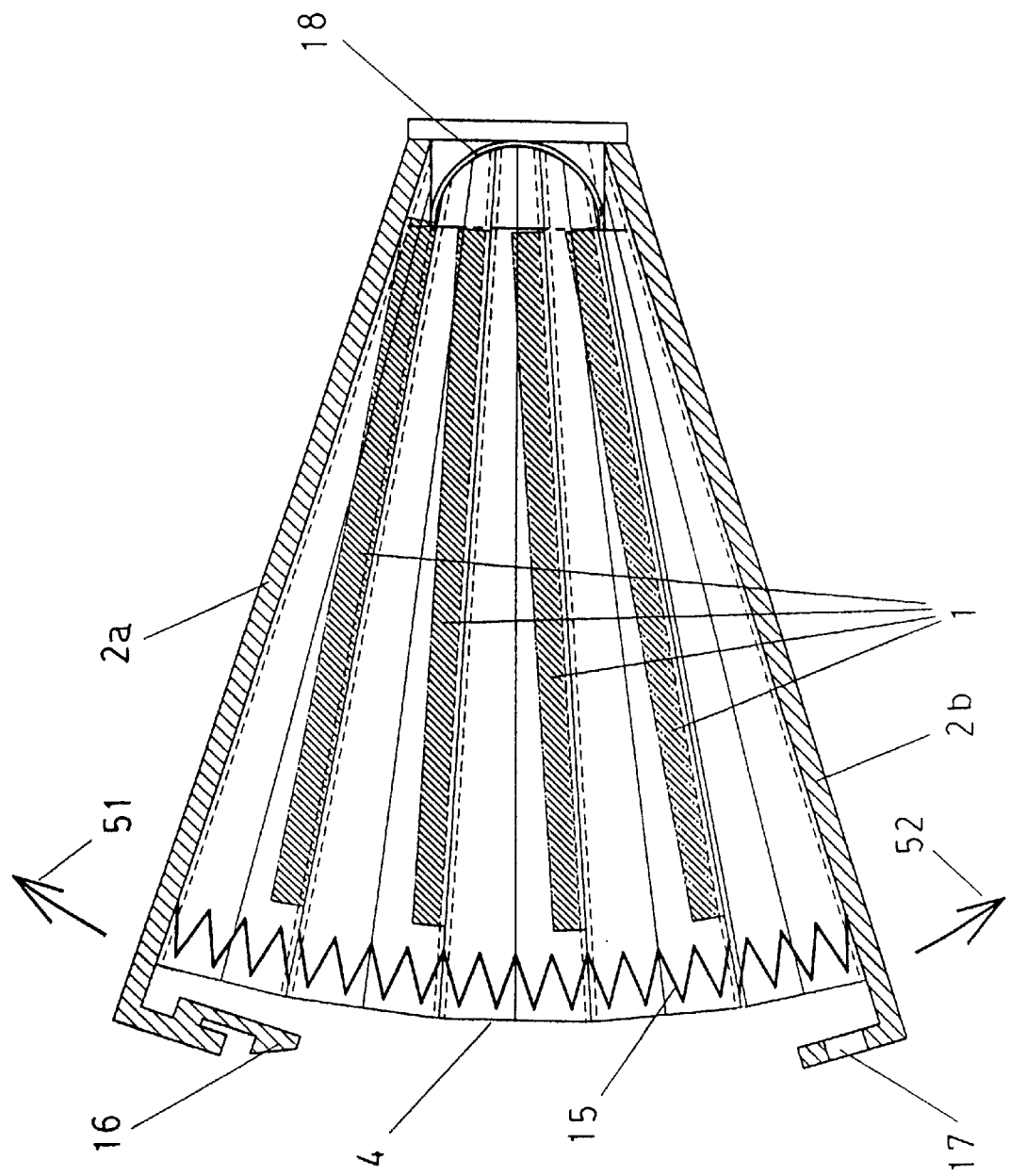
FIG. 13 is a schematic view showing the configuration and operation of a disk storage magazine in accordance with an embodiment of the present invention.

FIGS. 12 and 13 are schematic views showing the configuration and operation of an urging mechanism for giving an urging force in the direction in which the magazine case 2 is opened in this embodiment, and a locking mechanism for preventing the opening when the magazine case 2 is closed. In FIGS. 12 and 13, reference numeral 15 denotes a spring member such as a compression coil spring which gives an urging force in the direction in which the magazine case 2 is opened to the upper plate 2a and the lower plate 2b, 16 denotes a lock claw for preventing the opening when the magazine case 2 is closed, and 17 denotes a lock hole which engages with the lock claw 16 to prevent the opening of the magazine case 2. Also, reference numeral 18 denotes a bearer which is supported on the turning center axis for turning the whole of the magazine case 2 when the magazine case 2 is opened to select a specific disk 1. The bearer 18 will be described in the later explanation of the placing of the disk in a recording/reproducing apparatus.

As shown in FIG. 12, when the magazine case 2 is closed, the lock claw 16 engages with the lock hole 17, preventing the upper plate 2a and the lower plate 2b of the magazine case 2 from turning in the direction of the arrows 51 and 52 and opening, by which the locking state is maintained. The spring member 15 is compressed, and gives an urging force in the direction in which the upper plate 2a and the lower plate 2b are turned in the direction of the arrows 51 and 52.

In order to open the magazine case 2, the lock claw 16 is pushed in the direction of the arrow 53 by a lock claw releasing mechanism (not shown), and is released from the lock hole 17, so that the locking state of the upper plate 2a and the lower plate 2b is released. Therefore, as shown in FIG. 13, the upper plate 2a and the lower plate 2b, to which an urging force for turning is given by the spring member 15, are opened. At this time, the disk holding members 4 expand into a bellows shape.

By this configuration, the magazine case 2 can be opened easily by the urging force of the spring member 15 only by releasing the lock claw 16 of the magazine case 2 without applying an external force in the direction of opening the magazine case 2. Also, by the locking mechanism comprising the lock claw 16 and the lock hole 17, the magazine case 2 can surely be kept in the closed state or the opened state.

Without the use of the spring member 15, an elastic member as shown in FIG. 1 may be used as the disk holding member 4 to open the magazine case 2 by the spring force of this elastic member. In this case, the spring member 15 need not be provided, so that the number of parts can be decreased. Also, the magazine case 2 may be closed by the urging force of the spring member 15 or the elastic force of the elastic member.

Next, a method for placing the disk 1 at a recording/reproducing position in a recording/reproducing apparatus of this embodiment will be explained. FIGS. 14 to 20 show a recording/reproducing apparatus of this embodiment. These figures are schematic views showing a series of operations in which when a specific disk 1 is selected from the magazine case 2 stored in the recording/reproducing apparatus to record or reproduce the disk 1, the disk 1 is conveyed to a turntable on a disk motor which gives rotational motion to the disk 1. Each of the operations will be described with reference to the drawings.

In FIGS. 14 to 20, reference numeral 18 denotes the aforementioned bearer which is supported on the turning center axis (not shown) for turning the whole of the magazine case 2 when the magazine case 2 is opened to select the specific disk 1. Reference numeral 19 denotes a disk storage magazine in which the disks 1 are stored. In this description, for distinguishment from the magazine case 2 as a part, the reference numerals are defined like this. Reference numeral 20 denotes a first holder which is formed with a groove portion with a predetermined thickness for holding the magazine case 2 in the closed state, 21 denotes a second holder which is formed with a tapered groove portion for holding the magazine case 2 in the opened state, 22 denotes a pair of conveying rollers as disk conveying means which takes out the disk 1 from the disk storage magazine 19 and conveys it, 23 denotes a disk motor for giving a rotation to the disk 1 when the disk 1 is recorded or reproduced, 24 denotes an optical head for recording or reproducing the disk 1, 25 denotes a transfer motor for relatively transferring the optical head 24 with respect to the disk 1, 26 denotes a screw shaft for giving a straight transfer motion to the optical head 24 by converting the rotation of the transfer motor 25 into a straight motion by means of screwing, 27 denotes a clamper for fixing the disk 1 to the disk motor 23, and 28 denotes a damper holder for supporting the damper 27. Also, reference numeral 29 denotes a transfer bed for integrally holding the disk motor 23, optical head 24, transfer motor 25, and screw shaft 26.

First, the disk storage magazine 19 is inserted into the first holder 20 of the recording/reproducing apparatus as shown in FIG. 14. At this time, the magazine case 2 is in the closed state. A position of the conveying rollers 22 is denoted by reference numeral 71.

Figure 15:
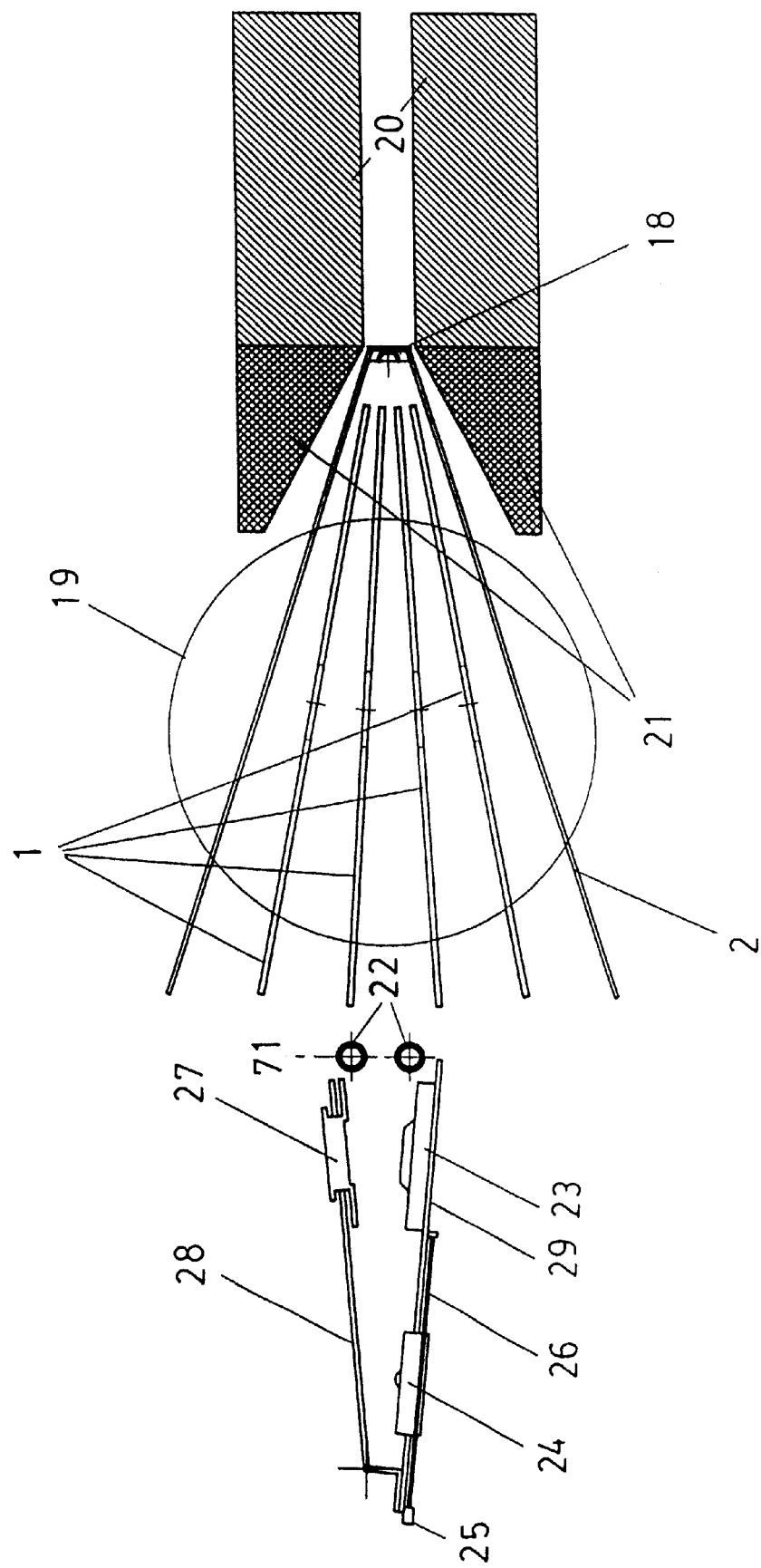
FIG. 15 is a schematic view showing the operation of a disk storage magazine in accordance with an embodiment of the present invention.

Next, as shown in FIG. 15, the magazine case 2 is moved from the first holder 20 to the second holder 21 by a magazine moving mechanism (not shown), and the bearer 18 is supported on the turning center axis (not shown). At this time, the lock claw 16 is released from the lock hole 17 (both of these elements not shown in FIG. 15) by the lock claw releasing mechanism (not shown) by the above-described method as shown in FIGS. 12 and 13, so that the magazine case 2 is opened by the urging force of the spring member 15.

Figure 16:
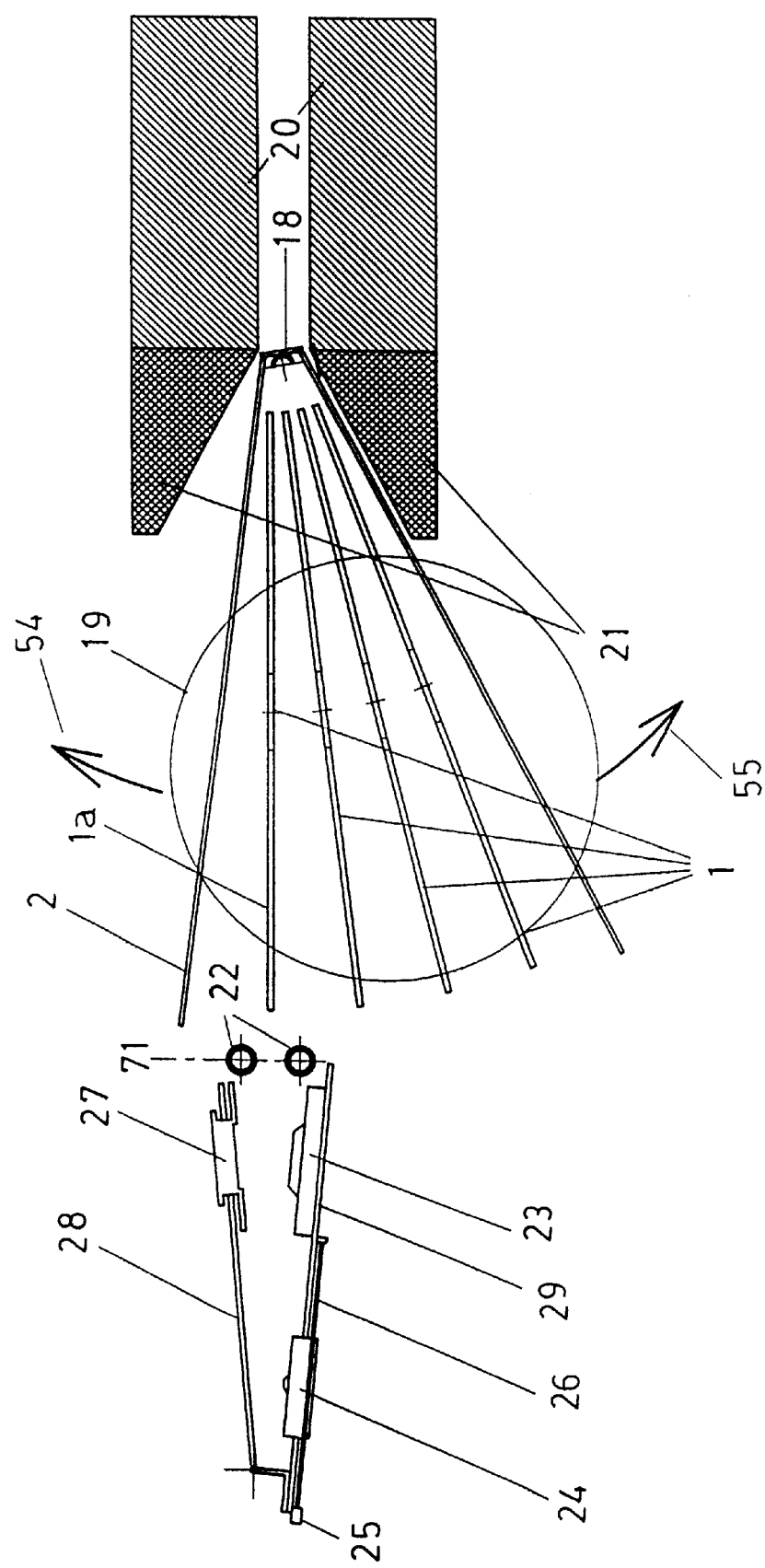
FIG. 16 is a schematic view showing the operation of a disk storage magazine in accordance with an embodiment of the present invention.

Next, as shown in FIG. 16, the whole of the disk storage magazine 19 is turned in the direction of the arrow 54 or 55 around the bearer 18 so that the position of a specific disk 1 to be recorded or reproduced agrees with a position between the conveying rollers 22. In this embodiment, the specific disk to be recorded or reproduced is referred to as 1a, and the whole of the disk storage magazine 19 turns in the direction of the arrow 55.

Figure 17:
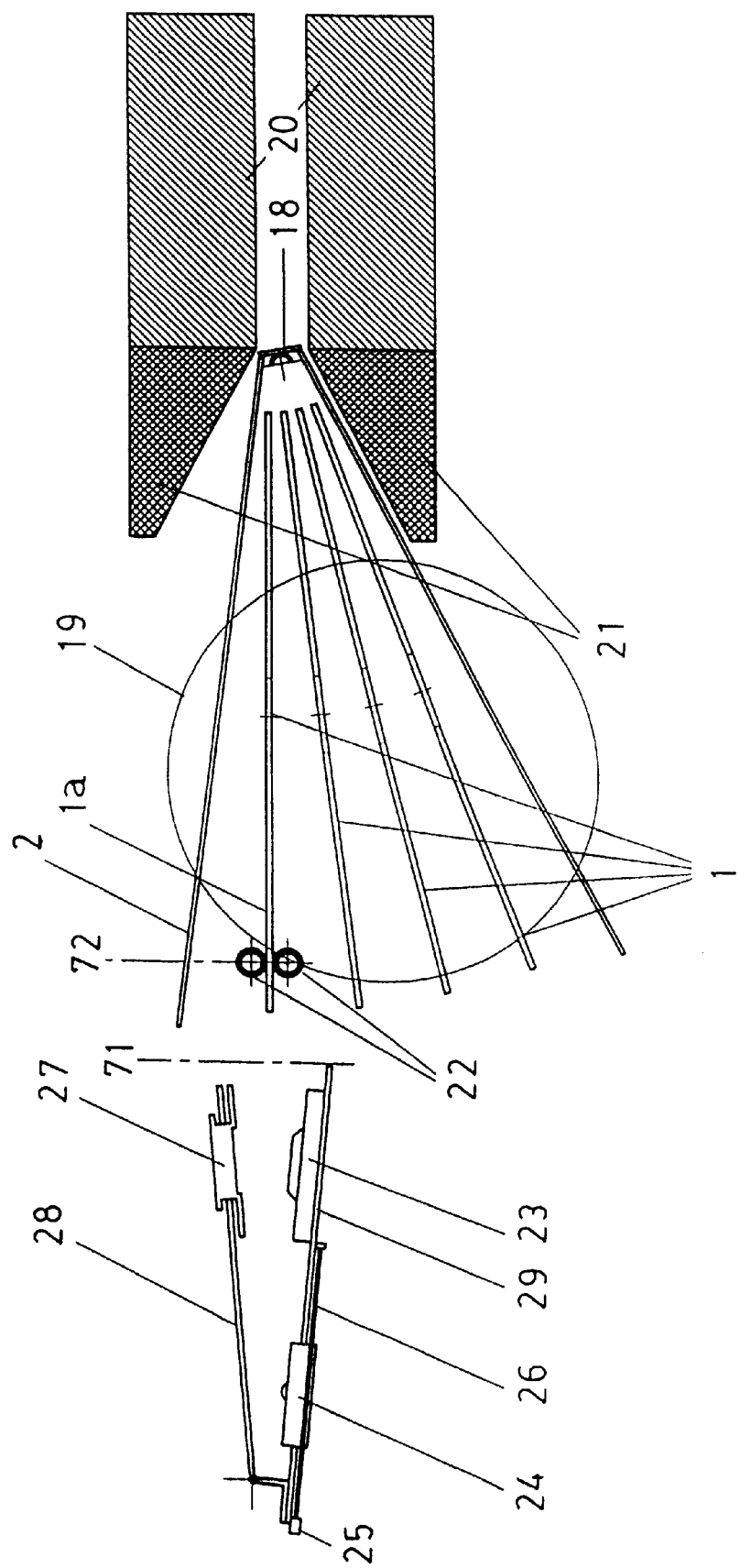
FIG. 17 is a schematic view showing the operation of a disk storage magazine in accordance with an embodiment of the present invention.

Next, as shown in FIG. 17, the conveying rollers 22 are moved from the initially arranged position 71 to a position 72 where the selected disk 1a is held by means of a roller moving mechanism (not shown), and hold the disk 1a therebetween.

Figure 18:
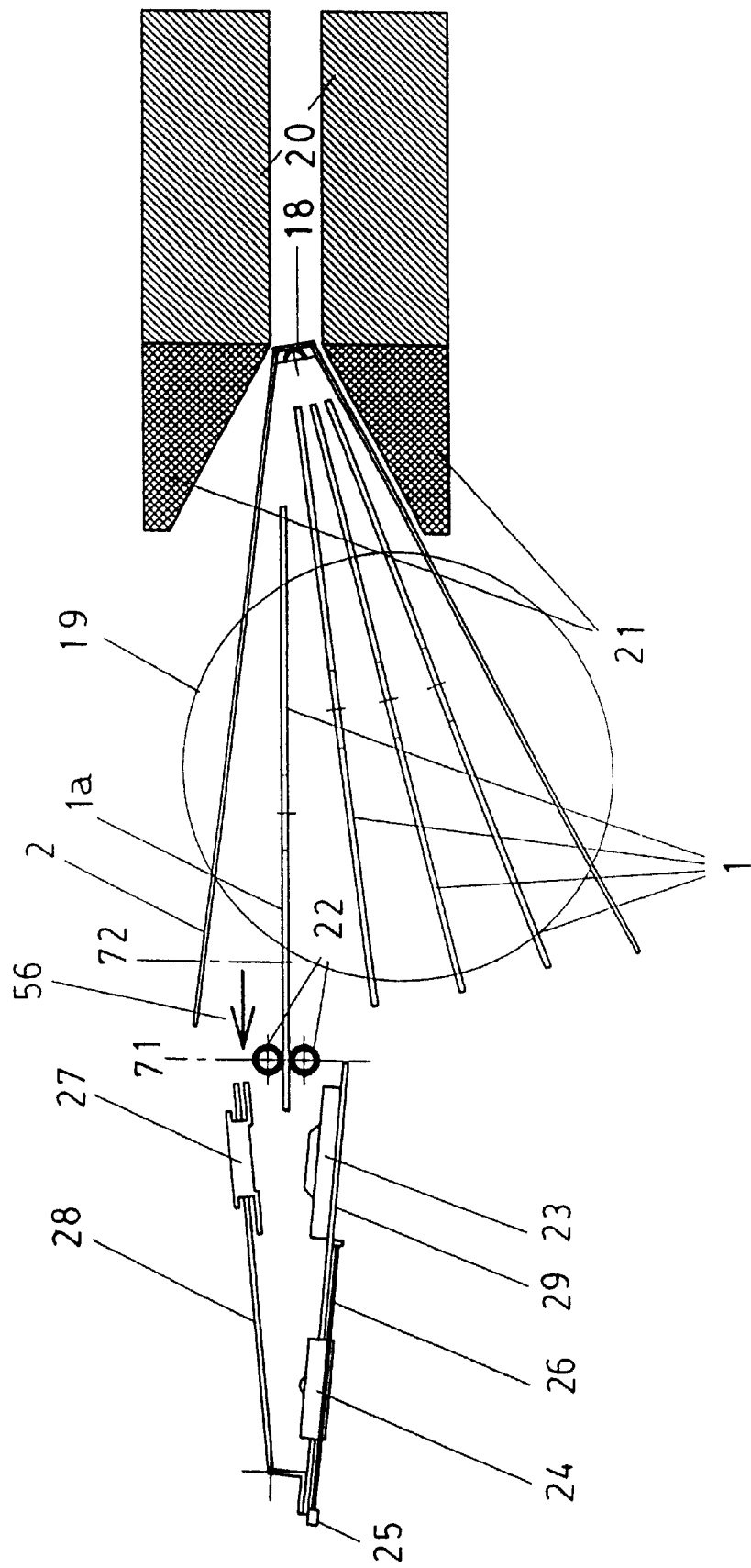
FIG. 18 is a schematic view showing the operation of a disk storage magazine in accordance with an embodiment of the present invention.

Next, as shown in FIG. 18, the conveying rollers 22 are moved in the direction of the arrow 56 from the position 72 to the original position 71 by the roller moving mechanism (not shown) in a state of holding the disk 1a therebetween.

Figure 19:
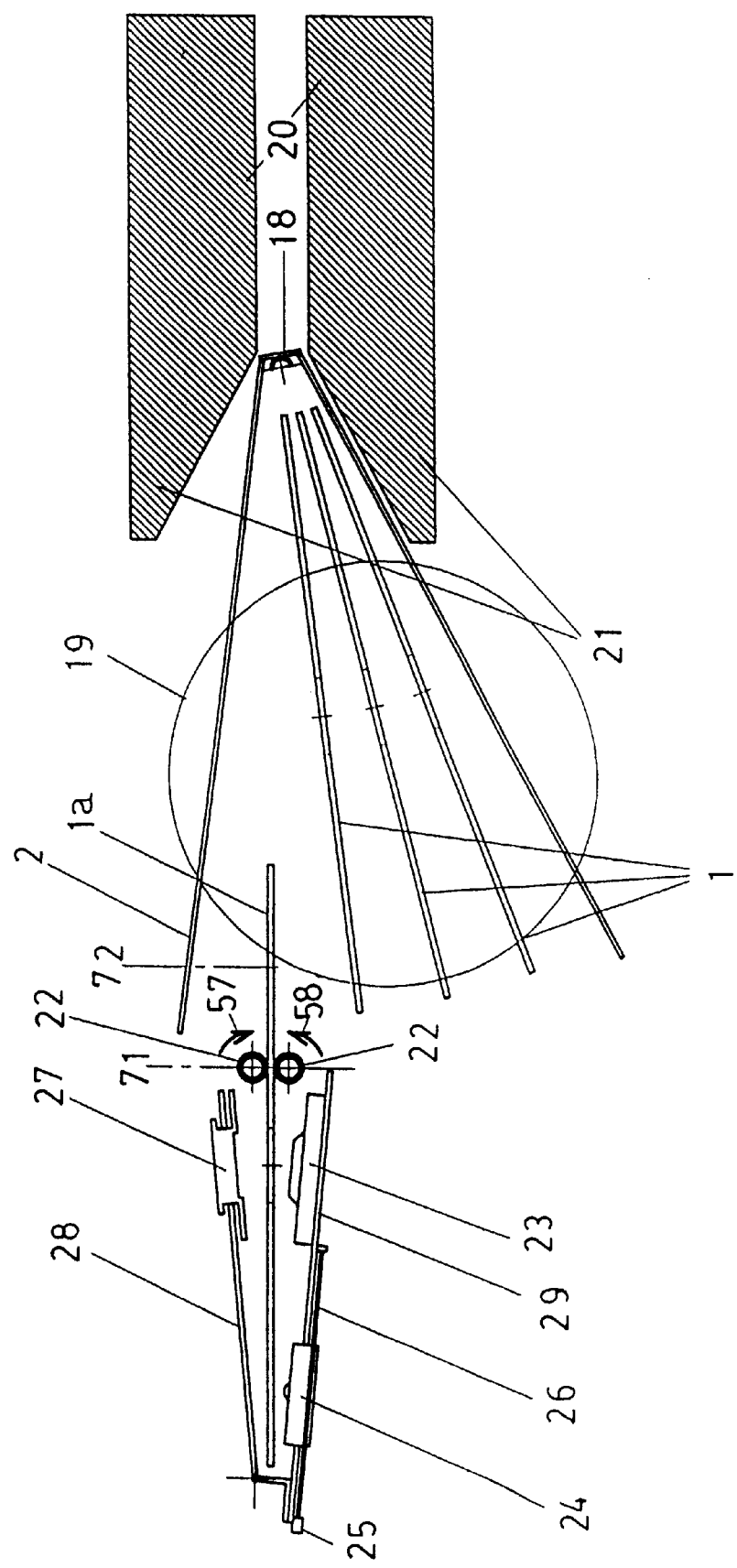
FIG. 19 is a schematic view showing the operation of a disk storage magazine in accordance with an embodiment of the present invention.

Next, as shown in FIG. 19, the conveying rollers 22 rotate in the directions of the arrow 57 and the arrow 58 to move the selected disk 1a to a position where a central hole of the disk 1a substantially agrees with the center of the disk motor 23.

Figure 20:
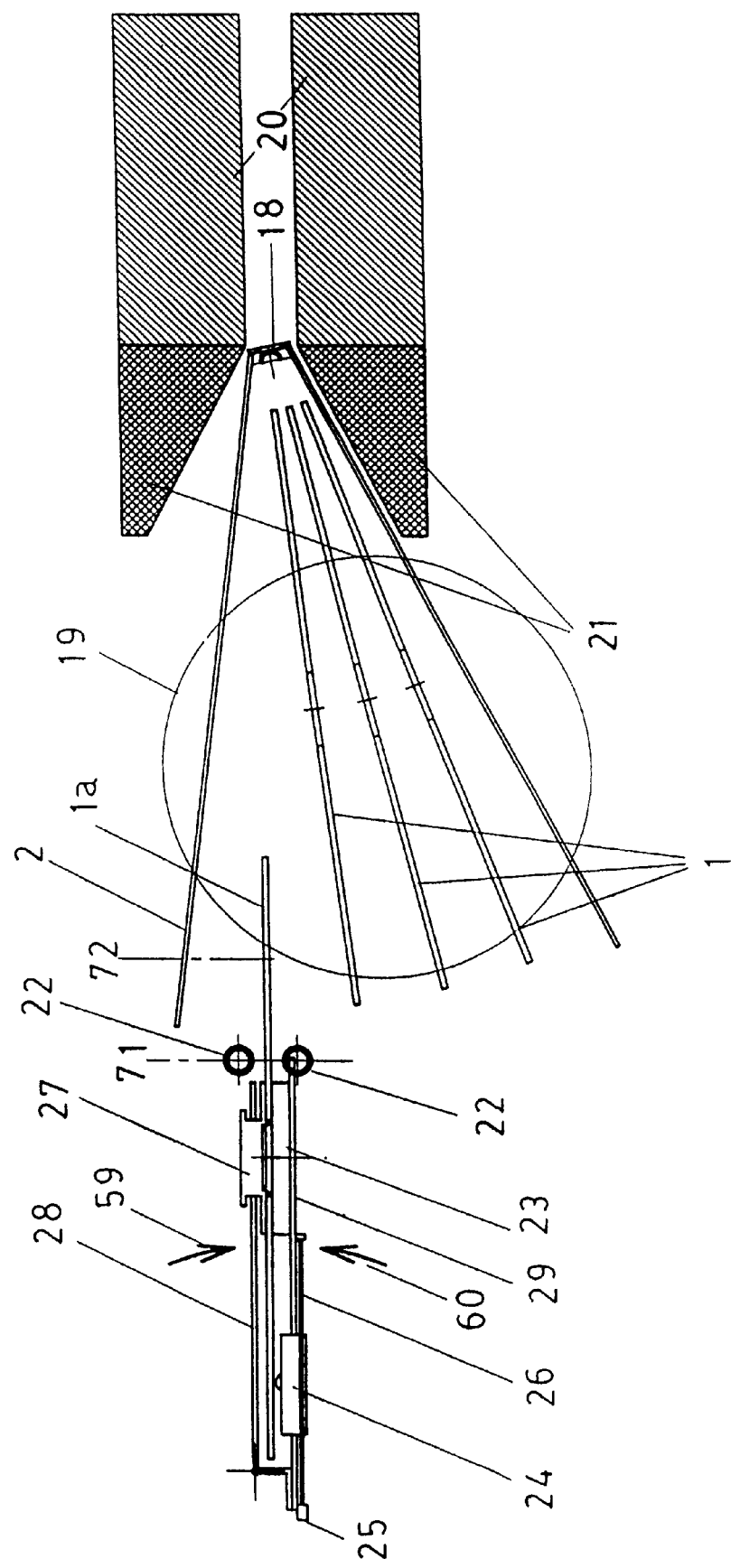
FIG. 20 is a schematic view showing the operation of a disk storage magazine in accordance with an embodiment of the present invention.

Next, as shown in FIG. 20, the transfer bed 29 and the damper holder 28 are turned in the directions of the arrow 60 and the arrow 59, respectively, so that the moved disk 1a is held between the disk motor 23 and the damper 27. Subsequently, the holding of the disk 1a by the conveying rollers 22 is released.

After the above-described operations, the optical head 24 is moved to a desired position on the disk 1a by rotating the screw shaft 26 by using the transfer motor 25, by which recording or reproducing is performed.

When the disk 1a having been recorded or reproduced is returned to the magazine case 2, the series of operations described above are performed in the reverse order.

Thus, when a specific disk 1 stored in the disk storage magazine 19 is recorded or reproduced, the specific disk 1 can be selected from the disk storage magazine 19 easily with a simple configuration.

Also, without pulling out the whole length of the disk storage magazine 19 from the stored location, merely by moving the disk storage magazine 19 from the position of the first holder 20 to the position of the second holder 21, the magazine case 2 can be opened to increase the interval between the disks 1. Therefore, the dimension in the disk taking-out direction of the recording/reproducing apparatus can be decreased. Also, without completely separating the upper plate 2a from the lower plate 2b, these elements being a first and a second cover members, the magazine case 2 can be kept stably in the closed state or the opened state.

Further, the conveying rollers 22, disk motor 23, optical head 24, transfer motor 25, or the like need not be moved in the stacking direction of the disks 1, so that the configuration on the side of the conveying rollers 22 can be simplified.

Figure 21:
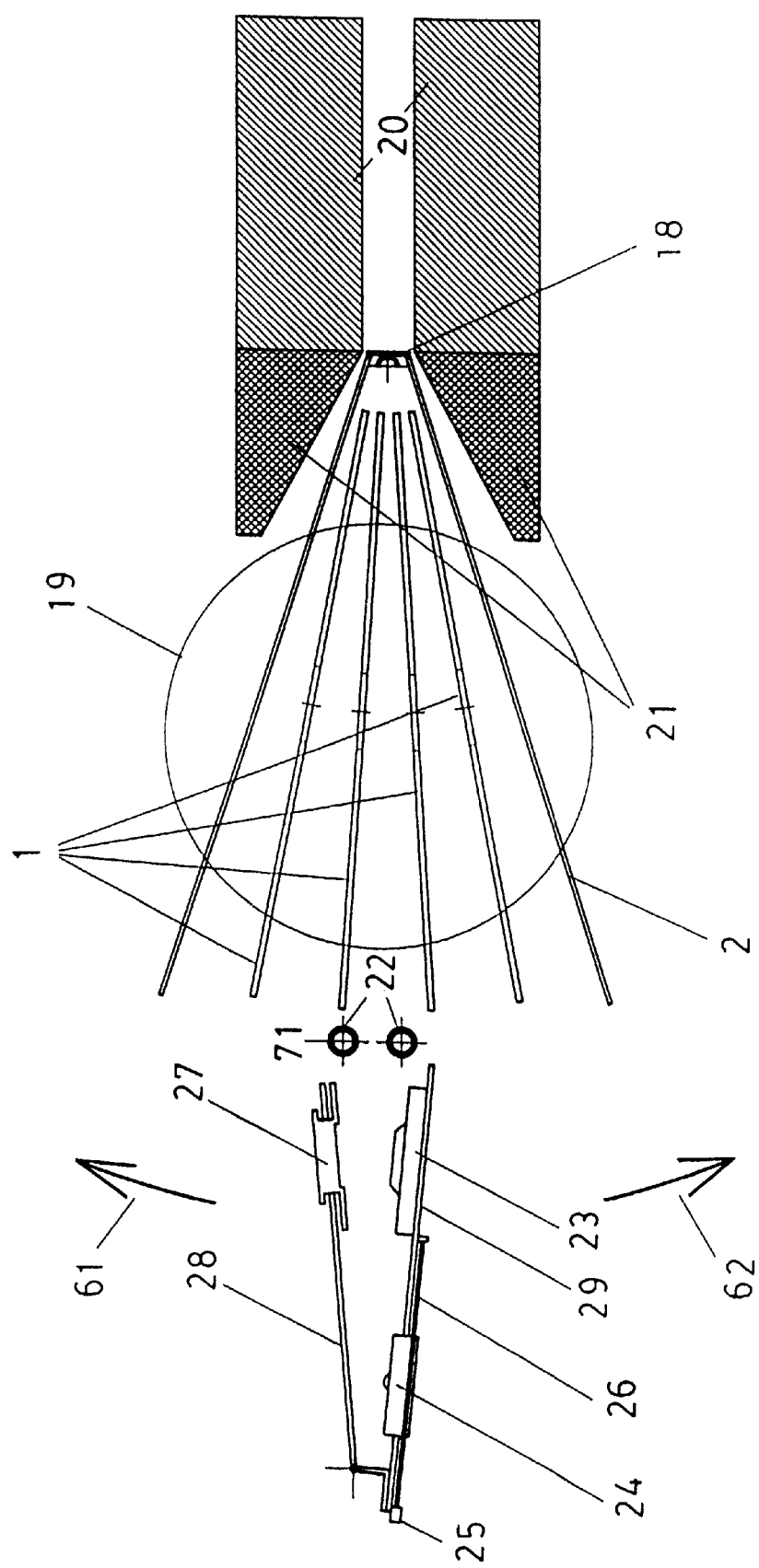
FIG. 21 is a schematic view showing the operation of a disk storage magazine in accordance with an embodiment of the present invention.

In the above-described operations, as means for selecting the specific disk la to be recorded or reproduced, the method has been used in which the whole of the disk storage magazine 19 is turned around the bearer 18, but as shown in FIG. 21, the disk storage magazine 19 is fixed in the second holder in the opened state, and the conveying rollers 22, damper holder 28, and transfer bed 29 can be moved as a unit in the direction of the arrow 61 or 62 to the position of the specific disk 1a. In this case, the disk storage magazine 19 need not be turned in the stacking direction of the disks 1, so that a magazine turning mechanism can be omitted.

Figure 22:
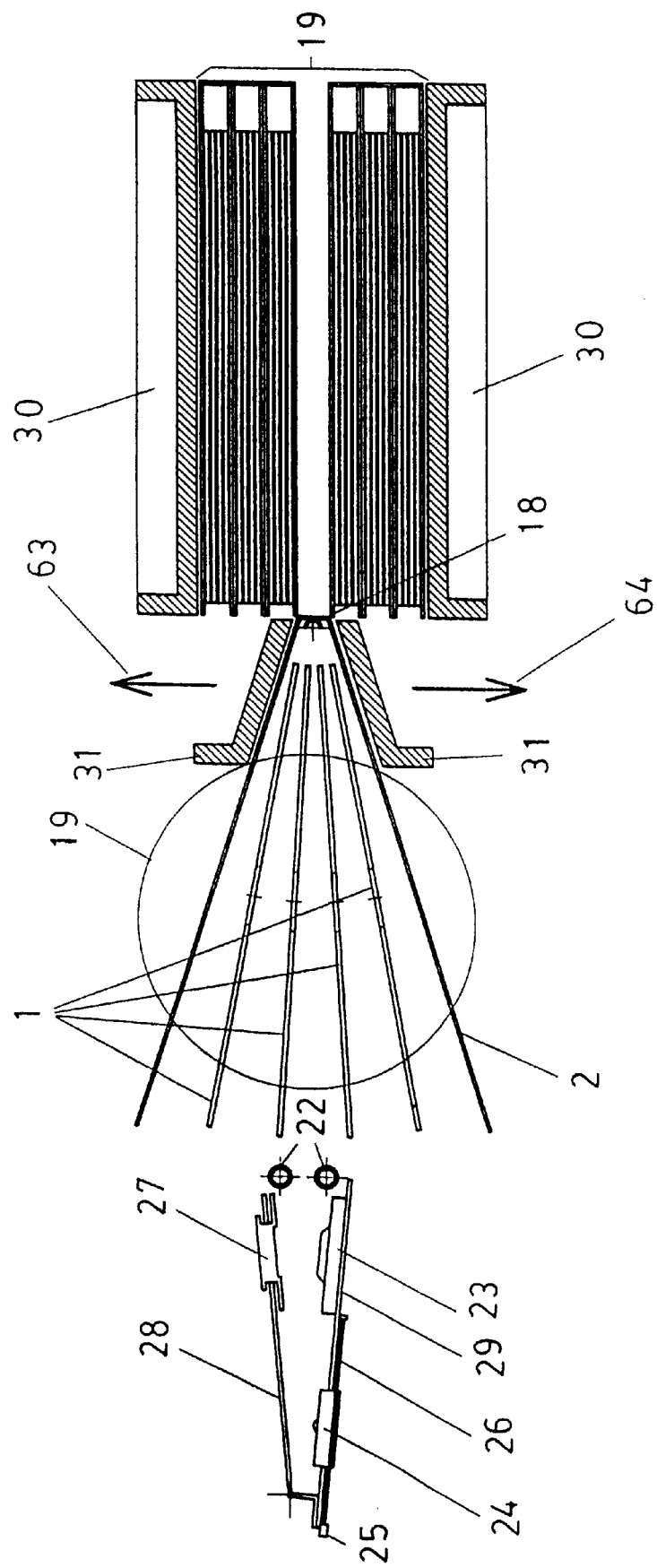
FIG. 22 is a schematic view showing the operation of a disk storage magazine in accordance with an embodiment of the present invention.

The following is a description of an embodiment of a method for placing the disk at the recording/reproducing position in the case where a recording/reproducing apparatus equipped with a stocker for storing a plurality of disk storage magazines is used. FIG. 22 is a view showing a series of operations in which a specific disk in the disk storage magazine of this embodiment stored in the stocker is selected, and when the disk is recorded or reproduced, the disk is conveyed to the turntable on the disk motor which gives rotational motion to the disk.

In FIG. 22, reference numeral 30 denotes a magazine stocker for storing a plurality of disk storage magazines 19, 31 denotes a support holder for pulling out and supporting the disk storage magazine 19 storing the specific disk 1 selected for recording or reproducing. The support holder 31 is moved in the direction of the arrow 63 or 64 by moving means (not shown) to select the magazine case 2. In the already described embodiment, only the single disk storage magazine 19 is supported by the first holder 20 and the second holder 21. Contrarily, in this embodiment, a plurality of disk storage magazines 19 are stored by the magazine stocker 30. Also, in the case where only the single disk storage magazine 19 of the above-described embodiment is supported, the disk storage magazine 19 is not moved completely by the whole length when the disk storage magazine 19 is moved. Contrarily, in this embodiment, the disk storage magazine 19 is moved by the whole length of the magazine case 2 when the disk storage magazine 19 is moved into the support holder 31. This is because unless the disk storage magazine 19 is moved by the whole length, the magazine case 2 cannot be opened. The operations after the disk storage magazine 19 is moved to the support holder 31 are the same as the operations after the disk storage magazine 19 is moved to the second holder 21 in the case where only the above-described single disk storage magazine 19 is supported. After the selected specific disk 1 has been recorded or reproduced, the disk 1 is returned to the magazine case 2, and the disk storage magazine 19 is moved from the support holder 31 to the magazine stocker 30.

In either case of the above-described operations, the magazine case 2 is opened when the disk 1 is taken out of the magazine case 2. At this time, for example, as shown in FIG. 15, the coming-off direction of the disk 1 stored at the lower part in the figure of the magazine case 2 is a downward direction. In the state shown in FIGS. 16 to 20, this direction becomes steep. Also, a force for holding the disk 1 against the disk holding member 4 in the coming-off direction is only a frictional resistance between the contact surfaces of the disk 1 and the disk holding member 4, and there is no mechanical holding mechanism. For these reasons, there is a high possibility that the disks 1 stored at the lower part in the figure of the magazine case 2 in, for example, FIG. 15 come off inadvertently by the effect of the gravity etc. when the magazine case 2 is opened. Especially in the state shown in FIGS. 16 to 20, the possibility is further increased. Also, the disks 1 other than those stored at the lower part in the figure of the magazine case 2 may come off inadvertently from the magazine case 2 if a force such as an impulsive force is applied to the magazine case 2 in the coming-off direction of the disk 1.

Figure 23:
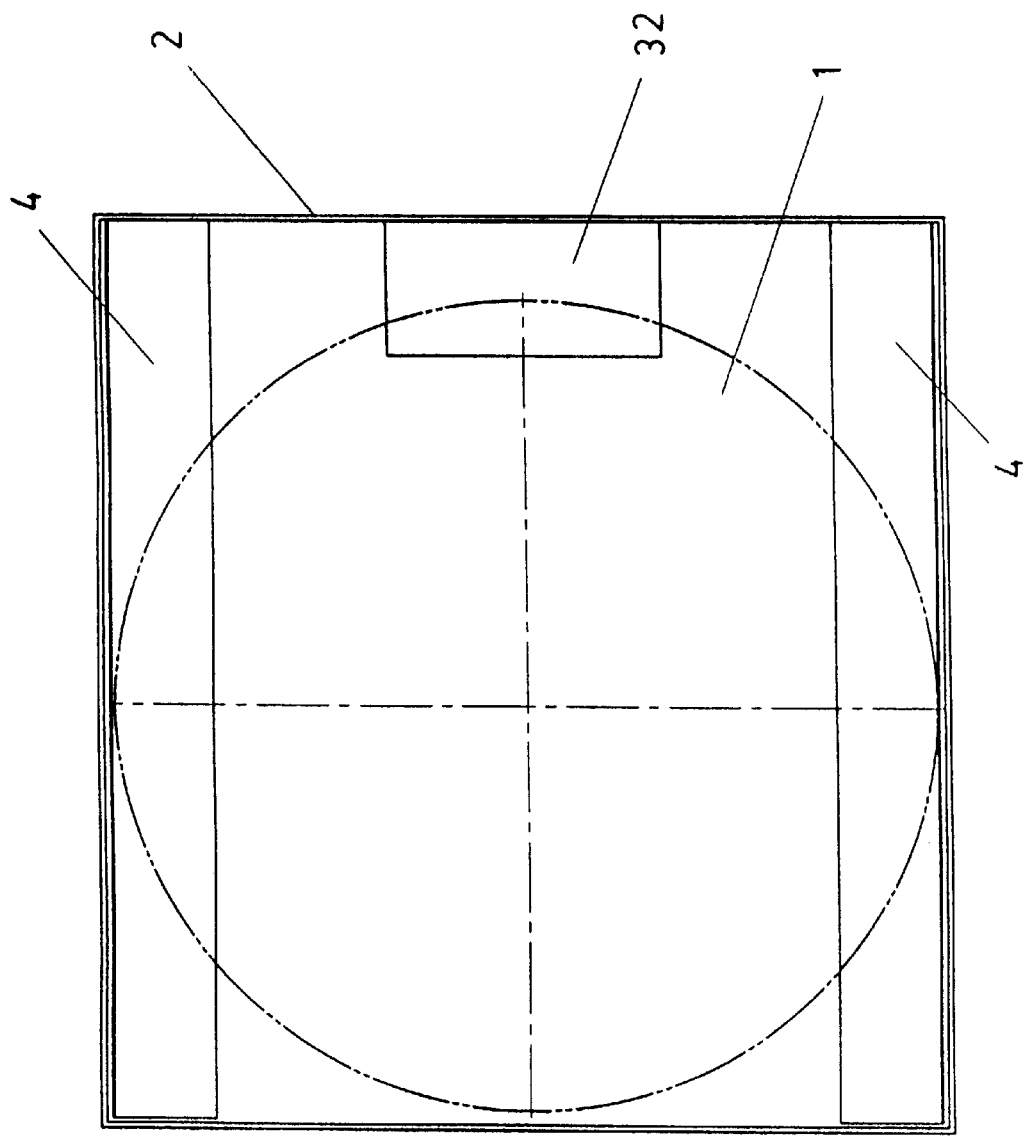
FIG. 23 is a plan view of a specific portion of a disk storage magazine in accordance with an embodiment of the present invention.
Figure 24:
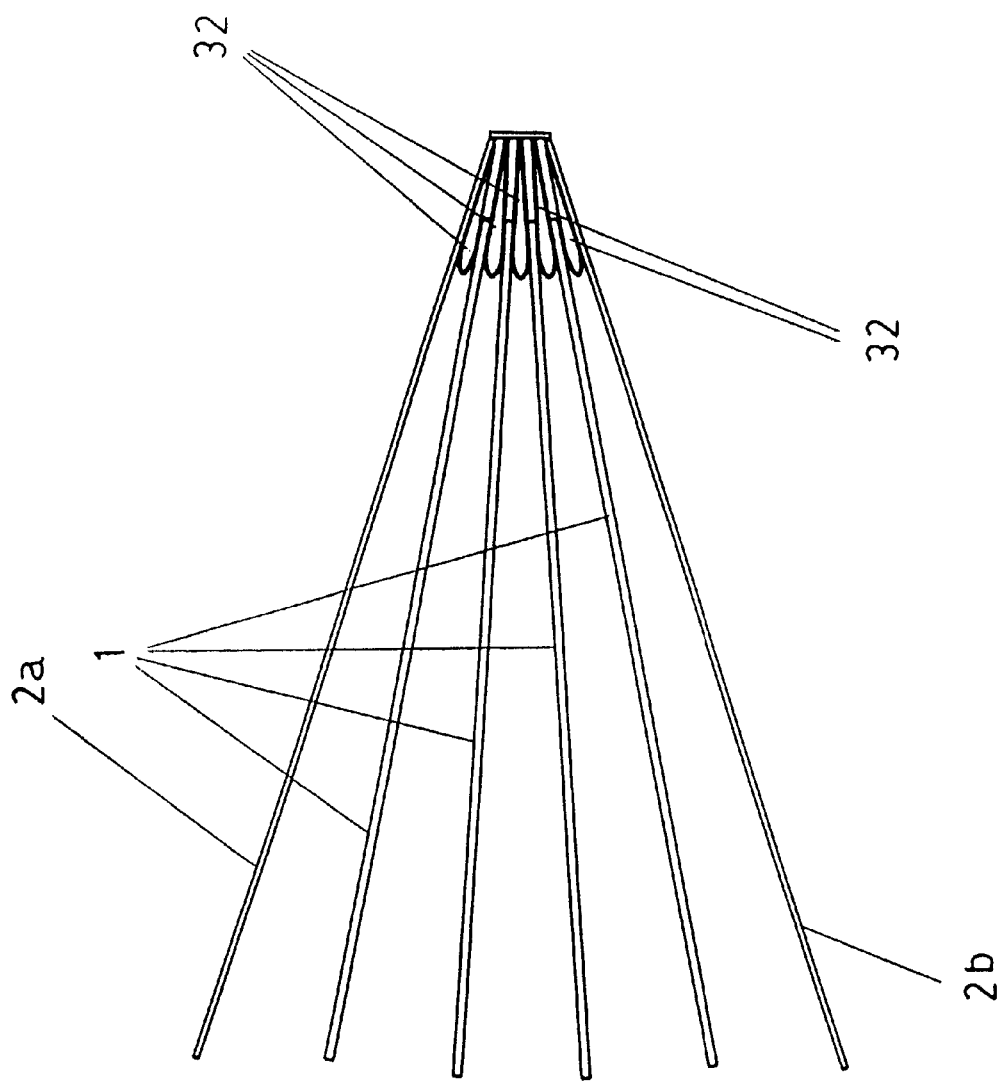
FIG. 24 is a partially sectional view of a disk storage magazine in accordance with an embodiment of the present invent ion.

Thereupon, to solve these problems, a force for holding the disk 1 against the disk holding member 4 must be made high. FIGS. 23 and 24 are views showing a state in which a holding portion for the disk 1 against the disk holding member 4 is added. FIG. 23 is a schematic plan view of the holding portion, and FIG. 24 is a schematic sectional view thereof. In FIGS. 23 and 24, reference numeral 32 denotes a disk holding elastic member serving as a disk holding elastic portion. The disk holding elastic member 32 is added to a tier corresponding to the storage position of the disk 1, at the innermost part of the disk holding member 4 in the coming-off direction of the disk 1, to lightly hold the disk 1 against the disk holding member 4. The disk holding elastic member 32 is a sheet made of an elastic material such as polyethylene resin, which is formed into a loop shape. The disk 1 is inserted in a gap between the adjacent disk holding elastic members 32, and the gap is narrower than the thickness of the disk 1. Therefore, when the disk 1 is inserted into this gap, the loop of sheet is elastically deformed, providing a light press fitting state. The press fitting strength is regulated so that it is higher than the holding force necessary for holding the disk 1 against the disk holding member 4 and is lower than the conveying force of the conveying rollers 15 when the disk 1 is removed from the magazine case 2.

By the configuration as described above, even when the magazine case 2 is opened, the stored disk 1 can be prevented from coming off inadvertently.

In the above-described configuration, even if the disk holding elastic member 32 is made integral with the disk holding member 4, the similar effect can be achieved. This configuration is advantageous in terms of a reduced number of parts.

In the above-described configuration, the disk holding elastic member 32 is not limited to the above-described form. For example, the sheet need not be formed into a loop shape. The use of a lump of the elastic member without a loop can achieve the similar effect.

The following is a description of an embodiment of a disk storage magazine configured so that the intervals of the disks stored in the magazine case change in the stacking direction substantially in parallel with each other.

Figure 25:
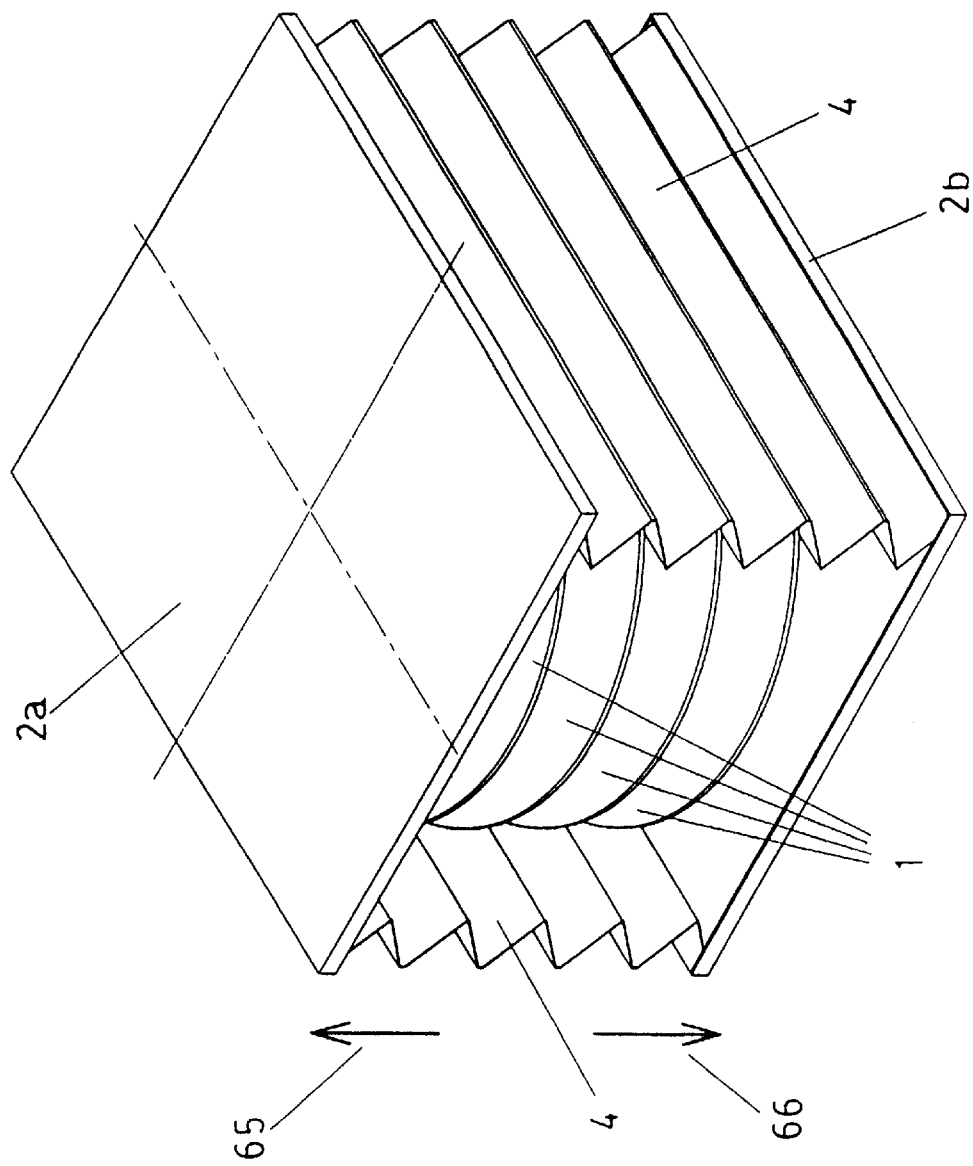
FIG. 25 is a basic conceptual view of a disk storage magazine in accordance with a second embodiment of the present invention.

FIG. 25 shows a schematic configuration of one example of a disk storage magazine configured so that the intervals of the disks stored in the magazine case change in the stacking direction substantially in parallel with each other. This embodiment differs from the above-described embodiment in that when the intervals in the stacking direction of the disks 1 change, the upper plate 2a and the lower plate 2b separate completely, and are connected merely by the disk holding members 4, which expand and contract into a bellows shape, on both sides of the magazine case 2, so that the distance between the upper plate 2a and the lower plate 2b changes substantially in parallel in the directions of the arrows 65 and 66.

Figure 26:
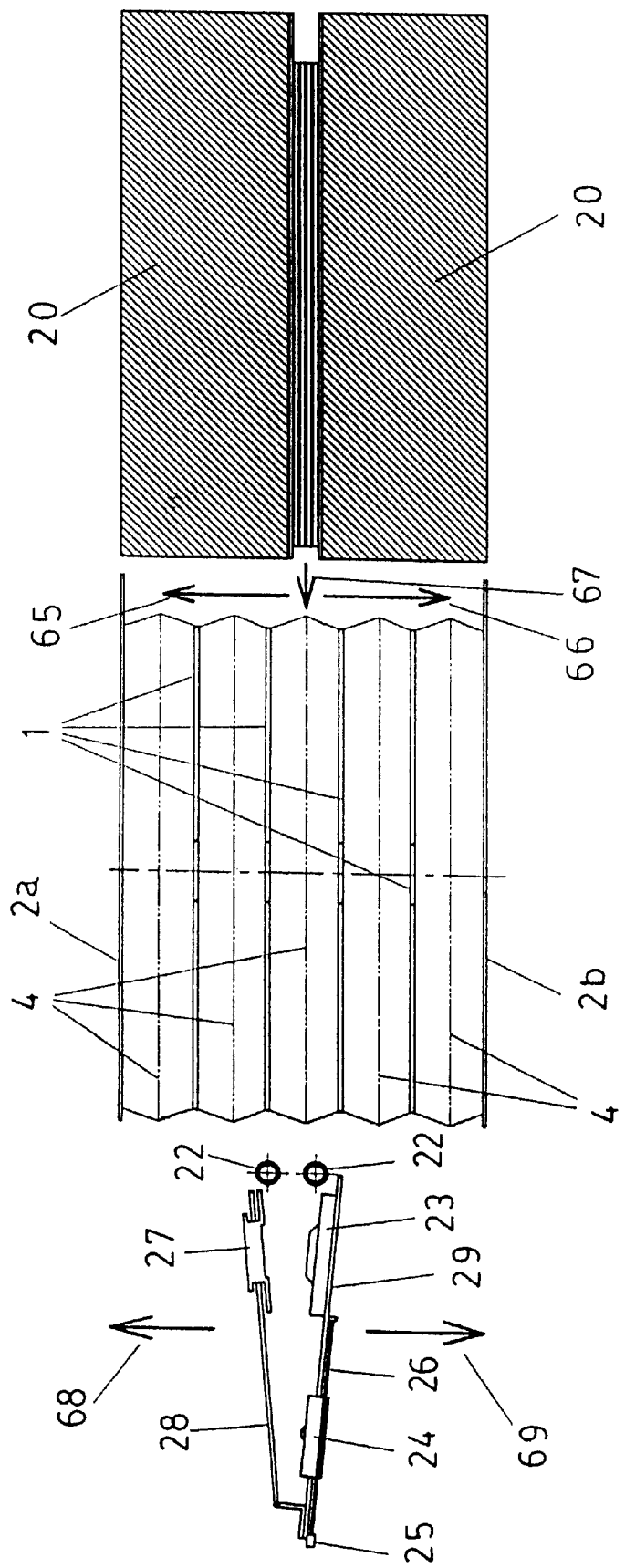
FIG. 26 is a schematic appearance view of a disk storage magazine in accordance with the second embodiment of the present invention.

FIG. 26 shows one example of a schematic configuration of a recording/reproducing apparatus using the disk storage magazine configured so that the intervals of the disks stored in the magazine case change in the stacking direction substantially in parallel with each other. This embodiment differs from the above-described embodiment in that for the disk storage magazine of this embodiment, when the magazine case 2 is opened, the distance of the whole surfaces of the upper plate 2a and the lower plate 2b must be increased in the directions of the arrows 65 and 66. Therefore, the disk storage magazine must be moved by the whole length in the direction of the arrow 67 to a position where a space necessary for increasing the intervals of the disks 1 can be provided. Unlike the above-described embodiment, it is impossible to provide a holder having a portion for holding the closed side of the magazine case 2, such as the second holder 21. Therefore, the size of the recording/reproducing apparatus increases by the movement amount of the disk storage magazine necessary for this, so that the already described embodiment is favorable in this respect. Also, in the disk storage magazine of this embodiment, when the magazine case 2 is opened, the upper plate 2a and the lower plate 2b separate completely, so that the stability is poor at the time when the magazine case 2 is open as compared with the above-described embodiment. Therefore, the already described embodiment is favorable in this respect.

In this embodiment, a selected specific disk 1 of the disks 1 in the disk storage magazine 19 is removed by a method similar to that in the above-described embodiment after the transfer bed 29 and the damper holder 28 integrally move the disk motor 23, optical head 24, transfer motor 25, screw shaft 26, and damper 27 in the directions of the arrows 68 and 69 to select the disk 1.

In this embodiment as well, like the above-described embodiment, by using the disk storage magazine shown in FIG. 25, each disk 1 is held by the holding faces in a state in which an edge of the outer periphery of the disk 1 is held between the tapered faces 6 and 7 as shown in FIG. 3 when the magazine case 2 is open. When the magazine case 2 is closed, as shown in FIG. 4, the disk holding members 4 contract into a bellows shape, and the tapered faces 6 and 7 become substantially in parallel with each other, holding the disk 1 therebetween by pressing the surface of the disk 1. Thereby, in this case as well, the disk 1 has no looseness with respect to the disk holding member 4 when the magazine case 2 is closed. Therefore, rubbing does not occur between the disk 1 and the disk holding member 4 or between the disks 1.

In this embodiment as well, as is the case with the magazine case which is opened by turning two cover members around a support point, actually it is very difficult to establish the bent state as shown in FIG. 5, and some swell is produced at the bend portion 8 as shown in FIG. 6.

Figure 27:
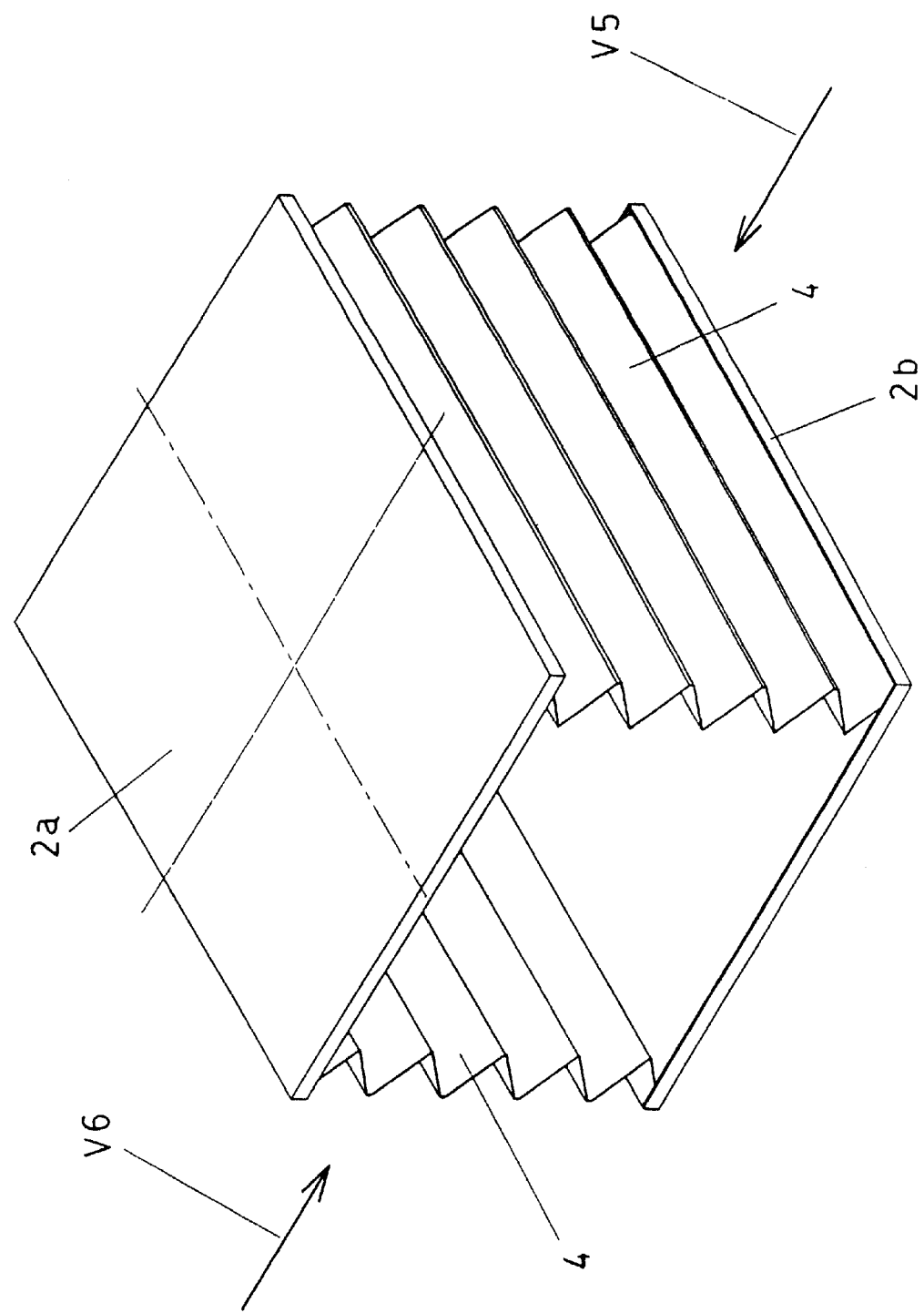
FIG. 27 is a schematic appearance view of a disk storage magazine in accordance with the second embodiment of the present invention.
Figure 28:
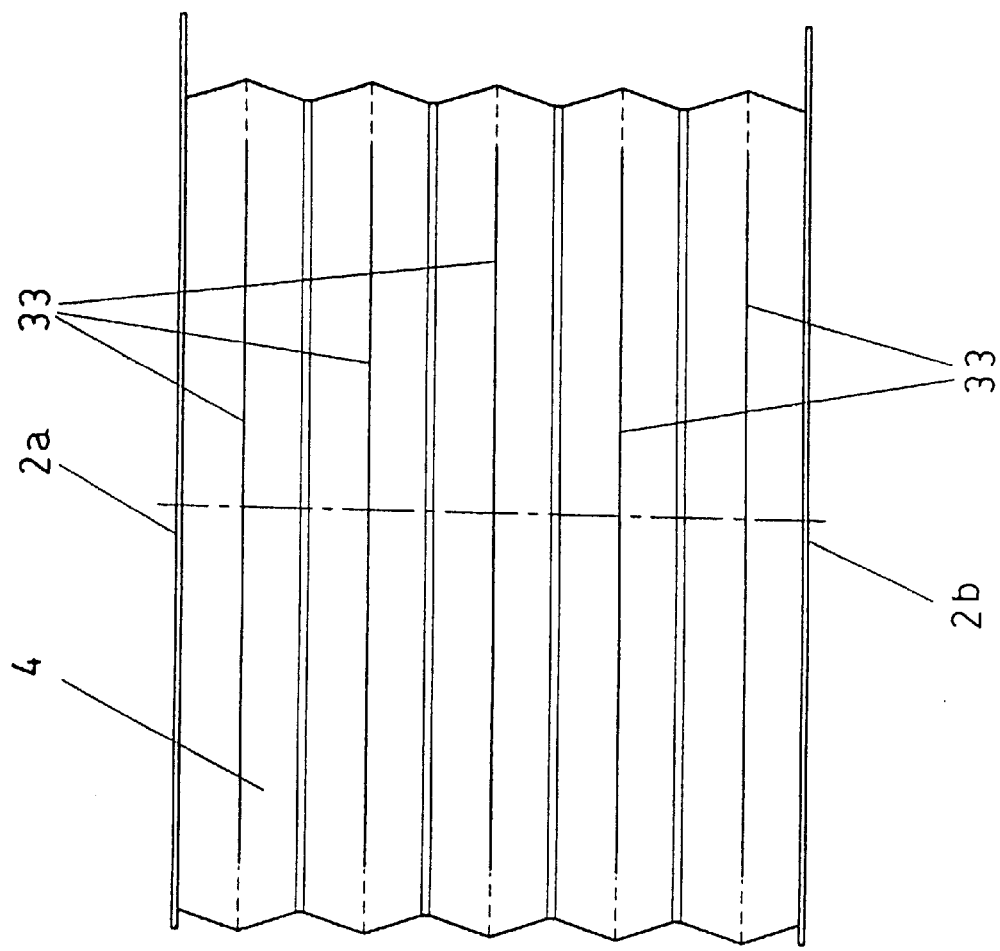
FIG. 28 is a view taken in the direction along the arrow of a specific portion of a disk storage magazine in accordance with the second embodiment of the present invention.

FIG. 27 is an appearance view showing a state in which the disks 1 are not stored in FIG. 25, and FIG. 28 is a schematic view taken in the direction of the arrow V5 of FIG. 27. The shape viewed in the direction of the arrow V6 is a shape symmetrical with the shape shown in FIG. 28. A plan view showing a mutual relation between the disk 1 and the disk holding member 4 is FIG. 11, like the above-described embodiment. In this embodiment as well, in order to decrease the swell produced as a whole in the magazine case 2, torn portions are provided at the solid-line portions indicated by reference numeral 33 in FIG. 28, excluding a part at each end of the folding portion corresponding to the peak of bellows on the inside of the magazine case 2. If this torn portion 33 is provided at the whole portion except a portion indicated by reference numeral 14 in FIG. 11, located on the outside of the outer periphery of the disk 1, the bend portion is not present at the portion pressed by the disk 1 when the disk storage magazine is closed. Therefore, the interval between the disks 1 is not pushed and spread by the swell of the bend portion, so that this configuration is ideal.

By this configuration, a force acting in the direction in which the bellows state of the disk holding member 4 is expanded is decreased, so that the upper plate 2a and the lower plate 2b are pushed and spread with difficulty. Thereby, the bellows state becomes an ideal state as shown in FIG. 5, and the joining portion 9 of the upper plate 2a and the lower plate 2b can be joined substantially surely.

The following is a description of an example of a disk storage magazine configured so that the disk holding member moves to the disk removal side with respect to the magazine case 2 in connection with the opening operation of the magazine case 2.

Figure 29:
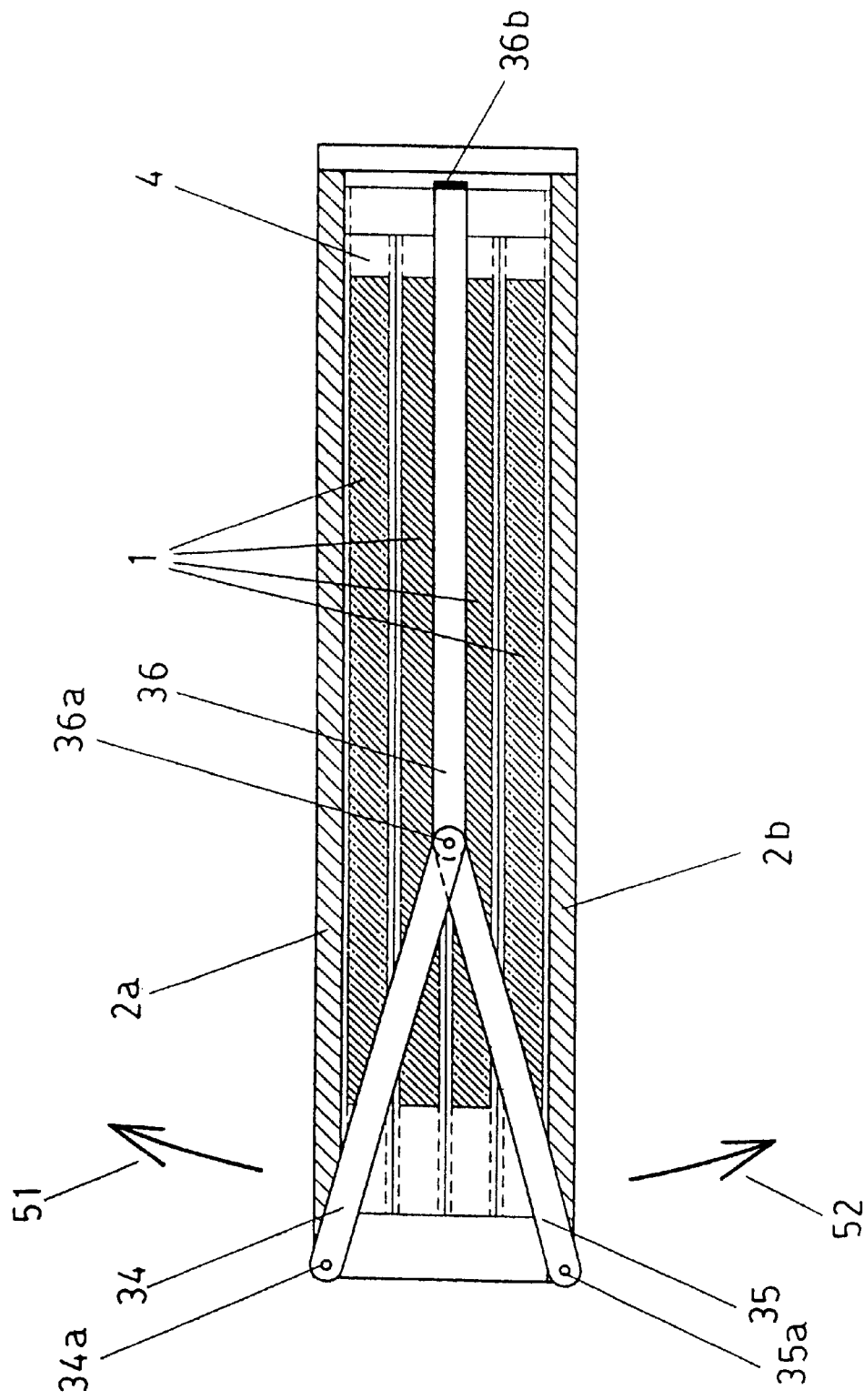
FIG. 29 is a schematic view showing the configuration and operation of a disk storage magazine in accordance with a third embodiment of the present invention.
Figure 30:
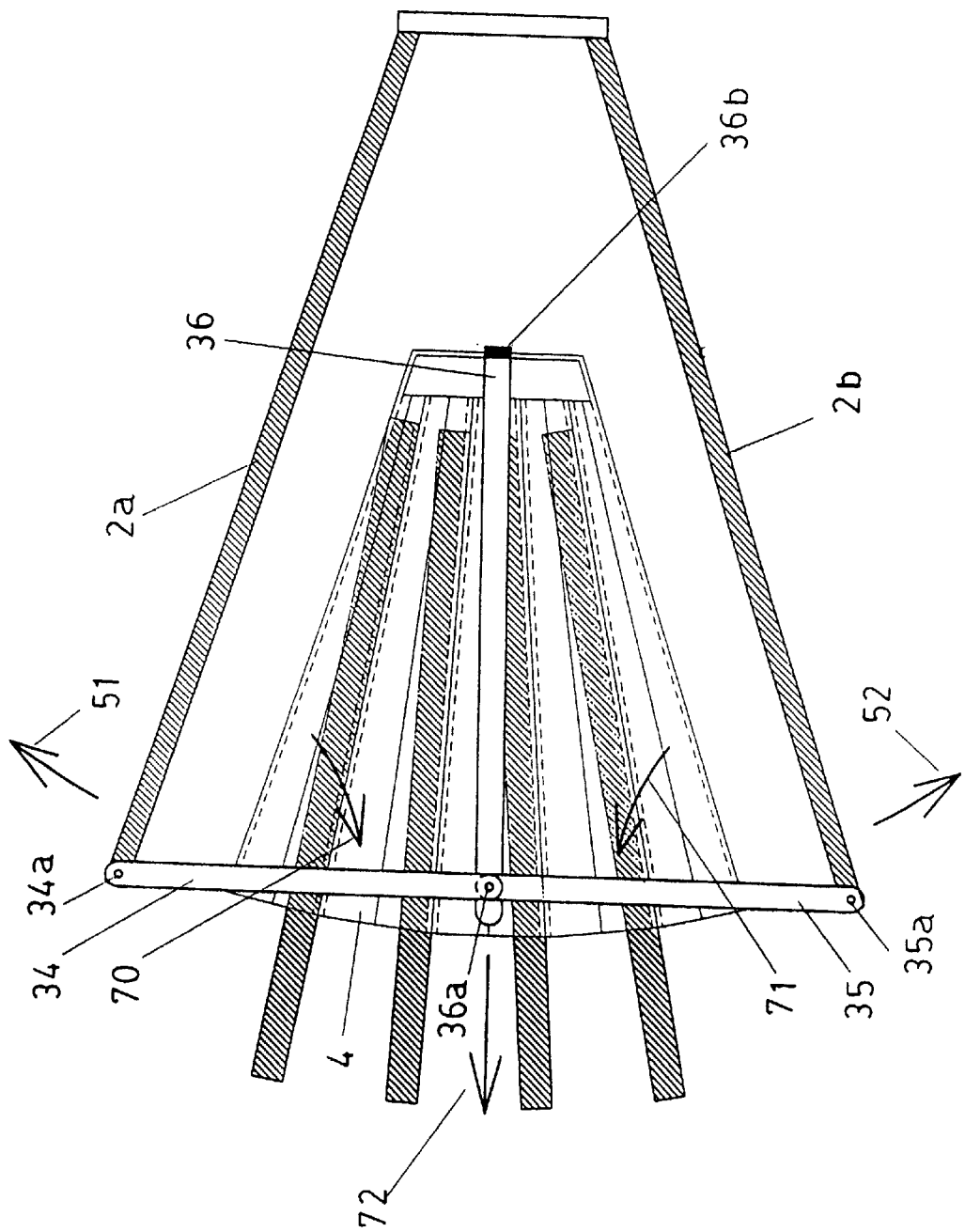
FIG. 30 is a schematic view showing the configuration and operation of a disk storage magazine in accordance with the third embodiment of the present invention.

FIGS. 29 and 30 are schematic views of an example of a disk storage magazine configured so that the disk holding members are moved to the disk removal side with respect to the magazine case 2 in connection with the opening operation of the magazine case 2. FIG. 29 shows a state in which the magazine case 2 is closed, and FIG. 30 shows a state in which the magazine case 2 is open.

This embodiment differs from the above-described embodiment in the following respects. As shown in FIGS. 29 and 30, a link mechanism is provided which moves the disk holding members 4 to the disk removal side with respect to the magazine case 2 in connection with the opening operation of the upper plate 2a and the lower plate 2b of the magazine case 2. This link mechanism is made up of an upper arm 34, a lower arm 35, and a middle arm 36. The upper arm 34 is supported on the upper plate 2a by an upper support point 34a so as to be turnable, the lower arm 35 is supported on the lower plate 2b by a lower support point 35a so as to be turnable, and the middle arm 36 is supported by a middle support point 36a together with the upper arm 34 and the lower arm 35 so as to be turnable. The rear end portion of the middle arm 36 is fixed to the rear end portion of the disk holding member 4 by a fixing portion 36b. The portions near the upper support point 34a and the lower support point 35a of the upper arm 34 and the lower arm 35 are attached to the front end side portion of the disk holding member 4. Also, as shown in FIG. 30, the link mechanism has dimensions such that about one fourth to one third of the outside diameter of the disk 1 projects from the disk holding member 4 on the disk removal side of the magazine case 2 in connection with the opening operation of the upper plate 2a and the lower plate 2b of the magazine case 2.

When the upper plate 2a and the lower plate 2b are turned in the directions of the arrows 51 and 52, respectively, from the state in which the upper plate 2a and the lower plate 2b of the magazine case 2 are closed as shown in FIG. 29, the upper arm 34 and the lower arm 35 are turned in the directions of the arrows 70 and 71, respectively, in connection of the opening operation of the magazine case 2. The middle arm 36 is moved in the direction of the arrow 72 by the operations of the upper arm 34 and the lower arm 35. Accordingly, the disk holding members 4 are moved to the disk removal side of the magazine case 2. That is to say, the disks 1 stored in the magazine case 2 are moved to the disk removal side, projecting from the magazine case 2.

In order to close the magazine case 2, the series of operations described above are performed in the reverse order. Specifically, when the magazine case 2 is closed, the disk holding members 4 are returned and stored into the magazine case 2 by the link mechanism of the upper arm 34, lower arm 35, and middle arm 36.

According to this configuration, when the magazine case 2 is opened, a part of the disk 1 projects from the magazine case 2, so that the operation for inserting or removing the disk 1 can be performed easily, and a driving system of the conveying rollers 15 for removing the disk 1 can be configured simply and easily.

According to the configuration described above, the disk holding members 4 are moved to the disk removal side of the magazine case 2 with respect to the magazine case 2 in connection with the opening operation of the magazine case 2. In this case, the mechanism for moving the disk holding members 4 comprises the link mechanism as shown in FIG. 29 or 30 as described above. Therefore, in the operation in which the upper plate 2a and the lower plate 2b are opened in the directions of the arrows 51 and 52, respectively, and the upper arm 34 and the lower arm 35 are turned in the directions of the arrows 70 and 71, respectively, as the opening operation of the magazine case 2 comes near to the completion, a force applied to the middle support point 36a of a component in the direction of the arrow 51 or 52 increases, and inversely, a force applied to the middle support point 36a of a component perpendicular to the direction of the arrow 51 or 52, that is, a movement force of the middle support point 36a in the direction of the arrow 72 decreases. Thereby, a turning force of the upper arm 34 in the direction of the arrow 70 and a turning force of the lower arm 35 in the direction of the arrow 71 decrease. Therefore, as the opening operation of the magazine case 2 comes near to the completion, the movement force of the middle arm 36 in the direction of the arrow 72 decreases, that is, the movement force of the disk holding members 4 decreases. For this reason, the disk holding member 4 cannot be moved completely because of various rubbing resistances etc., so that the disks 1 sometimes do not project sufficiently from the magazine case 2.

Figure 31:
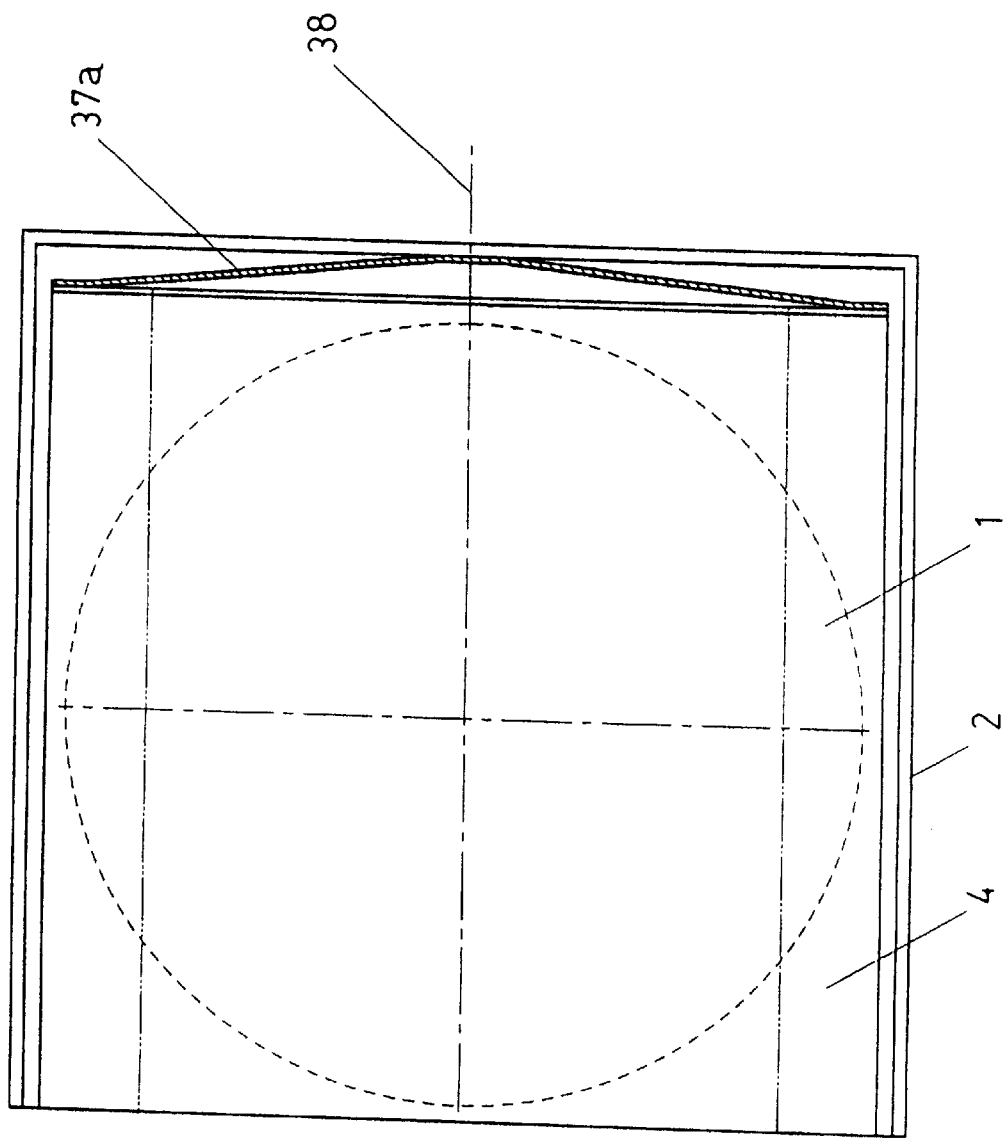
FIG. 31 is a schematic view showing the configuration and operation of a disk storage magazine in accordance with the third embodiment of the present invention.
Figure 32:
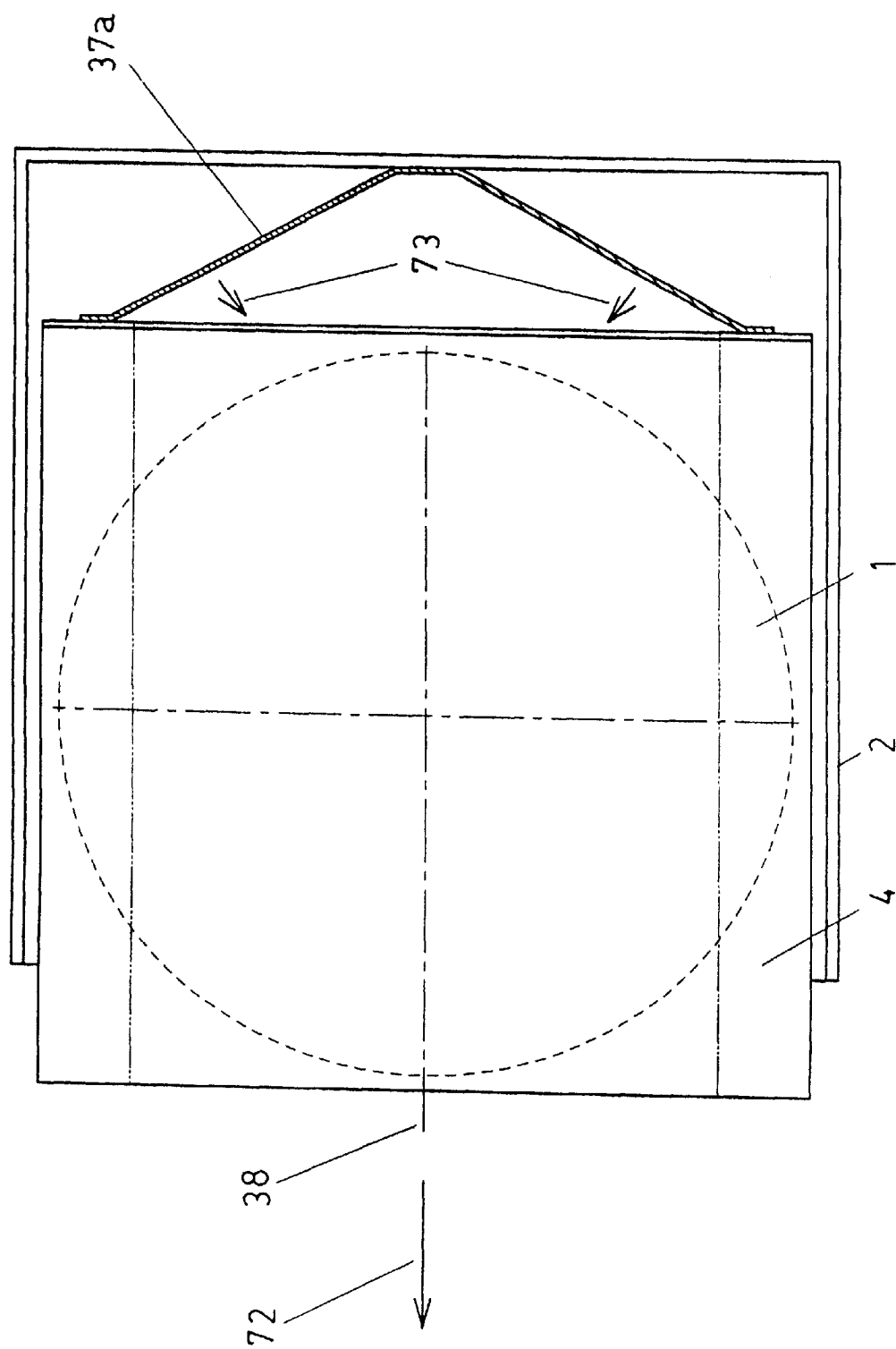
FIG. 32 is a schematic view showing the configuration and operation of a disk storage magazine in accordance with the third embodiment of the present invention.

To solve this problem, in this embodiment, a member for assisting the movement of the disk holding members 4 is provided. FIGS. 31 and 32 show the configuration of this member.

FIG. 31 shows a state in which the magazine case 2 is closed completely, and the disk holding members 4 and the disks 1 are stored completely in the magazine case 2. FIG. 32 shows a state in which the magazine case 2 is opened completely, and the disk holding members 4 have been moved in the magazine case 2 to a position where the disks 1 project. Reference numeral 37a denotes a disk discharge spring of a plate spring type for assisting the projection of the disks 1 held by the disk holding members 4. The disk discharge spring 37a is fitted symmetrically with respect to the center line 38. When the magazine case 2 is closed completely, as shown in FIG. 31, the disk holding members 4 are pressed to the inner side of the magazine case 2 by the link mechanism made up of the upper arm 34, lower arm 35, and middle arm 36, by which the disk holding members 4 are stored in the state in which the disk discharge spring 37a is compressed. At this time, the disk discharge spring 37a urges the disk holding members 4 in the direction in which the disks 1 are discharged from the magazine case 2. When the magazine case 2 is opened, as shown in FIG. 32, the disk holding members 4 are moved to the opening side of the magazine case 2 in the direction of the arrow 72 likewise by the link mechanism made up of the upper arm 34, lower arm 35, and middle arm 36. At this time, as the movement force for moving the disk holding members 4, a pressing force of the disk discharge spring 37a in the direction of the arrow 73 is added to the force transmitted from the link mechanism made up of the upper arm 34, lower arm 35, and middle arm 36.

By this configuration, even if the force transmitted from the link mechanism made up of the upper arm 34, lower arm 35, and middle arm 36 is insufficient, the disk holding members 4 can be moved by the pressing force of the disk discharge spring 37a. Also, since the disk discharge spring 37a presses positions which are symmetrical with respect to the centerline 38 of the disk holding members 4, a movement force deviating with respect to the disk holding members 4 is not given, and an unnecessary resisting force is not produced.

Figure 33:
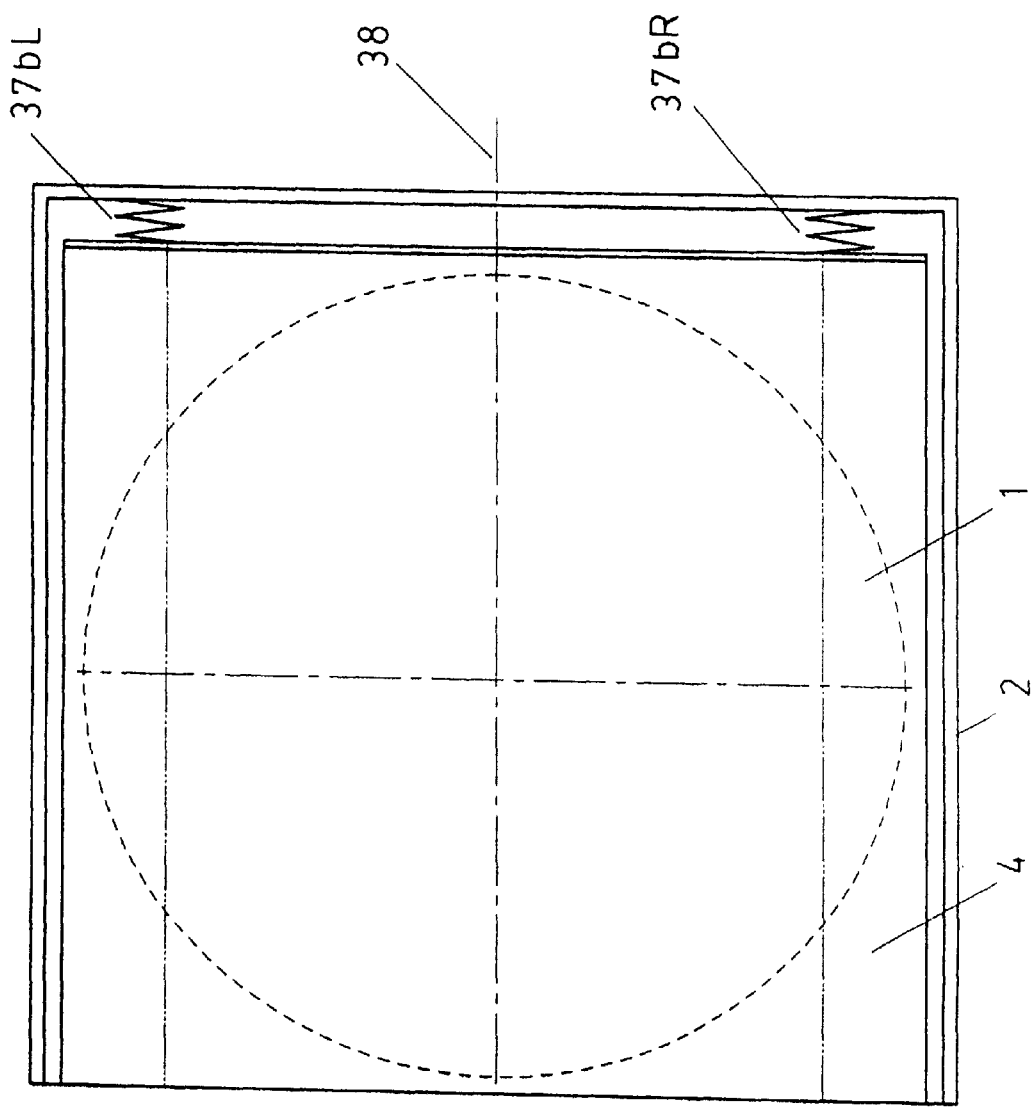
FIG. 33 is a schematic view showing the configuration and operation of a disk storage magazine in accordance with the third embodiment of the present invention.
Figure 34:
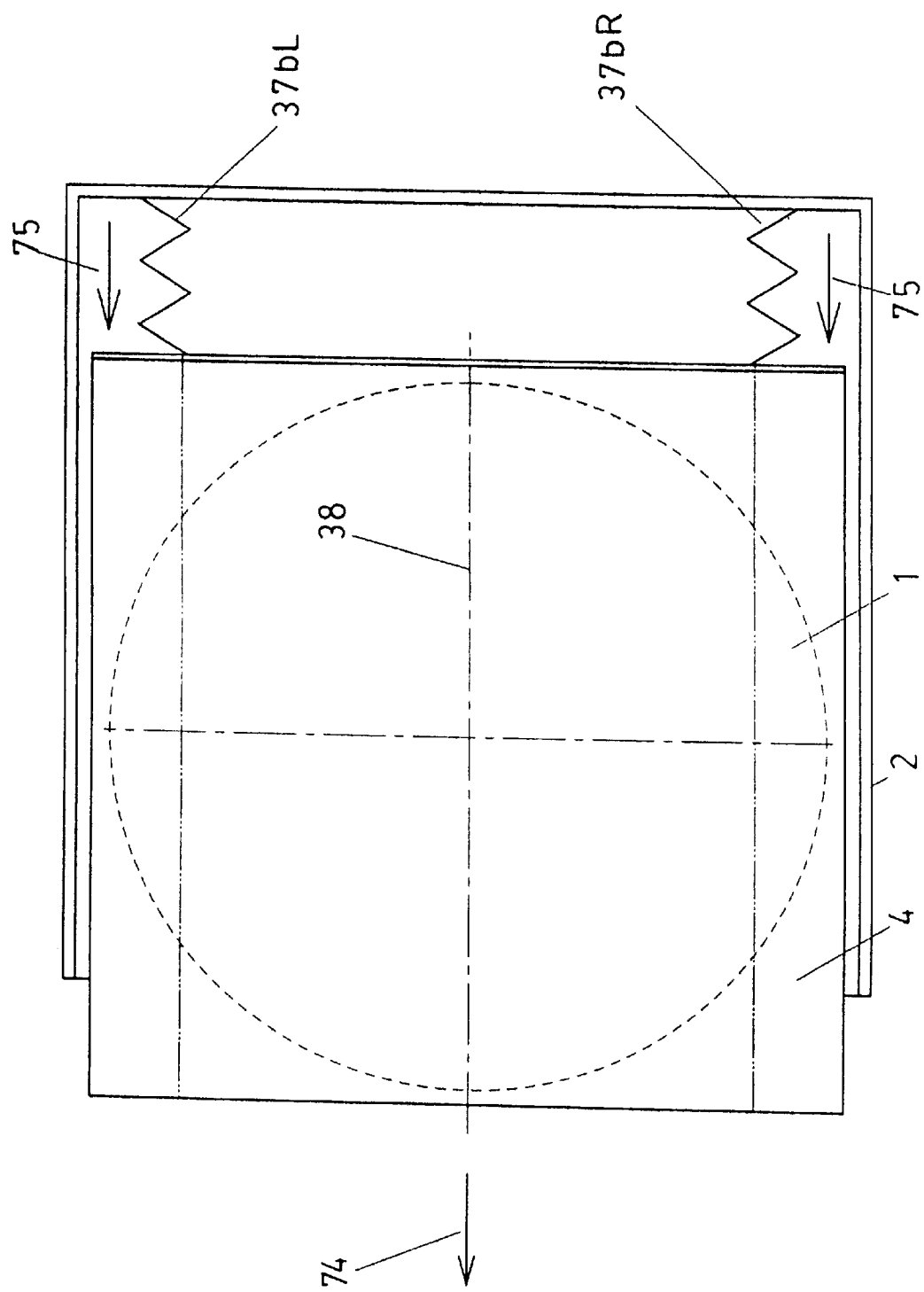
FIG. 34 is a schematic view showing the configuration and operation of a disk storage magazine in accordance with the third embodiment of the present invention.
Figure 35:
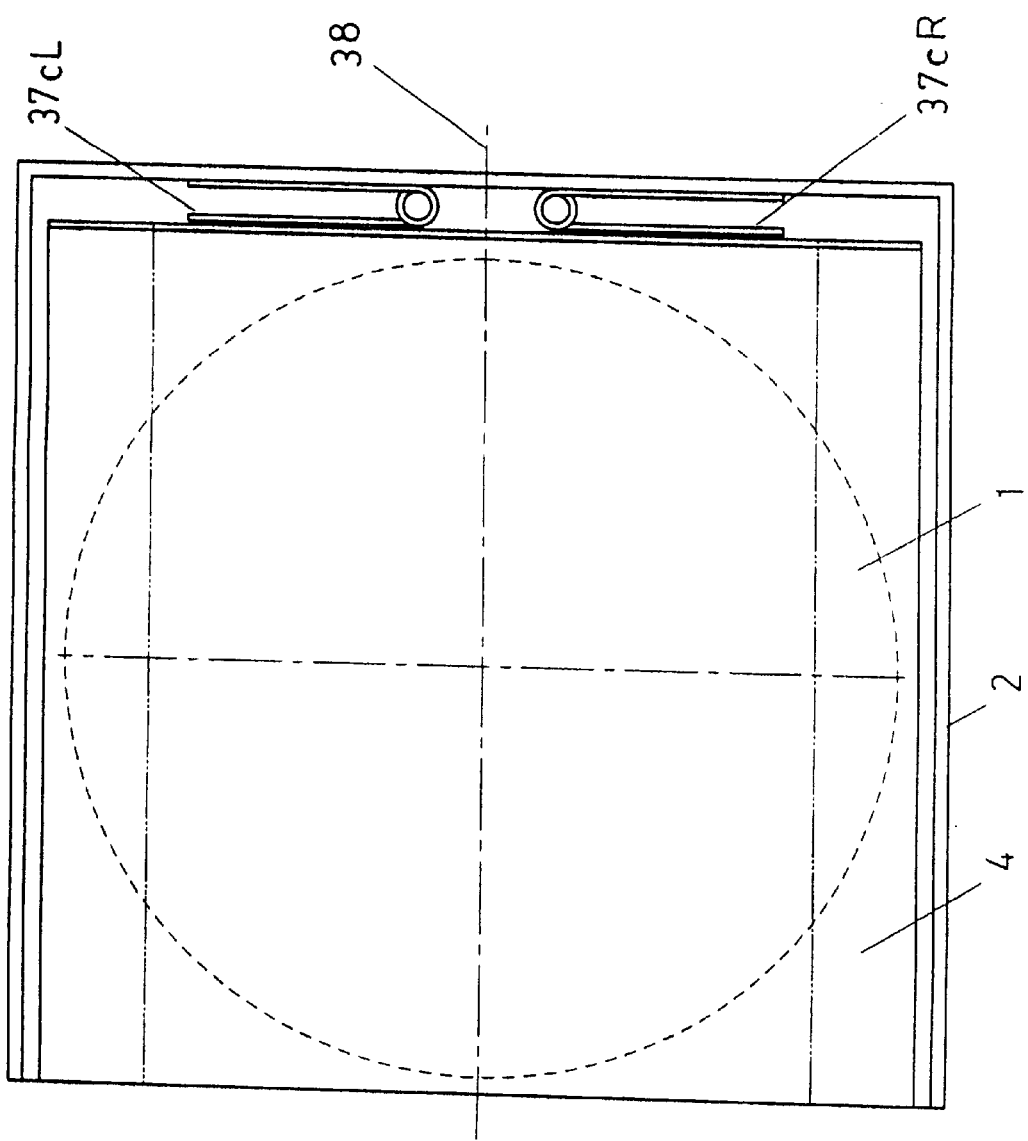
FIG. 35 is a schematic view showing the configuration and operation of a disk storage magazine in accordance with the third embodiment of the present invention.
Figure 36:
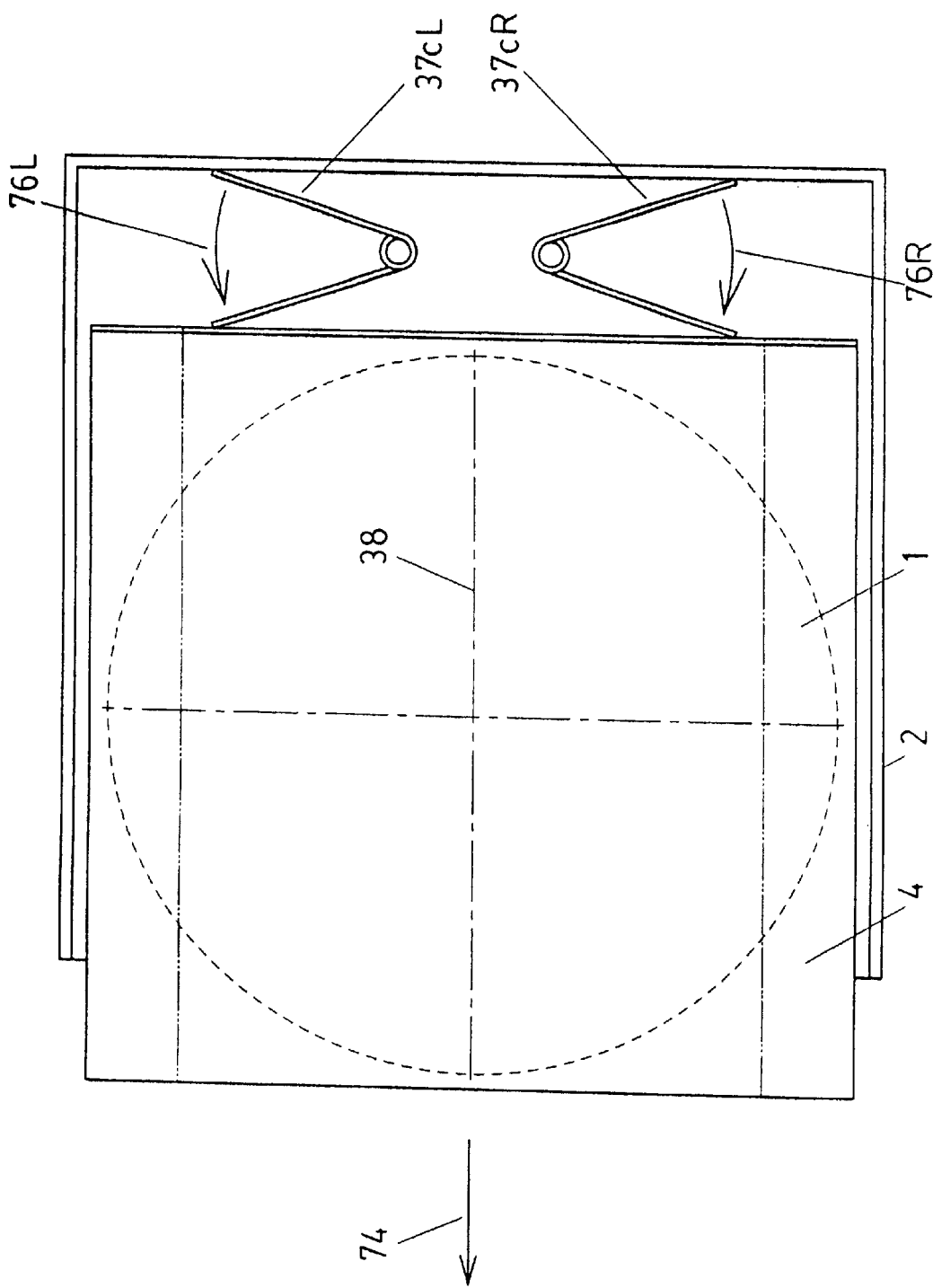
FIG. 36 is a schematic view showing the configuration and operation of a disk storage magazine in accordance with the third embodiment of the present invention.

FIGS. 33 and 34 and FIGS. 35 and 36 show configuration examples in which a disk discharge spring of any other type is used. FIGS. 33 and 34 show a configuration example in which compression coil springs are used as the disk discharge spring. FIGS. 35 and 36 show a configuration example in which torsion coil springs are used as the disk discharge spring.

In FIGS. 33 and 34, reference numerals 37bR and 37bL denote disk discharge springs of a compression coil spring type. FIG. 33 shows a state in which the magazine case 2 is closed completely, and the disk holding members 4 and the disks 1 are stored completely in the magazine case 2. FIG. 34 shows a state in which the magazine case 2 is opened completely, and the disk holding members 4 have been moved in the magazine case 2 to a position where the disks 1 project. The disk discharge springs 37bR and 37bL are arranged symmetrically with respect to the centerline 38. In this case as well, the same operation as that for the disk discharge spring of a plate spring type shown in FIGS. 31 and 32 is performed. Specifically, when the magazine case 2 is closed completely, as shown in FIG. 33, the disk holding members 4 are pressed to the inner side of the magazine case 2 by the link mechanism made up of the upper arm 34, lower arm 35, and middle arm 36, by which the disk holding members 4 are stored in the state in which the disk discharge springs 37bR and 37bL are compressed. When the magazine case 2 is opened, as shown in FIG. 34, the disk holding members 4 are moved to the opening side of the magazine case 2 in the direction of the arrow 74 likewise by the link mechanism made up of the upper arm 34, lower arm 35, and middle arm 36. At this time, a pressing force of the disk discharge springs 37bR and 37bL is added in the direction of the arrow 75. In this case as well, even if the force transmitted from the link mechanism made up of the upper arm 34, lower arm 35, and middle arm 36 is insufficient, the disk holding members 4 can be moved by the pressing force of the disk discharge springs 37bR and 37bL. Also, since the disk discharge springs 37bR and 37bL are arranged symmetrically with respect to the centerline 38, the disk holding members 4 can be pressed stably. Therefore, a movement force deviating with respect to the disk holding members 4 is not given, and an unnecessary resisting force is not produced.

In FIGS. 35 and 36, reference numerals 37cR and 37cL denote disk discharge springs of a torsion coil spring type. FIG. 35 shows a state in which the magazine case 2 is closed completely, and the disk holding members 4 and the disks 1 are stored completely in the magazine case 2. FIG. 36 shows a state in which the magazine case 2 is opened completely, and the disk holding members 4 have been moved in the magazine case 2 to a position where the disks 1 project. In this case, in the configuration in which the compression coil springs are used as the disk discharge springs, the compression coil springs are replaced with the torsion coil springs. As in the case where the compression coil springs are used, when the magazine case 2 is opened, the disk holding members 4 are moved to the opening side of the magazine case 2 in the direction of the arrow 74 by means of the link mechanism by the above-described operation, and a pressing force of the disk discharge springs 37cR and 37cL is added in the directions of the arrows 76R and 76L, respectively. In this case as well, even if the force transmitted from the link mechanism made up of the upper arm 34, lower arm 35, and middle arm 36 is insufficient, the disk holding members 4 can be moved by the pressing force of the disk discharge springs 37cR and 37cL. Also, since the disk discharge springs 37cR and 37cL are arranged symmetrically with respect to the centerline 38, the disk holding members 4 can be pressed stably. Therefore, a movement force deviating with respect to the disk holding members 4 is not given, and an unnecessary resisting force is not produced.

Figure 37:
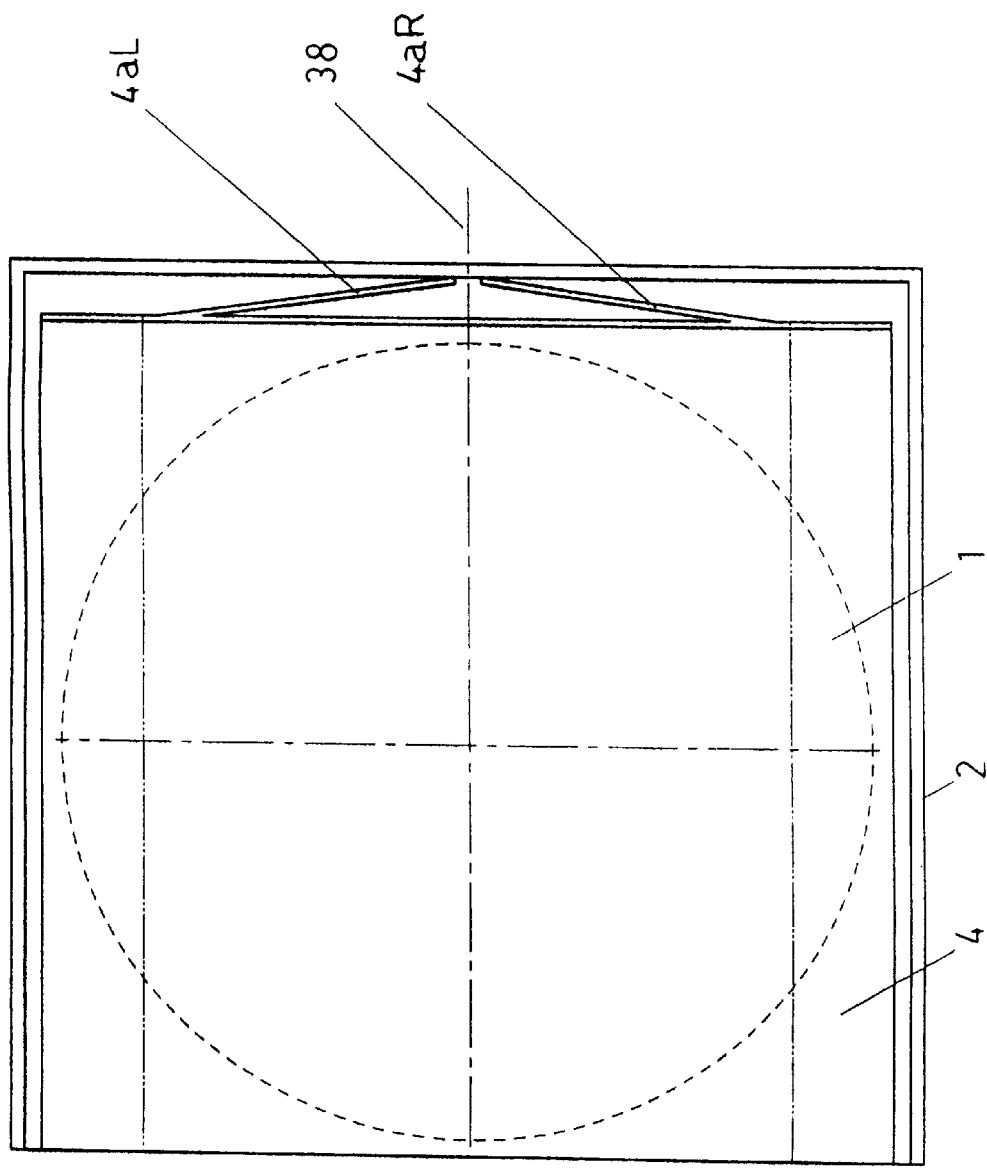
FIG. 37 is a schematic view showing the configuration and operation of a disk storage magazine in accordance with the third embodiment of the present invention.
Figure 38:
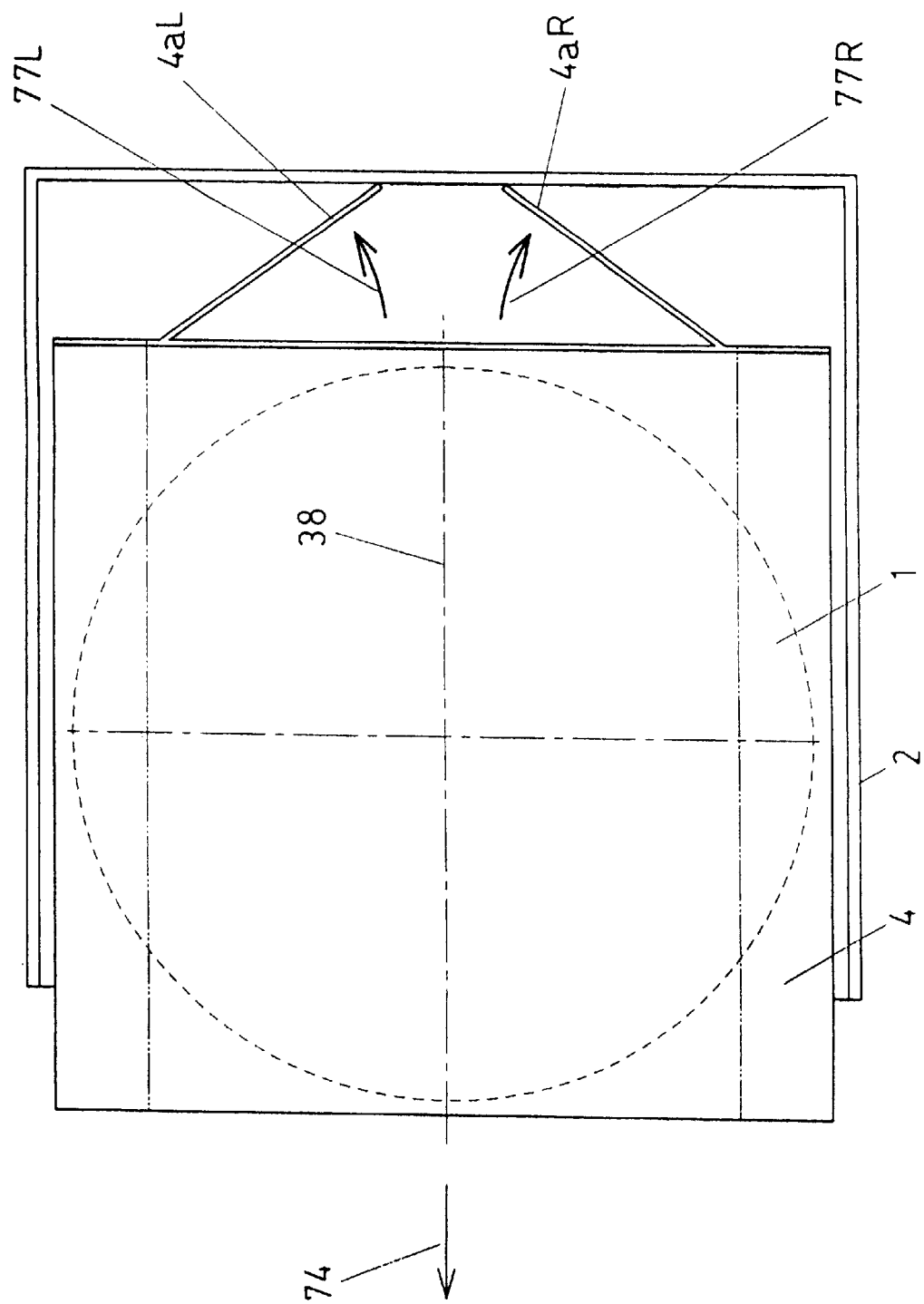
FIG. 38 is a schematic view showing the configuration and operation of a disk storage magazine in accordance with the third embodiment of the present invention.

In FIGS. 37 and 38, reference numerals 4aR and 4aL denote disk discharge springs integral with the disk holding members FIG. 37 shows a state in which the magazine case 2 is closed completely, and the disk holding members 4 and the disks 1 are stored completely in the magazine case 2. FIG. 38 shows a state in which the magazine case 2 is opened completely, and the disk holding members 4 have been moved in the magazine case 2 to a position where the disks 1 project. In this case, in the above-described configuration in which the compression coil springs or the torsion coil springs are used as the disk discharge springs, the compression coil springs or the torsion coil springs are replaced with the disk discharge springs integral with the disk holding members. As in the case where the compression coil springs are used, when the magazine case 2 is opened, the disk holding members 4 are moved to the opening side of the magazine case 2 in the direction of the arrow 74 by means of the link mechanism by the above-described operation, and a pressing force of the disk discharge springs 4aR and 4aL is added in the directions of the arrows 77R and 77L, respectively. In this case as well, even if the force transmitted from the link mechanism made up of the upper arm 34, lower arm 35, and middle arm 36 is insufficient, the disk holding members 4 can be moved by the pressing force of the disk discharge springs 4aR and 4aL. Also, since the disk discharge springs 4aR and 4aL are arranged symmetrically with respect to the centerline 38, the disk holding members 4 can be pressed stably. Therefore, a movement force deviating with respect to the disk holding members 4 is not given, and an unnecessary resisting force is not produced.

Figure 39:
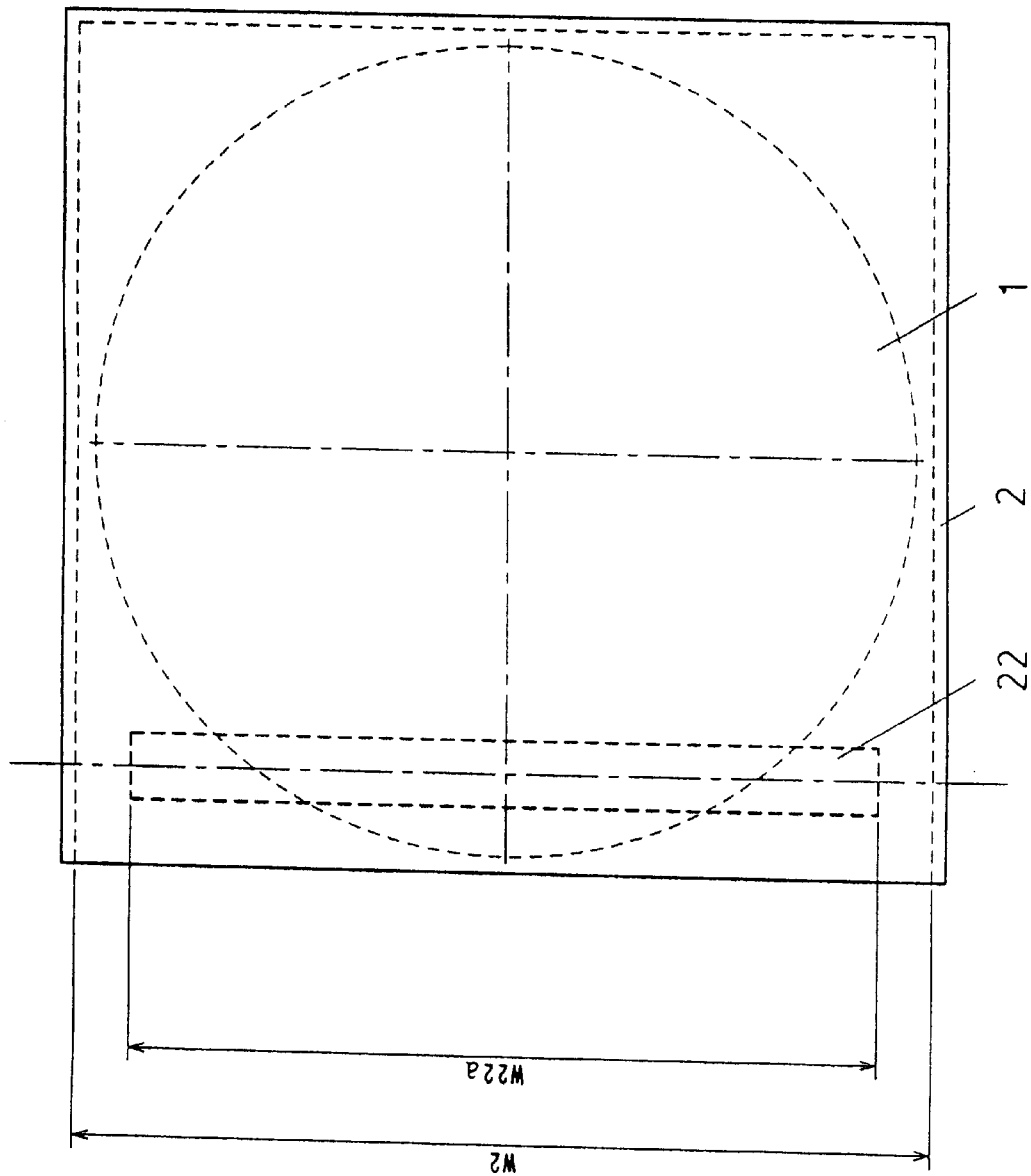
FIG. 39 is a parts dimensional relation view of a disk storage magazine in accordance with an embodiment of the present invention.

FIG. 39 shows the configuration and operation of a disk storage magazine in which the disk 1 does not move to the disk removal side even if the magazine case 2 is opened, showing a positional relation and a dimensional relation between the conveying rollers 22 and the magazine case 2 and the disk 1 for the disk storage magazine in the case where the magazine case 2 and the recording/reproducing apparatus as shown in, for example, FIGS. 15 to 21, FIG. 22, and FIG. 26 are used.

As shown in FIG. 39, in this embodiment, even if the magazine case 2 is opened, the disk 1 does not move to the disk removal side and does not project from the magazine case 2, so that the conveying rollers 22 for removing the disk 1 is formed so that the width dimension W22a thereof is smaller than the width dimension W2 of the magazine case 2. In order for the conveying rollers 22 to hold the disk 1 therebetween, the conveying rollers 22 move to the interior of the magazine case 2 and hold the disk 1 therebetween, and subsequently return to the outside of the magazine case 2 to take out the disk 1.

Figure 40:
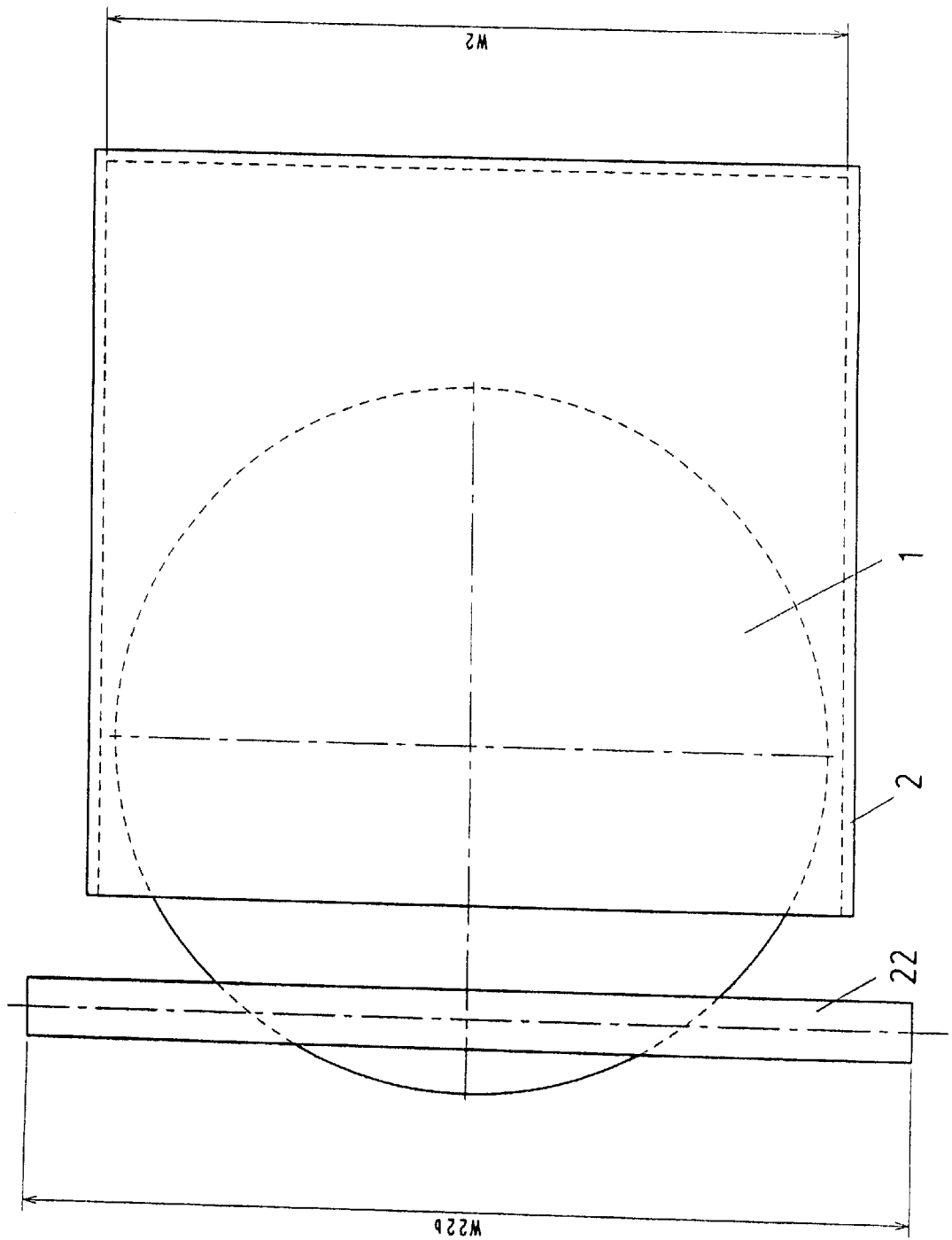
FIG. 40 is a parts dimensional relation view of a disk storage magazine in accordance with the third embodiment of the present invention.

FIG. 40 shows a positional relation between the conveying roller 22 and the magazine case 2 and the disk 1 for the disk storage magazine configured (for example, the magazine case 2 as shown in FIGS. 29 and 30) so that the disk 1 moves to the removal side in connection with the opening operation of the magazine case 2.

As shown in FIG. 40, in this embodiment, when the magazine case 2 is opened, the disk 1 moves to the disk removal side in connection with this opening operation, and projects from the magazine case 2 to be exposed, so that the disk 1 can be held between the conveying rollers 22 at the outside portion of the magazine case 2. Therefore, the width dimension W22b of the conveying rollers 22 need not be smaller than the width dimension W2 of the magazine case 2. When the disk 1 is held between the conveying rollers 22, the conveying rollers 22 can hold the disk 1 therebetween and take it out merely by moving to the vicinity of the magazine case 2.

If the configuration is such that the disk holding members 4 move to the disk removal side with respect to the magazine case 2 in connection with the opening operation of the magazine case 2, the effect as described above can be achieved. When the disk storage magazine is only configured, as shown in FIG. 29 or FIG. 30, since the disk holding members 4 are separate from the magazine case 2, the disk holding members 4 are separated from the magazine case 2 while opposing to the upper and lower surfaces of the magazine case 2 when the disk holding members 4 project from the magazine case 2. Therefore, the expanding operation of the bellows shape of the disk holding member 4 cannot utilize a force due to the opening operation of the magazine case 2, and is performed merely by the spring force that the disk holding member 4 itself has. For this reason, the expansion of the disk holding member 4 is unstable. The disk 1 is conveyed by the conveying rollers 15 while the disk holding members 4 are not expanded sufficiently, so that the disk 1 comes into contact with the disk holding member 4, and there is a possibility of a scratch being produced on the surface of the disk 1.

Figure 41:
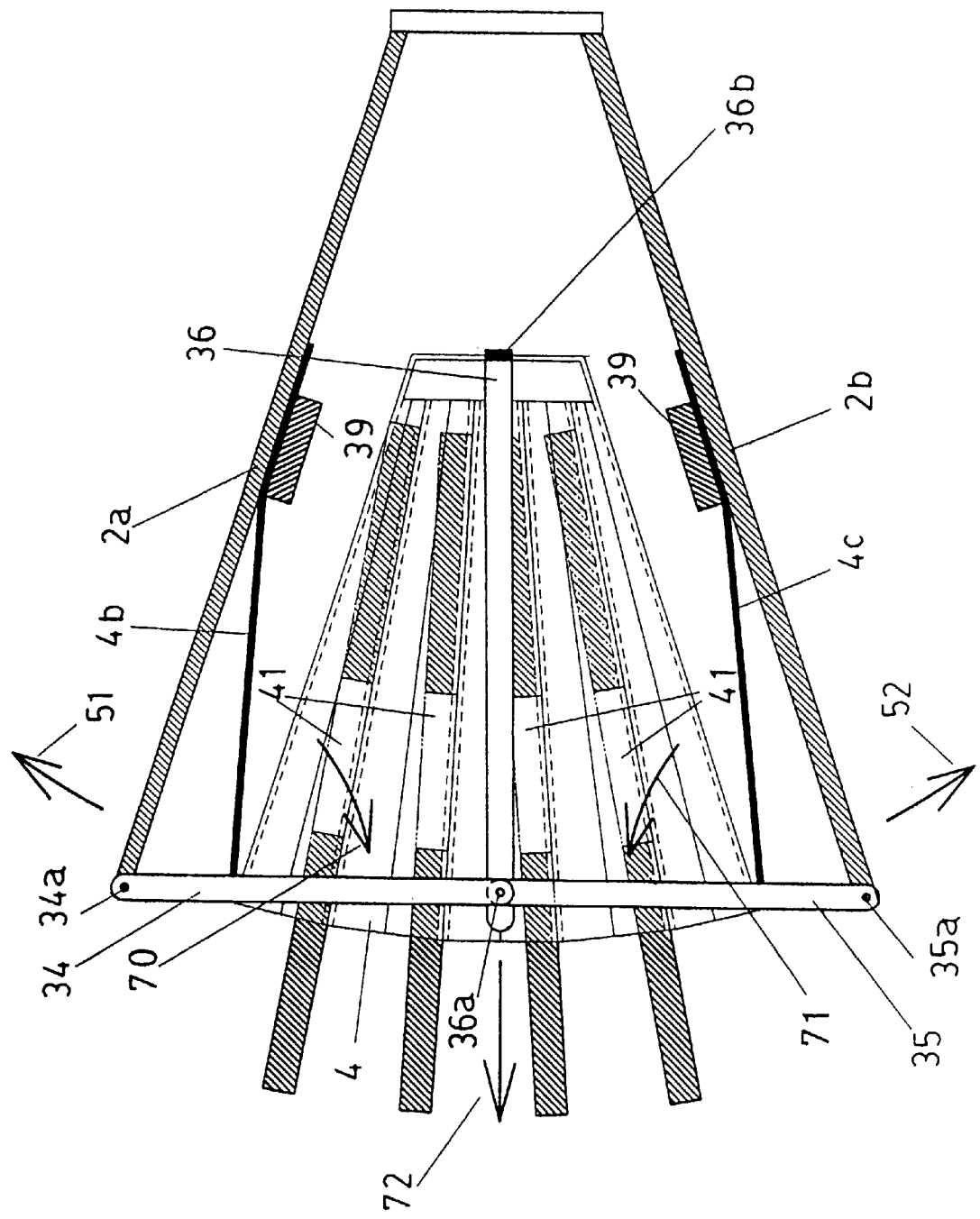
FIG. 41 is a schematic view showing the configuration and operation of a disk storage magazine in accordance with the third embodiment of the present invention.
Figure 42:
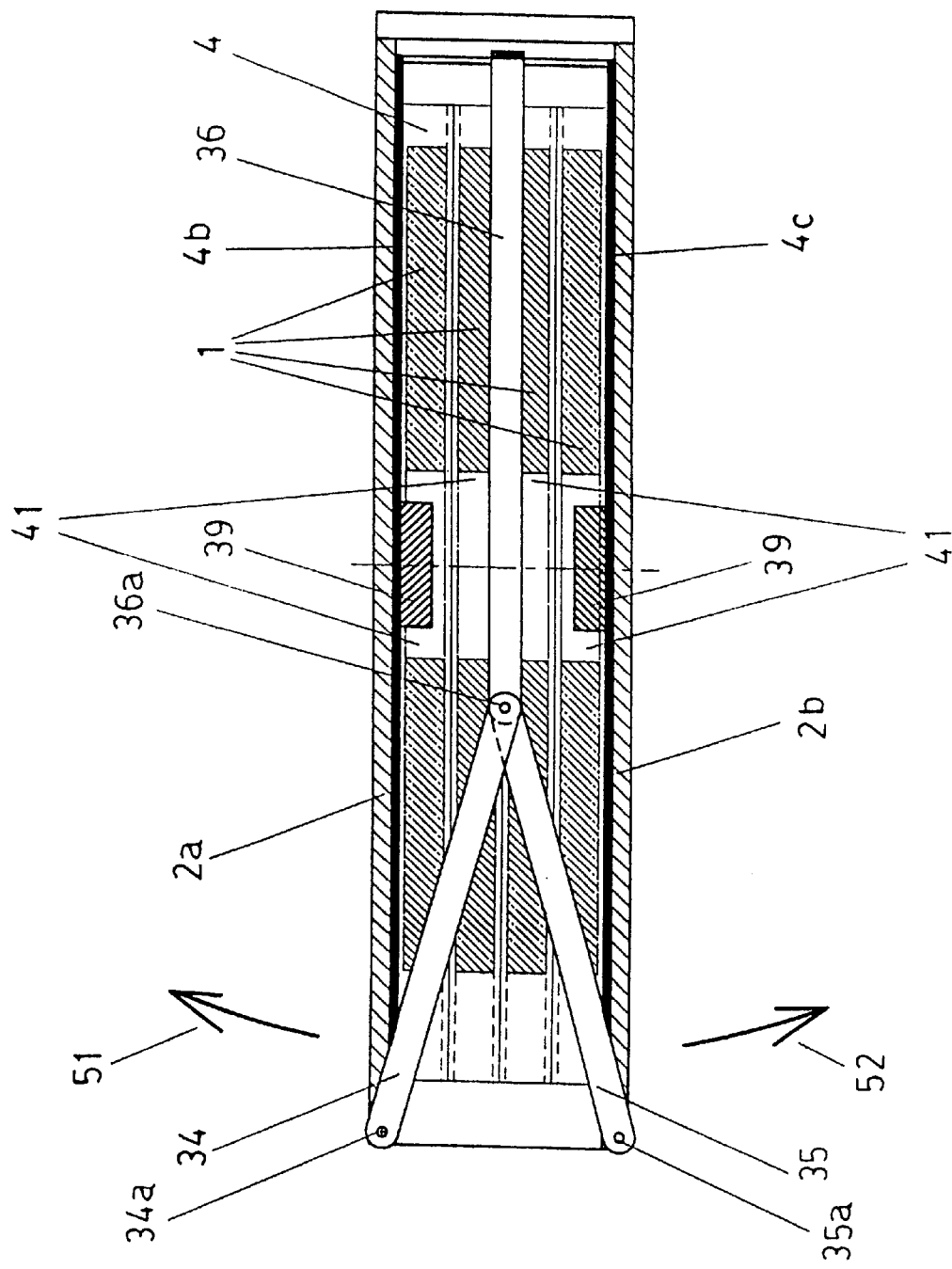
FIG. 42 is a schematic view showing the configuration and operation of a disk storage magazine in accordance with the third embodiment of the present invention.
Figure 43:
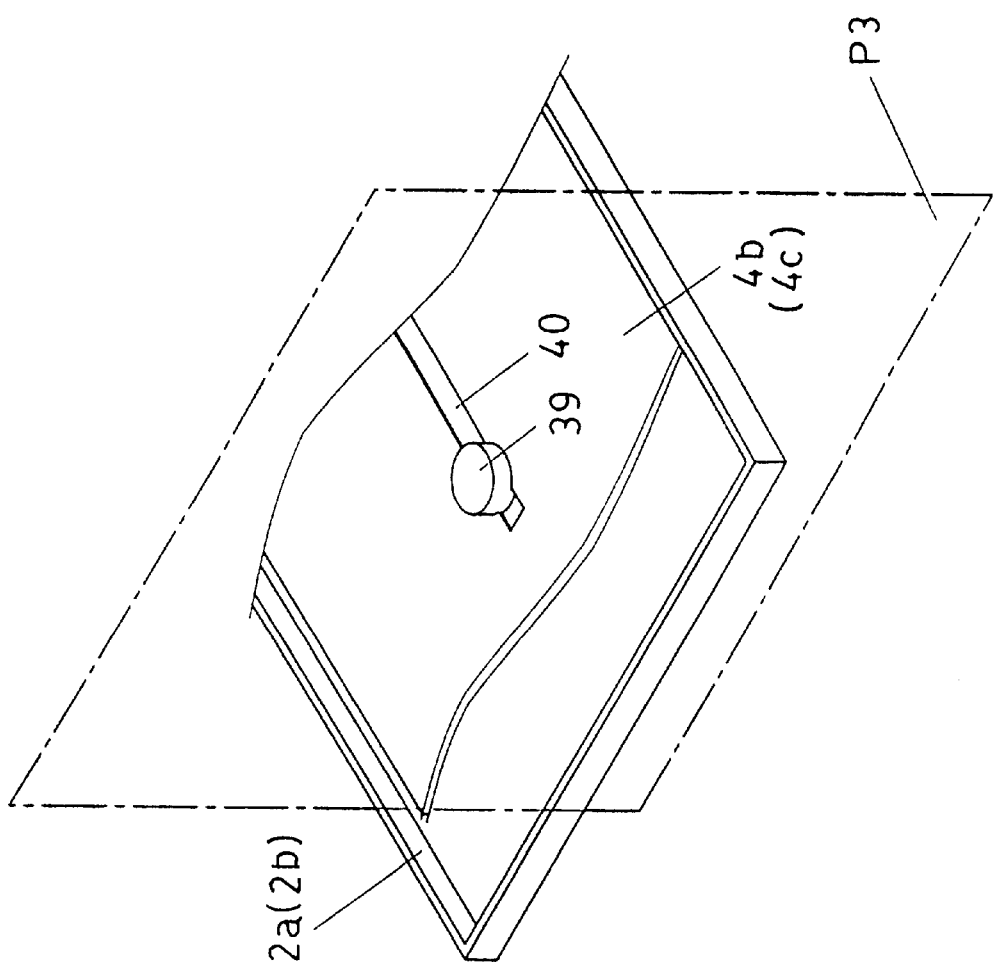
FIG. 43 is a partial detailed view of a disk storage magazine in accordance with the third embodiment of the present invention.
Figure 44:
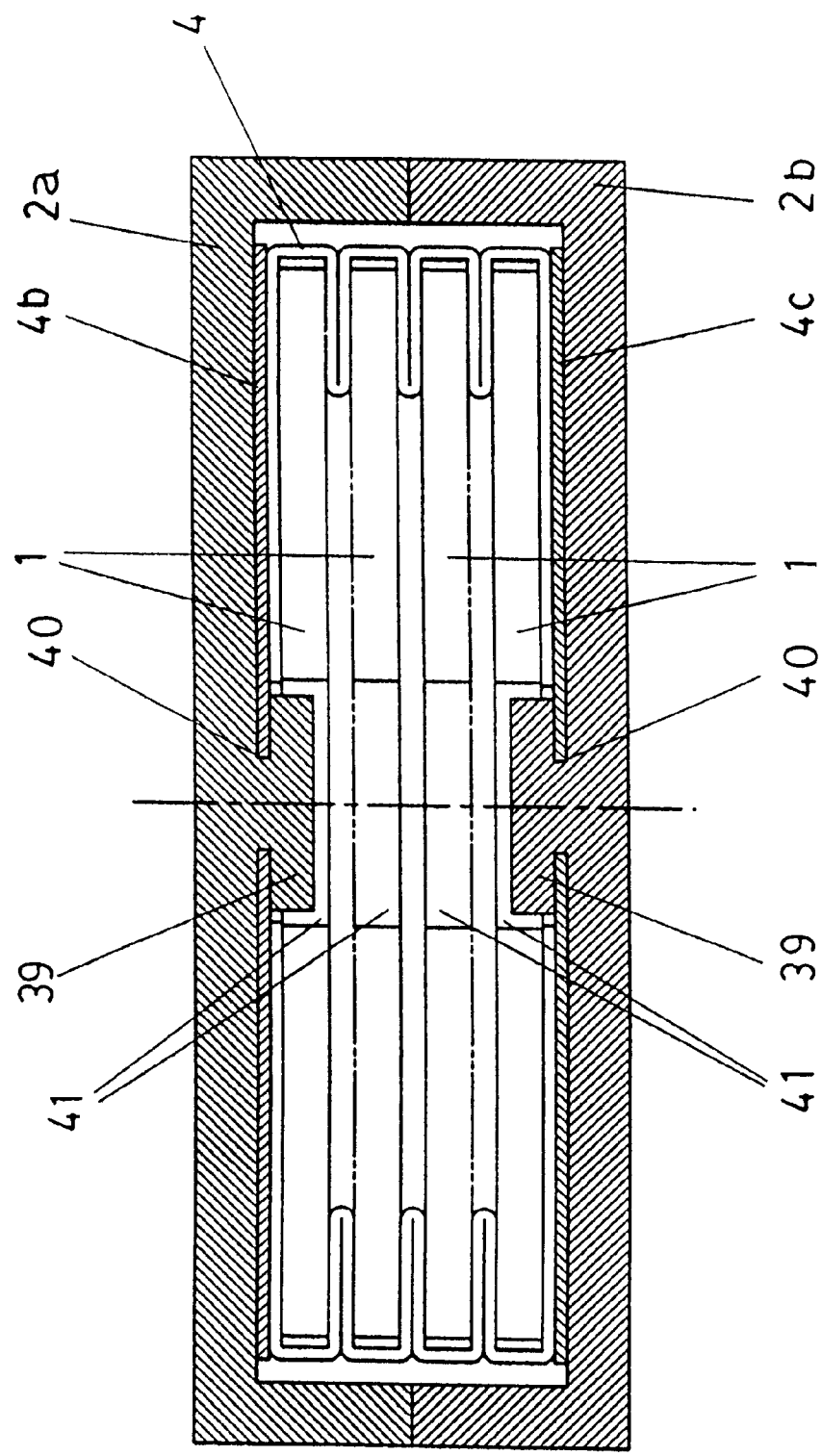
FIG. 44 is a partially sectional view of a disk storage magazine in accordance with the third embodiment of the present invention.

To solve this problem, this embodiment is configured so that the disk holding member 4 is partially connected to the magazine case 2 to assist the expansion of the disk holding member 4. FIG. 41 is a schematic view showing a state in which there is further provided engagement portions for engaging the disk holding member 4 with the magazine case 2 in the state shown in FIG. 30. FIG. 42 shows a closed state in the configuration shown in FIG. 41. Also, FIG. 43 is a perspective view of the engagement portion, and FIG. 44 is a schematic view showing the cross section on the plane P3 in FIG. 43. In FIGS. 41 to 44, reference numeral 39 denotes an engagement portion, and 40 denotes a slit-shaped engagement hole which is formed in the disk holding member 4 and engages with the engagement portion 39. Also, reference numerals 4b and 4c denote sheet-shaped engagement faces which are formed with the engagement hole 40 and are continuous with the disk holding member 4. As shown in FIG. 39, since the engagement hole 40 is in a slit shape, the engagement faces 4b and 4c are movable in the coming-off direction of the disk 1 with respect to the engagement portion 39. Thus, the expanding operation of the bellows shape of the disk holding member 4 continuous with the engagement faces 4b and 4c can be performed by utilizing the force due to the opening operation of the magazine case 2.

By this configuration, the expanding operation of the disk holding member 4 can be interlocked completely with the opening operation of the magazine case 2, providing a stable operation. Moreover, as shown in FIGS. 42 and 44, in the state in which the magazine case 2 is closed, the engagement portion 39 is accommodated in a space formed by the center hole 41 of the disk 1, so that even if the engagement portion 39 is provided, the outside dimensions of the magazine case 2 is unchanged as compared with the case where the engagement portion 39 is not provided.

The following is a description of an embodiment in which an opening/closing spring is provided, which spring gives an urging force to the magazine case 2 in the closing direction when the magazine case 2 is closed completely and gives an urging force to the magazine case 2 in the opening direction when the magazine case is open.

Figure 45:
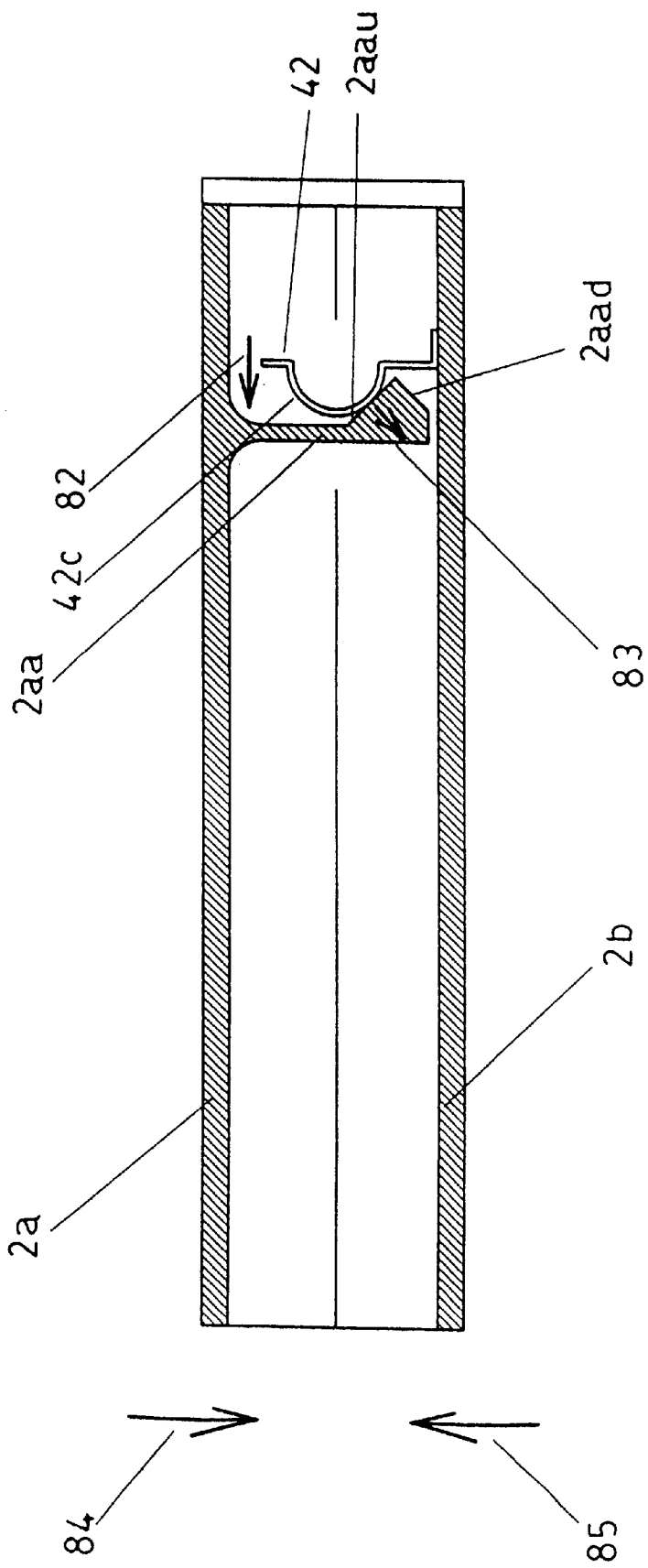
FIG. 45 is a schematic view showing the configuration and operation of a disk storage magazine in accordance with a fourth embodiment of the present invention.
Figure 46:
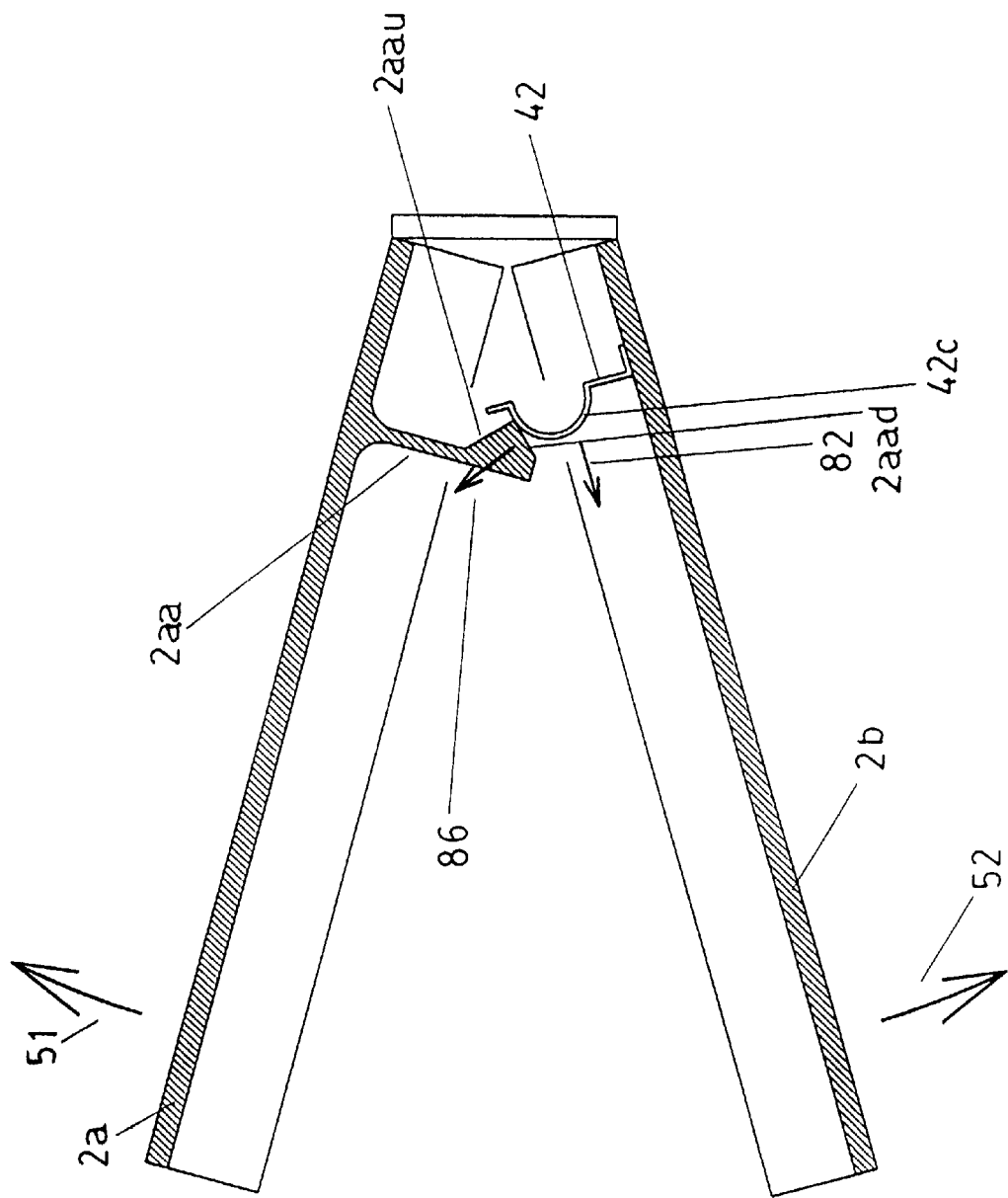
FIG. 46 is a schematic view showing the configuration and operation of a disk storage magazine in accordance with the fourth embodiment of the present invention.
Figure 47:
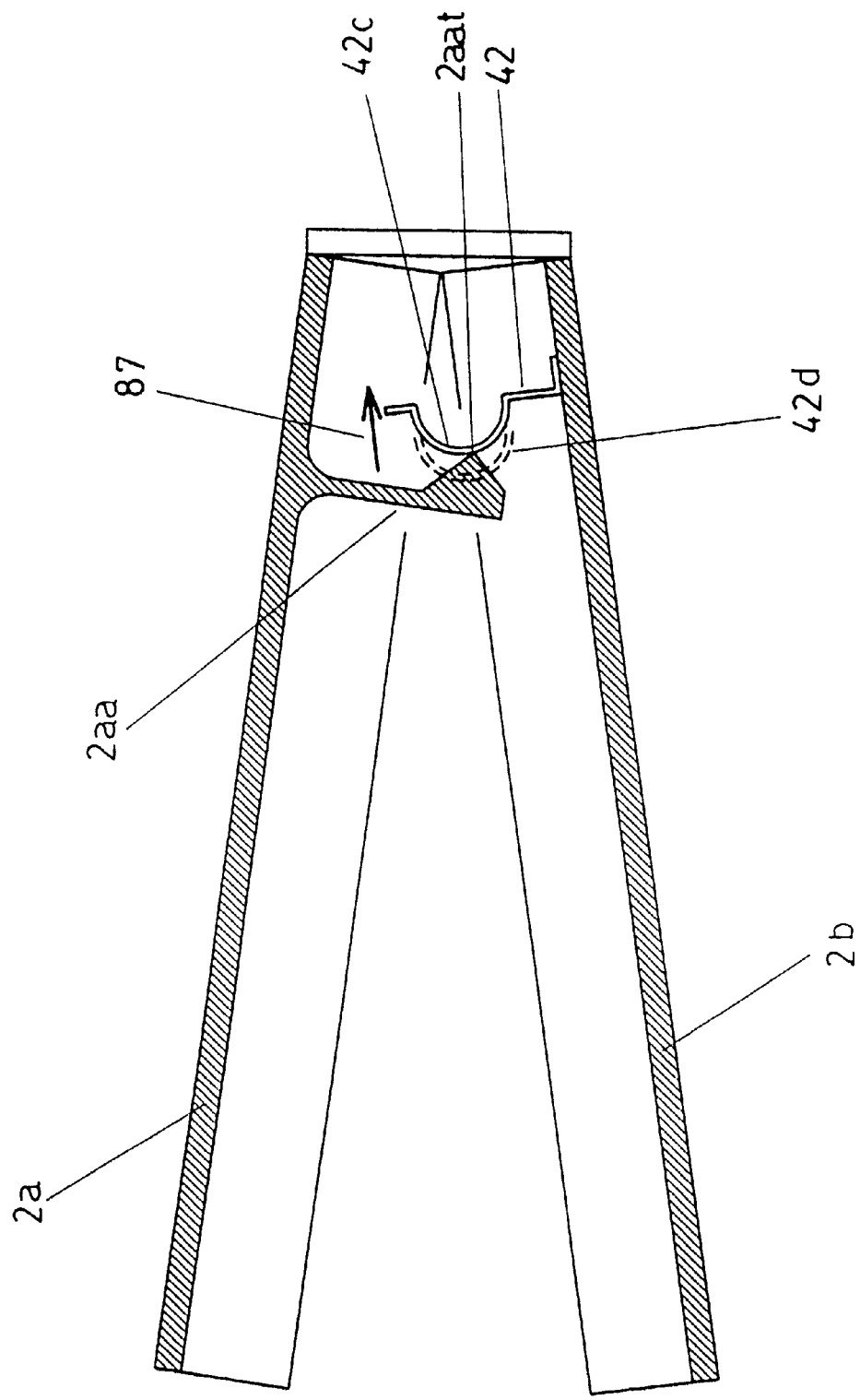
FIG. 47 is a schematic view showing the configuration and operation of a disk storage magazine in accordance with the fourth embodiment of the present invention.
Figure 48:
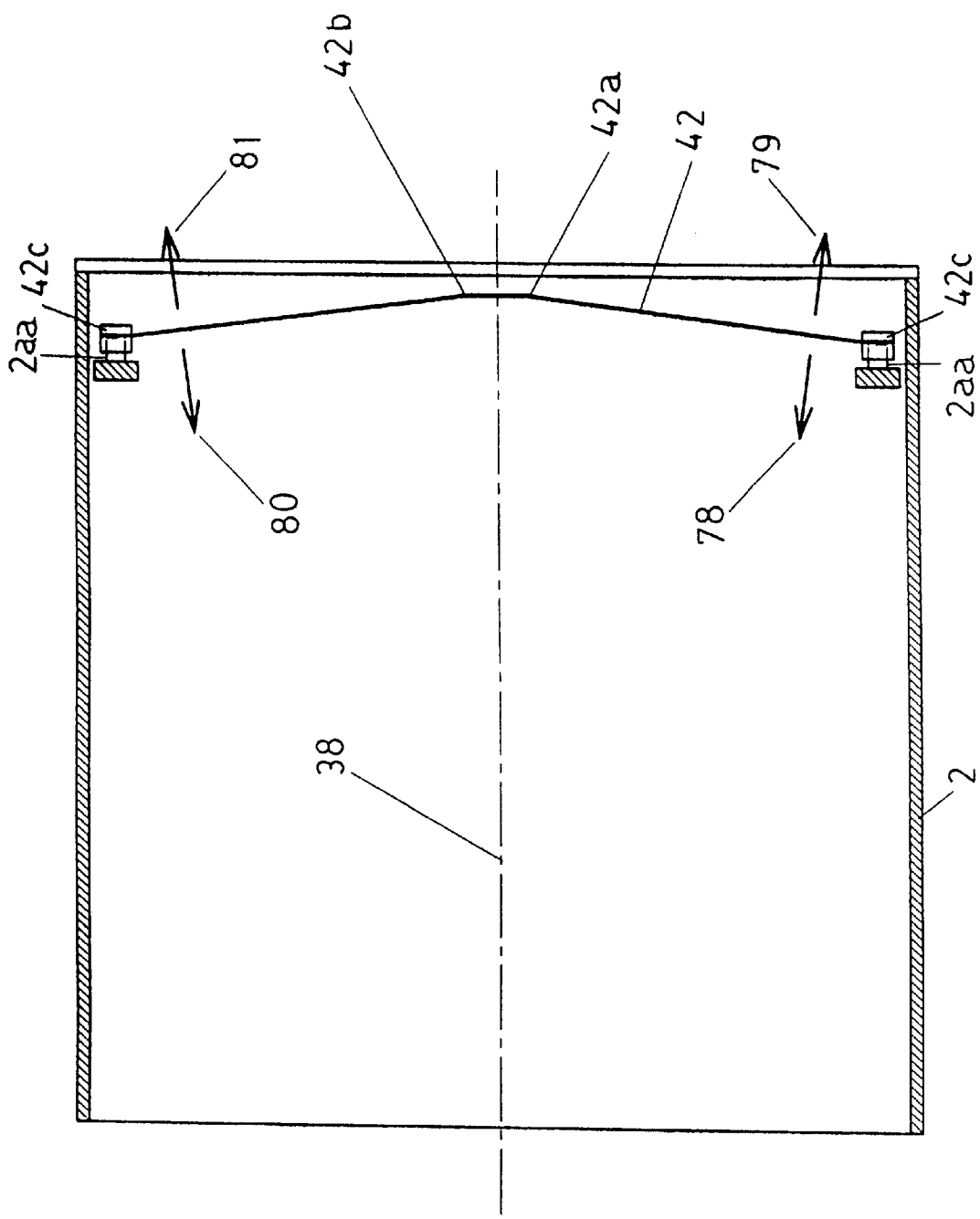
FIG. 48 is a schematic view showing the configuration and operation of a disk storage magazine in accordance with the fourth embodiment of the present invention.

FIGS. 45 to 47 are views showing the operation of the opening/closing spring, showing a cross section on a plane perpendicular to the opening support axis in the opening operation of the magazine case 2. FIG. 48 is a view showing a configuration of the opening/closing spring projected from the direction perpendicular to the surface of the disk 1. In FIGS. 45 to 48, reference numeral 42 denotes an opening/closing spring of a plate spring type, and 2aa denotes an opening/closing claw added to the upper plate 2a of the magazine case 2 for pressing the upper plate 2a on the lower plate 2b by being subjected to the urging force of the opening/closing spring 42. Also, reference numerals 42a and 42b denote bend portions of the opening/closing spring 42 located symmetrically with respect to the centerline 38. The opening/closing spring 42, having a shape shown in FIG. 48, is displaced in the direction of the arrow 78 or 79 with the bend portion 42a being the support point on the lower side of the centerline 38 in FIG. 48, and is displaced in the direction of the arrow 80 or 81 with the bend portion 42b being the support point on the upper side of the centerline 38. Thereby, the upper plate 2a and the lower plate 2b can be subjected to the closing force and the opening force by the opening/closing spring 42 symmetrically with respect to the centerline 38. Therefore, the opening/closing force can be obtained in a stable state, so that an unnecessary resisting force is not produced.

When the magazine case 2 is closed completely, as shown in FIG. 45, the opening/closing spring 42 gives a force in the direction of the arrow 82 to the opening/closing claw 2aa, and a curved portion 42c formed on the opening/closing spring 42 gives a force in the direction of the arrow 83 to an oblique line 2aau formed on the opening/closing claw 2aa. Thereby, the upper plate 2a and the lower plate 2b are subjected to a force for turning the plates in the directions of the arrows 84 and 85, respectively. That is to say, the magazine case 2 is subjected to an urging force in the closing direction.

When the magazine case 2 is opened completely, as shown in FIG. 46, the opening/closing spring 42 also gives a force in the direction of the arrow 82 to the opening/closing claw 2aa, and a curved portion 42c formed on the opening/closing spring 42 gives a force in the direction of the arrow 86 to an oblique line 2aad formed on the opening/closing claw 2aa. Thereby, the upper plate 2a and the lower plate 2b are subjected to a force for turning the plates in the directions of the arrows 51 and 52, respectively. That is to say, the magazine case 2 is subjected to an urging force in the opening direction.

During the time when the magazine case 2 is being opened or closed, as shown in FIG. 47, at the time when an apex 2aat of the opening/closing claw 2aa passes through an apex of the curved portion 42c, an urging force in the direction of the arrow 87 to the opening/closing spring 42 becomes maximum. At this specific point of time, a turning force in the opening/closing direction is not given to the upper plate 2a. However, on the closing side of this point of time, the upper plate 2a and the lower plate 2b can be subjected to a turning force in the closing direction, and on the opening side, the upper plate 2a and the lower plate 2b can be subjected to a turning force in the opening direction.

By this configuration, there is no need for providing an external mechanism for maintaining the opening state or closing state of the magazine case 2, so that the configuration can be simplified.

Figure 49:
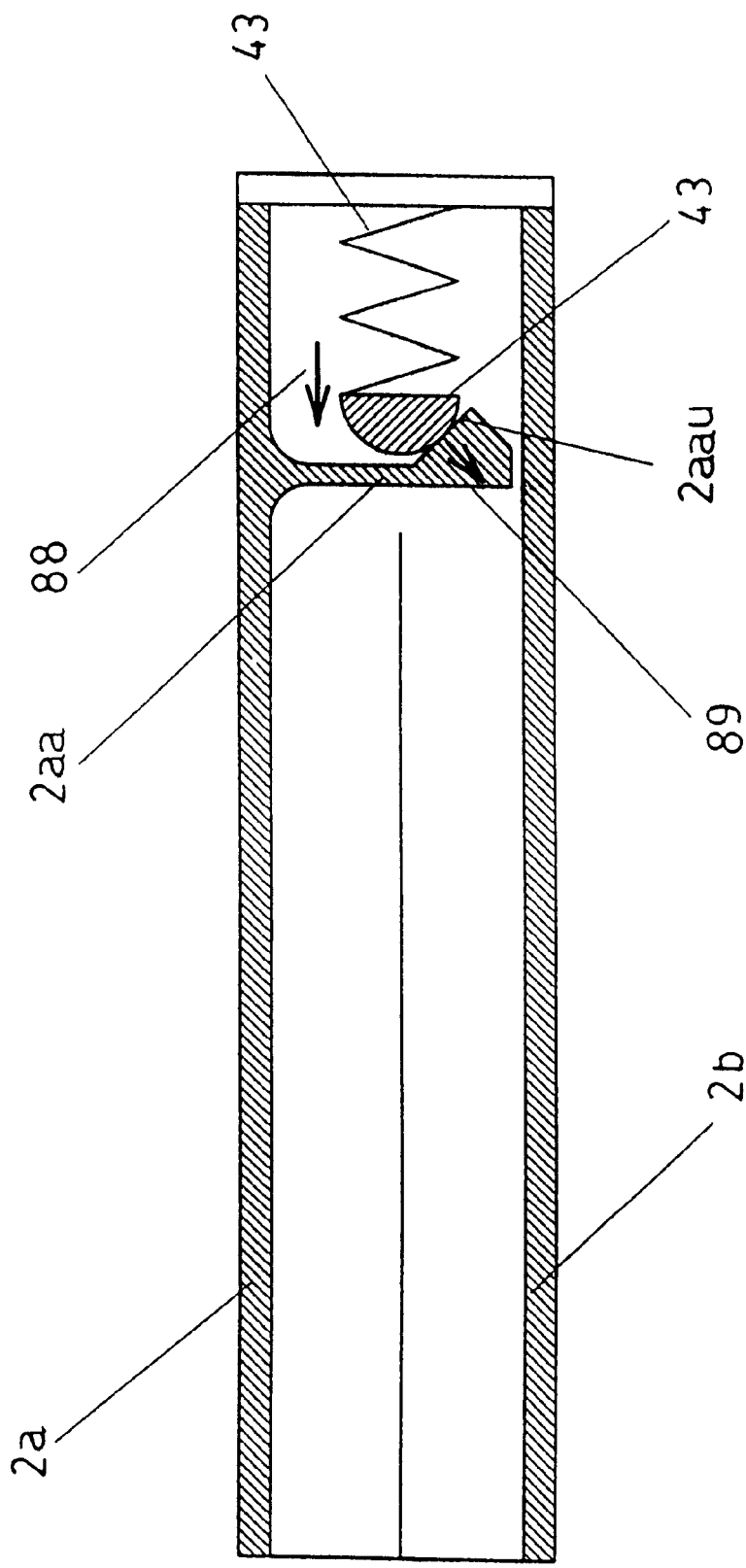
FIG. 49 is a schematic view showing the configuration and operation of a disk storage magazine in accordance with the fourth embodiment of the present invention.
Figure 50:
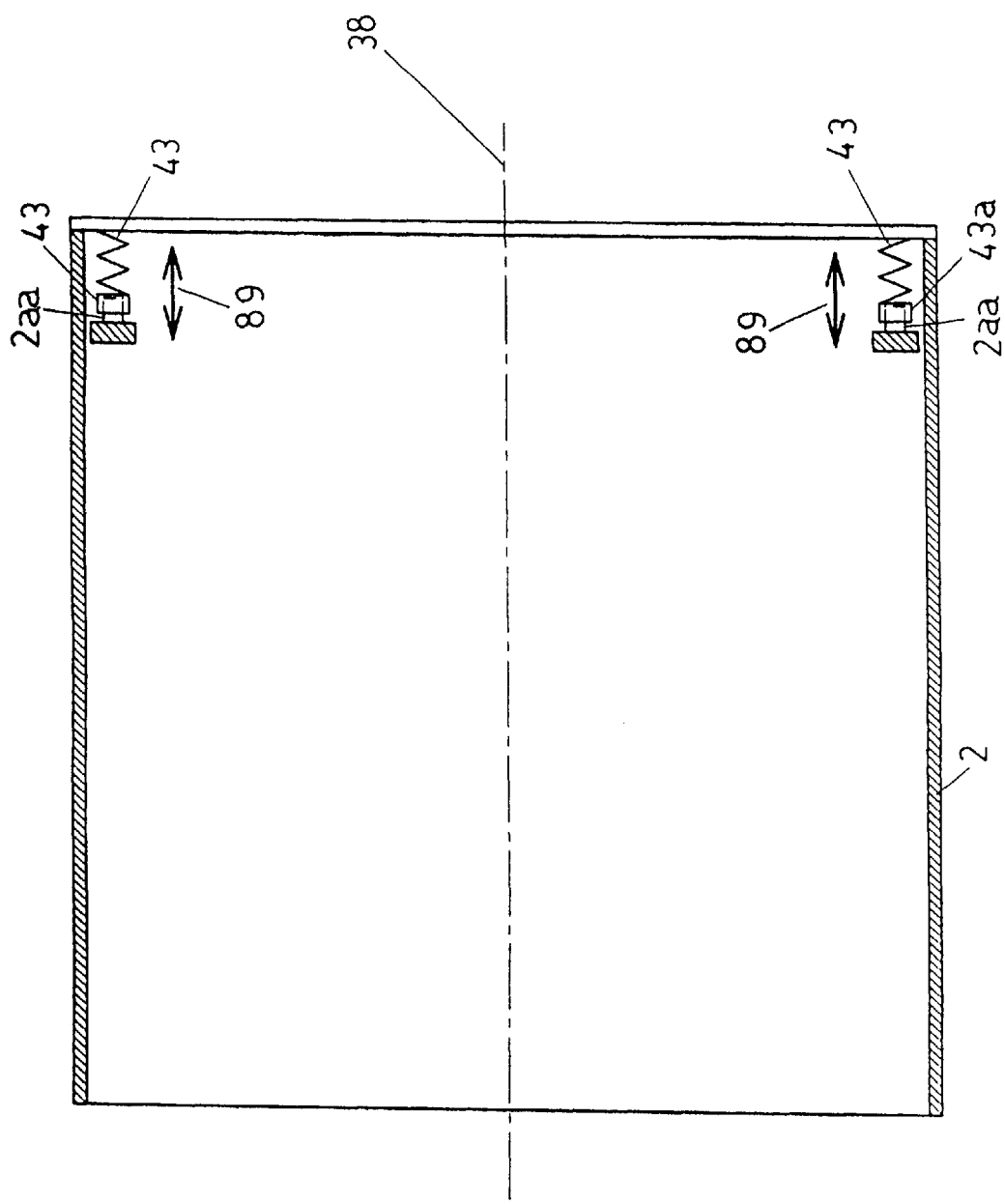
FIG. 50 is a schematic view showing the configuration and operation of a disk storage magazine in accordance with the fourth embodiment of the present invention.
Figure 51:
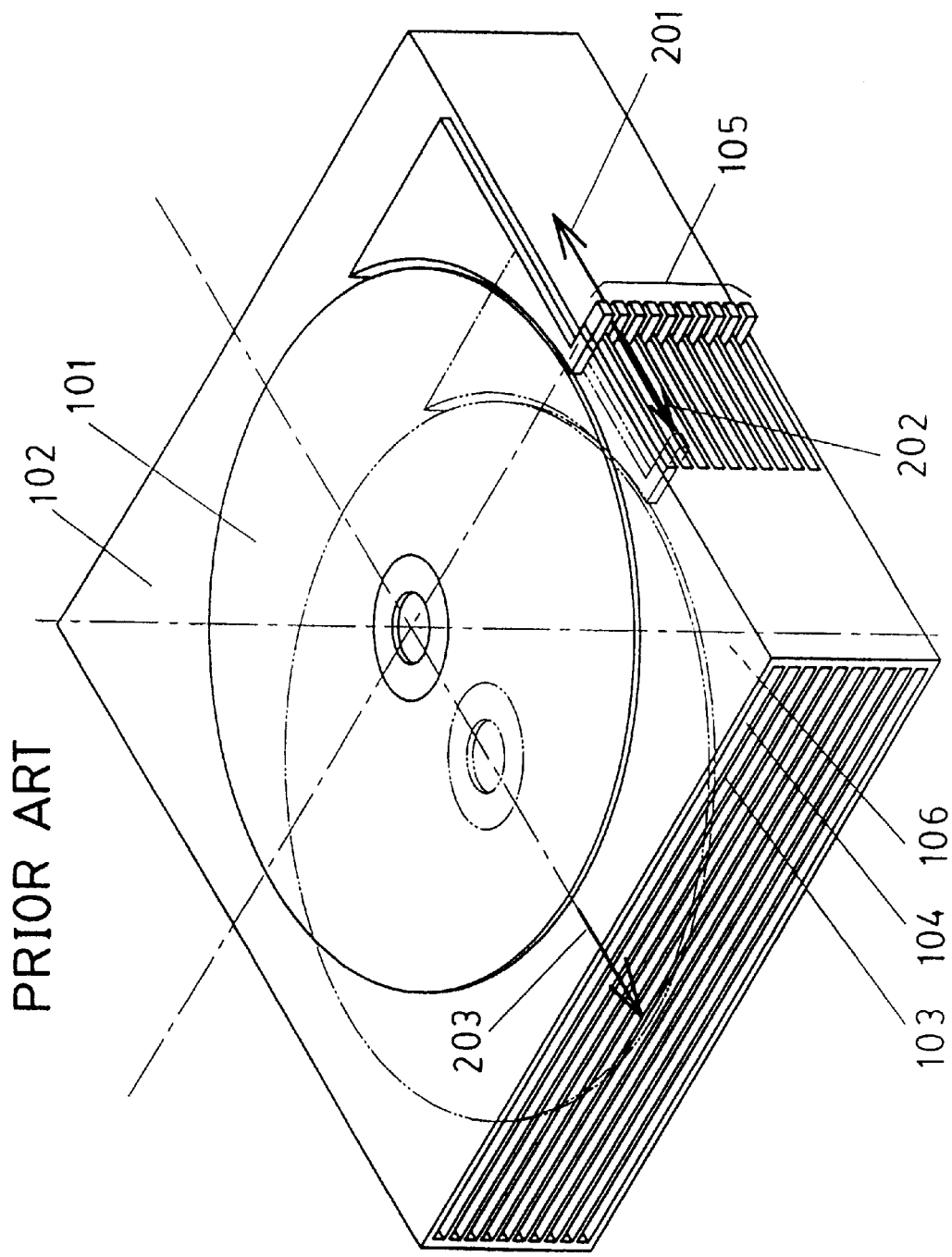
FIG. 51 is a schematic appearance view of a conventional disk storage magazine.
Figure 52:
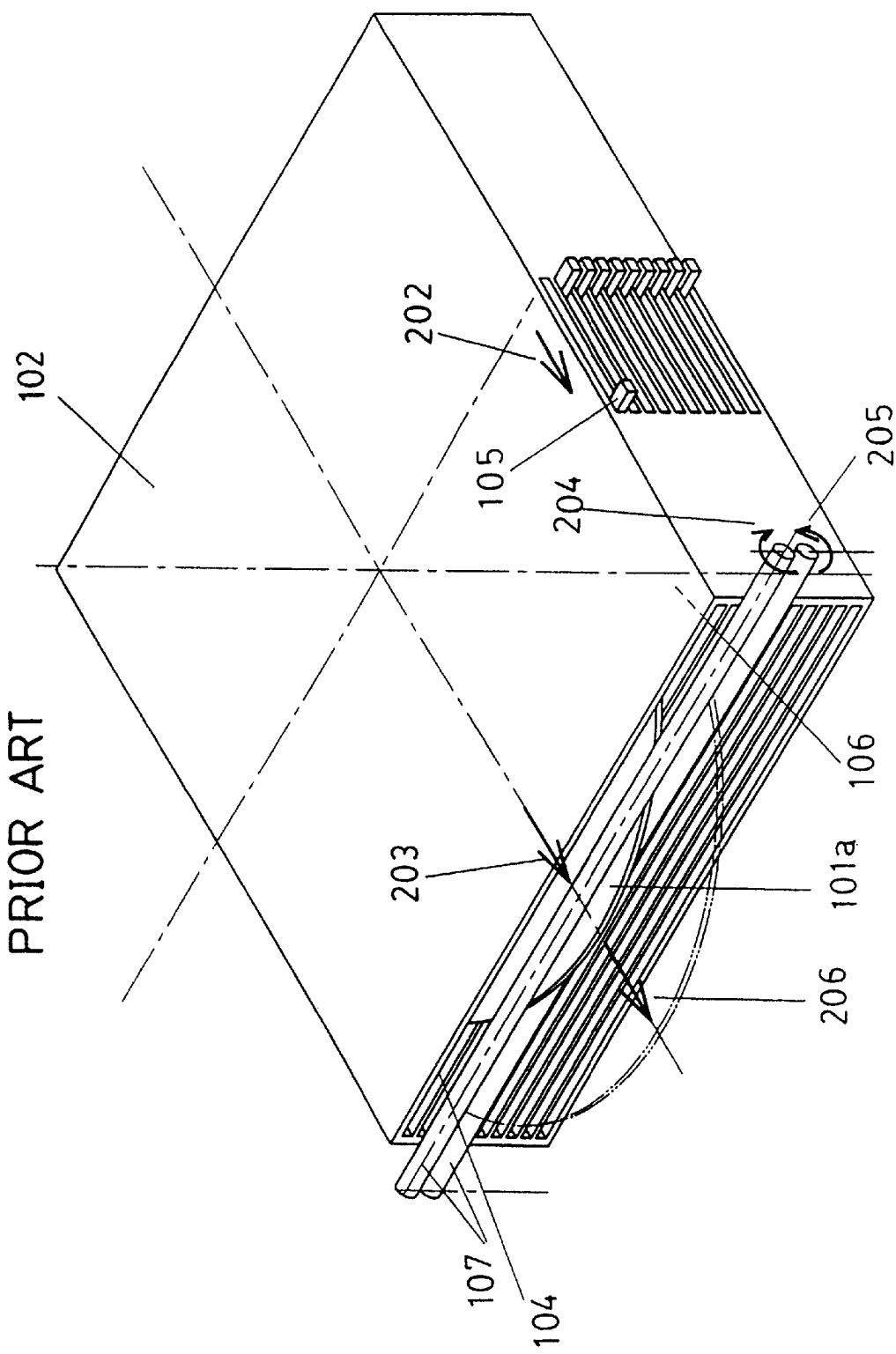
FIG. 52 is a schematic view showing the operation of a conventional disk storage magazine in a recording/reproducing apparatus.

Next, an embodiment in which an opening/closing spring has another configuration will be described. FIG. 49 is a view showing a cross section on a plane perpendicular to the opening support axis, showing a state of opening operation of the magazine case 2 in an embodiment in which an opening/closing spring of a compression coil spring type is provided. FIG. 50 is a view showing a configuration of the opening/closing spring projected from the direction perpendicular to the surface of the disk 1. In FIGS. 49 and 50, reference numeral 43 denotes an opening/closing spring, and 43a denotes an urging member which is added to the tip end of the opening/closing spring 43 to press the opening/closing claw 2aa. The opening/closing claws 2aa are provided symmetrically with respect to the centerline 38 as in the case where a plate spring type is used for the opening/closing spring as described above. The opening/closing springs 43 and the urging members 43a are provided at two positions corresponding to the opening/closing claws 2aa. This embodiment differs from the embodiment in which the opening/closing spring of a plate spring type is provided as described above in that a spring portion for giving an urging force comprises a compression coil spring, and the curved portion 42c is replaced with the urging member 43a. The curved portion of the urging member 43a has the same shape as that of the curved portion 42c. Other portions are substantially the same as those in the case where a plate spring type is used for the opening/closing spring.

In all of the above-described embodiments, the system of recording by light has been a phase change system, but a system such as a photomagnetic system can achieve the same effect. Also, a disk which is recorded or reproduced by light has been used, but a recording/reproducing apparatus in which a disk is recorded or reproduced by transferring a recording or reproducing head into a recording region, such as a magnetic type, can achieve the same effect. Also, the type of a disk used is not subject to any special restriction, and for example, a reproduce only type, a write once type, and a rewritable type can be used. Further, the specifications such as recording capacity, disk diameter, and disk thickness are not subject to any special restriction in the present invention.

Also, in all of the above-described embodiments, the magazine case 2 has been made of a resin, but a metallic material such as a steel plate can achieve the same effect as long as the material can configure a shape as shown in the drawings.

Also, in all of the above-described embodiments, the number of disks 1 stored in the magazine case 2 has been four, but the number of stored disks is not limited to this.

Also, in all of the above-described embodiments, the lock claw 9 and the lock hole 10 have been used for the locking mechanism for inhibiting the opening of the upper plate 2a and the lower plate 2b of the magazine case 2, but the same effect can be achieved even in the case where an attracting force caused by, for example, magnetism is used.

Also, in all of the above-described embodiments, there has been provided the urging mechanism for giving an urging force in the direction in which the magazine case 2 is opened, but the urging mechanism is not provided in the magazine case 2, and means for opening the magazine case 2 can be provided separately on the recording/reproducing apparatus side. Further, in this embodiment, there has been provided a locking mechanism for preventing the opening when the magazine case 2 is closed. However, if the magazine case 2 is not provided with an urging mechanism for giving an urging force in the direction in which the magazine case 2 is opened, the locking mechanism need not be especially provided because the magazine case 2 will not be opened inadvertently even if the locking mechanism is not provided.

Also, in all of the above-described embodiments, to prevent scratching on the surface of the disk 1, soft coating having a surface hardness lower than the surface hardness of the disk 1 has been applied onto the surface of the disk holding member 4. Alternatively, the material of the disk holding member 4 has been made a material having a surface hardness lower than the surface of the disk 1. However, such a consideration is not needed unless a scratch on the surface of the disk 1 poses a problem or if the surface of the disk 1 is less prone to be scratched.

Also, in all of the above-described embodiments, the paired rollers 15 has been used when the disk 1 is taken out of the magazine case 2, but the taking-out means is not limited to this. The same effect can be achieved, for example, even in the case where a holding mechanism of a non-rotatable type is used.

The present invention achieves the effects described below.

According to the disk storage magazine in accordance with the present invention as described above, although there is no fixed partition between the disks, when the disks are stored, the disks are stored properly by the disk holding members in a state in which the disk is not scratched. Also, since a clearance for the pull-out operation between the disk surface and the partition can be decreased reasonably, the thickness of the disk storage magazine can be reduced by the number of disks stored in the magazine case. As a result, the number of stored disks per unit volume of the disk storage magazine can be increased.

Also, according to the disk storage magazine in accordance with the present invention, the magazine case can be opened in a state in which the first cover member and the second cover member are fixed in a partially turnable manner without changing the distance there between. Therefore, when the stored disk is taken out of the magazine case for recording or reproducing, the magazine case need not be pulled out completely from the magazine storage location. The disk intervals can be increased in a state in which the fixed side of the first cover member and the second cover member is partially left at the magazine storage location, and the dimension in the disk removal direction can be decreased. Also, since the first cover member and the second cover member are not separated completely, even when the magazine case is opened, the shape is stabilized, and the stability of the shape can be improved.

Also, according to the disk storage magazine in accordance with the present invention, since the disk projects from the magazine case in connection with the opening operation of the magazine case, the disk can be held by the holding means such as the conveying rollers on the outside of the magazine case. The mechanism of the disk conveying means can be configured simply and easily, for example, the shaft ends of the conveying roller are driven.

Also, according to the recording/reproducing apparatus in accordance with the present invention, when the disk stored in the disk storage magazine in accordance with the present invention is recorded or reproduced, a desired disk can be selected easily by a simple configuration.

Also, according to the disk storage magazine in accordance with the present invention, the expanding operation of the bellows shape of the disk holding member can be performed by utilizing a force due to the opening operation of the magazine case. Therefore, the expanding operation of the bellows shape of the disk holding member can interlock completely with the opening operation of the magazine case. The disk holding member can be expanded sufficiently with respect to the operation margin of the disk insertion/removal in accordance with the opening operation of the magazine case. The disk can be inserted into and removed from the magazine case without an inadvertent interference of the disk surface with the disk holding member, so that the scratching on the disk surface can be prevented.

Further, the disk storage magazine is configured so that the engagement portion with the disk holding member, provided on the magazine case, is accommodated in a cylindrical space formed by the center hole of the disk in a state in which the magazine case is closed. Therefore, even when the magazine case is closed, the engagement portion with the disk holding member, provided on the magazine case, is accommodated in a cylindrical space formed by the center hole of the disk, so that the outside dimensions of the magazine case are not changed at all even when the engagement portion is provided as compared with the case where the engagement portion is not provided.

Also, according to the disk storage magazine in accordance with the present invention, an action of spreading the magazine case in the direction in which the bellows are expanded due to a restoring force to a plane of the bend portion folded into the bellows shape of the disk holding member can be prevented. When the magazine case is closed and the disk is brought into close contact with the plate member composing the disk holding member, an unnecessary swell of the magazine case can be prevented. Therefore, a stress is not given to the magazine case, and a trouble such as creep deformation can be prevented. Also, when the disk storage magazines are placed, for example, in a vertical posture or in a horizontal posture, excess space is not needed.

Also, according to the disk storage magazine in accordance with the present invention, when the disk storage magazine is inserted into the recording/reproducing apparatus and the magazine case is opened, the disk can be prevented from inadvertently coming off from the disk storage magazine, so that the failure of the recording/reproducing apparatus or the scratching of the disk surface can be prevented.

Also, according to the disk storage magazine in accordance with the present invention, even when a force transmitted from the linking mechanism in connection with the opening/closing operation of the magazine case is insufficient, the disk holding member can be moved by a pressing force of the disk discharge spring. Thereby, the disk is moved to the recording/reproducing position without the interruption of the movement operation of the disk holding member, so that the disk can be projected from the magazine case enough to be held by the conveying means. As a result, the reliability of the disk conveying operation can be improved.

Also, according to the disk storage magazine in accordance with the present invention, the disk storage magazine itself has a configuration for maintaining the opened state or the closed state of the magazine case. Thereby, a mechanism for maintaining the opened state of the magazine case from the outside is not needed, so that the configuration of a device for recording or reproducing the disk stored in the disk storage magazine is made simple, and the number of parts can be decreased. Also, when the disk storage magazine is present singly, the maintenance of the closed state of the magazine case does not rely on the locking mechanism only. Therefore, the sealing property maintaining force of the magazine case can be improved, and the reliability of the disk storage magazine for dust tightness or the like can be increased.

What is claimed is:

1. A disk storage magazine comprising:
    a magazine case capable of being opened and closed, which is made up of a first cover member and a second cover member; and
    a disk holding member capable of holding disks, at least a part of which is fixed and supported on said first cover member and said second cover member,
        wherein inside said magazine case, said disks are held by said disk holding member in a densely stacked state, by relatively turning said first and second cover members around a turning axis provided at the ends of said first and second cover members, said magazine case is opened or closed, and said disk holding member changes the stacking interval of said disks in accordance with the opening/closing operation of said magazine case,
        wherein said disk holding member comprises an expandable plate member in the form of a bellows having a plurality of substantially V-shaped portions, said substantially V-shaped portions hold the outer peripheral edge of each end of said disk located substantially in parallel with said turning axis and substantially in the diameter direction of said disk, the expanding/contracting direction of said plate member is substantially the same as the turning direction of said first and second cover members, and the vertical length between adjacent pointed tips of said substantially V-shaped portions is changed by moving said plate member in a folding manner in accordance with the opening/closing turning operation of said magazine case in order to enable the stacking interval of said disks to change around said turning axis and said disk to move in the direction perpendicular to said turning axis, whereby said disk is inserted into and removed from said magazine case,
        wherein a part of said substantially V-shaped portions other than both end portions in the insertion/removal direction of said disk is torn and wherein said substantially V-shaped portions are configured so that untorn portions thereof do not exist in a plane region produced by vertically projecting the disk in a state of being stored in said magazine case.

2. A disk storage magazine comprising:
    a magazine case capable of being opened and closed, which is made up of a first cover member and a second cover member; and
    a disk holding member capable of holding disks, at least a part of which is fixed and supported on said first cover member and said second cover member,
        wherein inside said magazine case, said disks are held by said disk holding member in a densely stacked state, by relatively turning said first and second cover members around a turning axis provided at the ends of said first and second cover members, said magazine case is opened or closed, and said disk holding member changes the stacking interval of said disks in accordance with the opening/closing operation of said magazine case,
        wherein said disk holding member comprises an expandable plate member in the form of a bellows having a plurality of substantially V-shaped portions, said substantially V-shaped portions hold the outer peripheral edge of each end of said disk located substantially in parallel with said turning axis and substantially in the diameter direction of said disk, the expanding/contracting direction of said plate member is substantially the same as the turning direction of said first and second cover members, and the vertical length between adjacent pointed tips of said substantially V-shaped portions is changed by moving said plate member in a folding manner in accordance with the opening/closing turning operation of said magazine case in order to enable the stacking interval of said disks to change around said turning axis and said disk to move in the direction perpendicular to said turning axis, whereby said disk is inserted into and removed from said magazine case,
        wherein said disk holding member is configured so that said first or second cover member is provided with an engagement portion which has a slit-shaped opening on a straight line passing through the center of said disk and in parallel with the movement direction of said disk, and engages with said opening to keep said disk holding member and wherein said engagement portion is accommodated in a cylindrical space formed by a center hole of said disk in the state in which said magazine case is closed.

3. A disk storage magazine comprising:
    a magazine case capable of being opened and closed, which is made up of a first cover member and a second cover member; and
    a disk holding member capable of holding disks, at least a part of which is fixed and supported on said first cover member and said second cover member,
        wherein inside said magazine case, said disks are held by said disk holding member in a densely stacked state, by relatively turning said first and second cover members around a turning axis provided at the ends of said first and second cover members, said magazine case is opened or closed, and said disk holding member changes the stacking interval of said disks in accordance with the opening/closing operation of said magazine case, wherein said disk holding member is configured so that at least a part of said disk is moved to deviate from a plane region produced by vertically projecting said magazine case in accordance with the opening operation of said magazine case, and said disk is moved into said projected plane region in accordance with the closing operation, wherein said magazine case includes a disk discharge spring member for providing an urging force to said disk holding member in a direction in which said disk is deviated from the projected plane region of said magazine case, and wherein said disk discharge spring member is a part of said disk holding member.

4. A disk storage magazine comprising:

a magazine case capable of being opened and closed, which is made up of a first cover member and a second cover member; and a disk holding member capable of holding disks, at least a part of which is fixed and supported on said first cover member and said second cover member, wherein inside said magazine case, said disks are held by said disk holding member in a densely stacked state, by relatively turning said first and second cover members around a turning axis provided at the ends of said first and second cover members, said magazine case is opened or closed, and said disk holding member changes the stacking interval of said disks in accordance with the opening/closing operation of said magazine case, wherein said disk holding member is configured so that at least a part of said disk is moved to deviate from a plane region produced by vertically projecting said magazine case in accordance with the opening operation of said magazine case, and said disk is moved into said projected plane region in accordance with the closing operation, wherein said magazine case includes a disk discharge spring member for providing an urging force to said disk holding member in a direction in which said disk is deviated from the projected plane region of said magazine case, and wherein said disk discharge spring member presses said disk holding member at one or more positions symmetrical with respect to a direction in which said disk holding member deviates from the projected plane region of said magazine case.

5. A disk storage magazine comprising:

a magazine case capable of being opened and closed, which is made up of a first cover member and a second cover member; and a disk holding member capable of holding disks, at least a part of which is fixed and supported on said first cover member and said second cover member, wherein inside said magazine case, said disks are held by said disk holding member in a densely stacked state, by relatively turning said first and second cover members around a turning axis provided at the ends of said first and second cover members, said magazine case is opened or closed, and said disk holding member changes the stacking interval of said disks in accordance with the opening/closing operation of said magazine case, and wherein said magazine case includes an opening/closing spring member for providing an urging force in a direction in which an angle formed between the first cover member and the second cover member with respect to the turning axis of said first cover member and said second cover member is decreased, or in a direction in which the angle is increased; and said opening/closing spring member provides an urging force in the direction of decreasing the angle when said magazine case is closed, and provides an urging force in the direction of increasing the angle when said magazine case is open.

6. The disk storage magazine according to claim 5, wherein said opening/closing spring member includes a protruding spring portion being fixed and supported at its base end on either of said first cover member or said second cover member, being deformed at its tip end in the direction substantially perpendicular to the turning axis, and having a convex component; said first cover member or said second cover member on which said opening/closing spring member is not fixed and supported has a protruding portion having a convex component in the direction perpendicular to said turning axis; and said protruding portion presses said protruding spring portion at least once during the turning operation of said first cover member with respect to said second cover member to deform said opening/closing spring member, by which said protruding portion passes through.

7. The disk storage magazine according to claim 6, wherein said opening/closing spring member is a compression coil spring, or a torsion coil spring, or a plate spring.

8. The disk storage magazine according to claim 5, wherein said opening/closing spring member is provided at one or more positions symmetrical with respect to a direction in which said disk holding member deviates from the projected plane region of said magazine case.

9. A recording/reproducing apparatus comprising:

a disk storage magazine including a magazine case capable of being opened and closed, and a disk holding member capable of holding disks, at least a part of which is fixed and supported on said magazine case, wherein inside said magazine case, said disks are held by said disk holding member in a densely stacked state, and said disk holding member changes the stacking interval of said disks in accordance with the opening/closing operation of said magazine case, and at least one recording/reproducing head for recording or reproducing data on said disk, wherein there are provided magazine opening/closing means for opening/closing said magazine case of the disk storage magazine, and disk conveying means for conveying one disk from the opened magazine case to a position of said recording/reproducing head while holding the same therebetween.

10. A recording/reproducing apparatus comprising:

a disk storage magazine including a magazine case comprised of a first cover member and a second cover member, a plurality of disks held in said magazine case in a densely stacked state when said magazine case is closed, and a disk holding member at least a part of which is fixed and supported on said first cover member and said second cover member, wherein said magazine case is opened and closed by relatively turning said first and second cover members around a turning axis provided at the ends of said first and second cover members, and said disk holding member is configured so that the stacking interval of said disks is changed in accordance with the opening/closing operation of said magazine case;

a first holder for substantially fixedly placing the closed magazine case;

moving means for moving said disk storage magazine to the opening side thereof by a predetermined distance;

a second holder for substantially fixedly placing said first and second cover members in the state in which said magazine case is open at a position to which said disk storage magazine is moved by said predetermined distance;

at least one recording/reproducing head for recording or reproducing data on said disk; and disk conveying means for conveying one disk to the position of said recording/reproducing head while holding the same therebetween.

11. The recording/reproducing apparatus according to claim 10, wherein when any one of said plurality of disks is recorded or reproduced, and said second holder is turned in the stacking direction of said disks to select the disk in the state in which said disk storage magazine is open.

12. The recording/reproducing apparatus according to claim 10, wherein when any one of said plurality of disks is recorded or reproduced, and said disk conveying means is turned in the stacking direction of said disks to select the disk in the state in which said disk storage magazine is opening.

* * * * *